United States Patent
Pedzisz

(10) Patent No.: US 11,394,978 B2
(45) Date of Patent: Jul. 19, 2022

(54) VIDEO FIDELITY MEASURE

(71) Applicant: Telefonaktiebolaget LM Ericsson (PUBL), Stockholm (SE)

(72) Inventor: Maciej Pedzisz, Southampton (GB)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/271,301

(22) PCT Filed: Aug. 29, 2018

(86) PCT No.: PCT/EP2018/073237
§ 371 (c)(1),
(2) Date: Feb. 25, 2021

(87) PCT Pub. No.: WO2020/043279
PCT Pub. Date: Mar. 5, 2020

(65) Prior Publication Data
US 2021/0409725 A1 Dec. 30, 2021

(51) Int. Cl.
*H04N 19/154* (2014.01)
*H04N 19/14* (2014.01)
(Continued)

(52) U.S. Cl.
CPC ......... *H04N 19/154* (2014.11); *G06T 7/0002* (2013.01); *H04N 19/103* (2014.11);
(Continued)

(58) Field of Classification Search
None
See application file for complete search history.

(56) References Cited

U.S. PATENT DOCUMENTS

2012/0281142 A1* 11/2012 Pettersson ............ H04N 17/004
348/553
2014/0321552 A1* 10/2014 He ....................... H04N 19/192
375/240.16
(Continued)

FOREIGN PATENT DOCUMENTS

| CN | 104361593 A | 2/2015 |
|---|---|---|
| EP | 1 727 088 A1 | 11/2006 |
| WO | 2018 140158 A1 | 8/2018 |

OTHER PUBLICATIONS

Gradient Magnitude Similarity Deviation on Multiple Scales for Color Image Quality Assessment by Bo Zhang et al.—IEEE 2017.
(Continued)

*Primary Examiner* — Samuel D Fereja
(74) *Attorney, Agent, or Firm* — Baker Botts L.L.P.

(57) ABSTRACT

A video fidelity measure is determined for a video sequence (1) by determining distorted and original difference pictures (30, 40) as pixel-wise differences between pixels (14, 24) in a distorted picture (10) and corresponding pixels (24) in an original picture (20) and between pixels in a preceding distorted picture (11) and corresponding pixels in a preceding original picture (21). First and second maps representing distortions in pixel values between the distorted and original pictures (10, 20) and between distorted and original difference pictures (30, 40) are determined. Third and sixth maps are determined as respective aggregations of local variabilities in pixels values in the distorted and original pictures (10, 20) and local variabilities in pixels values in the distorted and original difference pictures (30, 40), respectively. The video fidelity measure is then determined based on the first to third and sixth maps.

28 Claims, 19 Drawing Sheets

(51) Int. Cl.
*H04N 19/103* (2014.01)
*G06T 7/00* (2017.01)

(52) U.S. Cl.
CPC ............... *G06T 2207/10016* (2013.01); *G06T 2207/30168* (2013.01)

(56) References Cited

U.S. PATENT DOCUMENTS

2017/0070745 A1* 3/2017 Lee .................. H04N 19/61
2019/0289296 A1* 9/2019 Kottke ............... H04N 19/154

OTHER PUBLICATIONS

Image Quality Assessment: From Error Visibility to Structural Similarity by Zhou Wang et al.; IEEE Transactions on Image Processing, vol. 13, No. 4—Apr. 2004.

PCT International Search Report issued for International application No. PCT/EP2018/073237—Jan. 29, 2019.

PCT Written Opinion of the International Searching Authority issued for International application No. PCT/EP2018/073237—Jan. 29, 2019.

Information Content Weighting for Perceptual Image Quality Assessment by Zhou Wang and Qiang Li; IEEE Transactions on Image Processing, vol. 20, No. 5—May 2011.

Multi-Scale Structural Similarity for Image Quality Assessment by Zhou Wang et al.—2003.

Methodology for the Subjective Assessment of the Quality of Television Pictures, Recommendation ITU-R BT.500-13, Radiocommunication Sector of ITU—Jan. 2012.

Parameter Values for the HDTV Standards for Production and International Programme Exchange, Recommendation ITU-R BT.709-6, Radiocommunication Sector of ITU—Jun. 2015.

Subjective Video Quality Assessment Methods for Multimedia Applications, Series P: Telephone Transmission Quality, Telephone Installations, Local Line Networks, Audiovisual quality in multimedia services, ITU-T, Telecommunication Standardization Sector of ITU, p. 910—Apr. 2008.

Can Visual Fixation Patterns Improve Image Fidelity Assessment? by Eric C. Larson et al., Image Coding and Analysis Lab, Oklahoma State University, Stillwater OK—IEEE 2008.

Comparison of the Coding Efficiency of Video Coding Standards—Including High Efficiency Video Coding (HEVC) by Jens-Rainer Ohm, et al., IEEE Transactions on Circuits and Systems for Video Technology, vol. 22, No. 12—Dec. 2012.

* cited by examiner

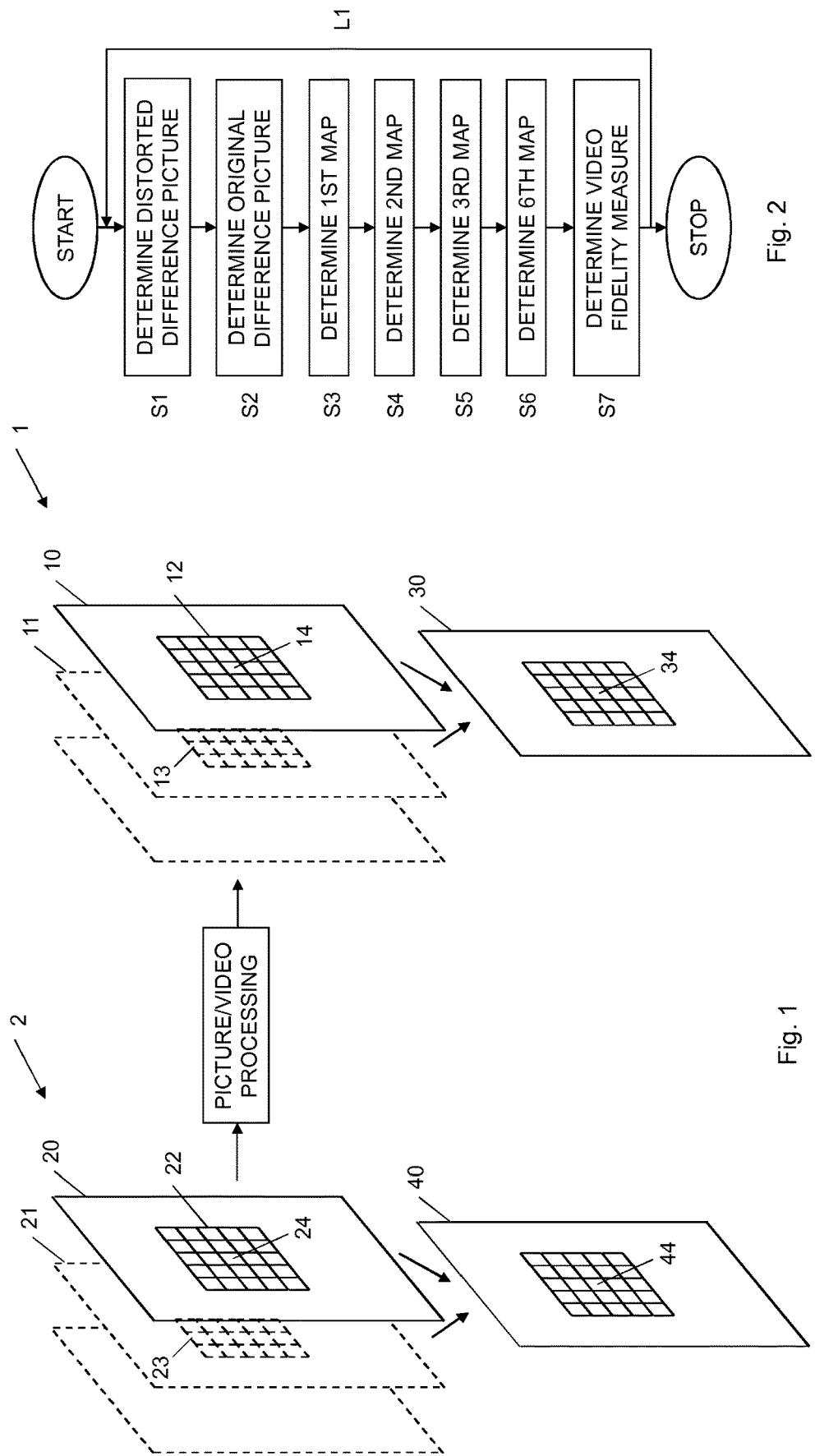

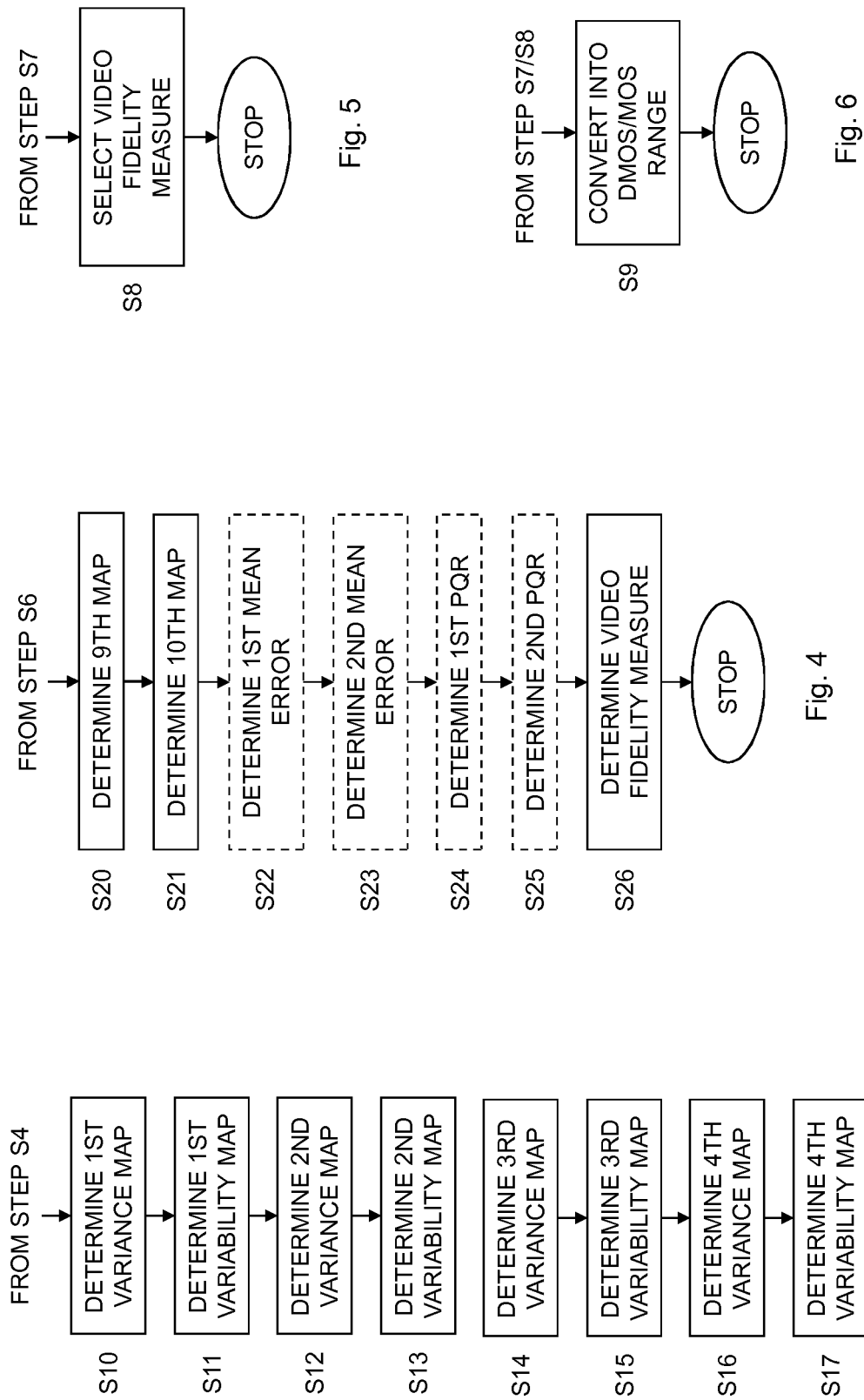

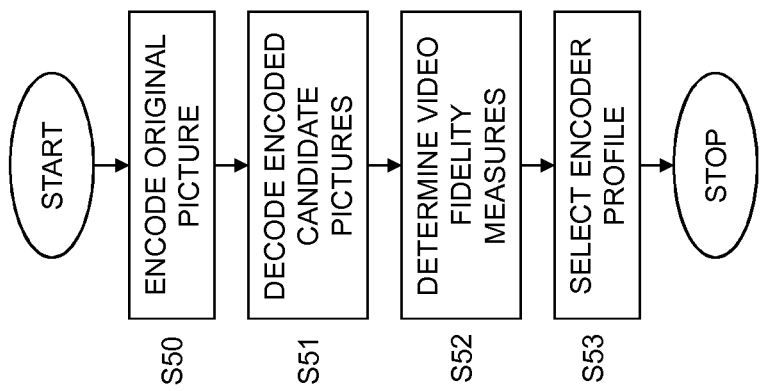
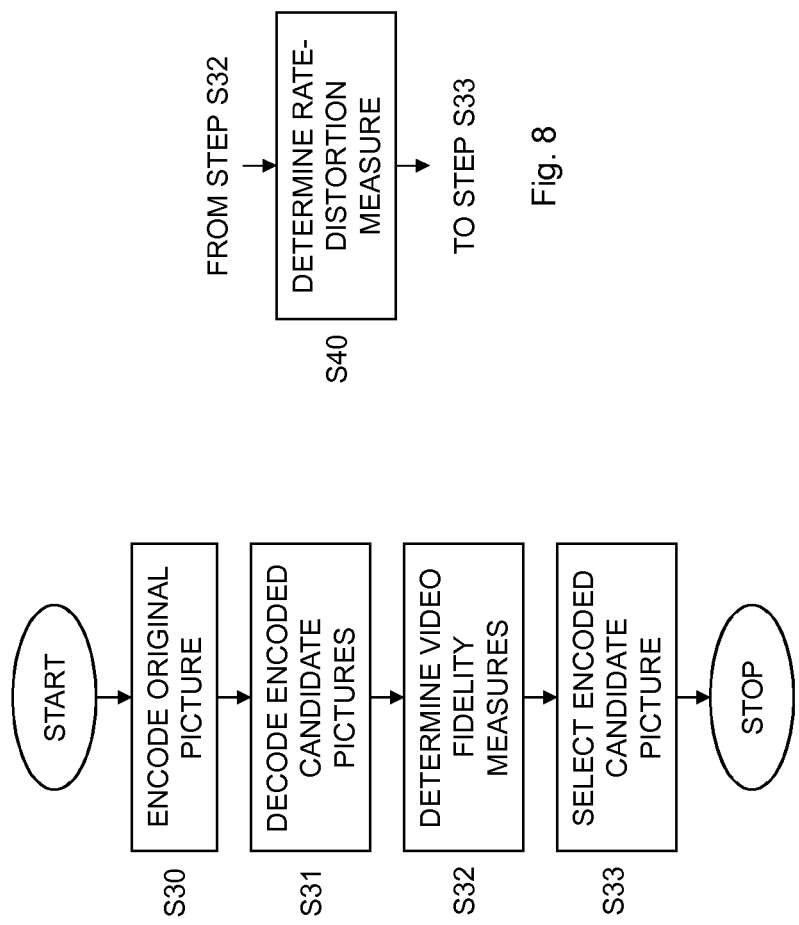

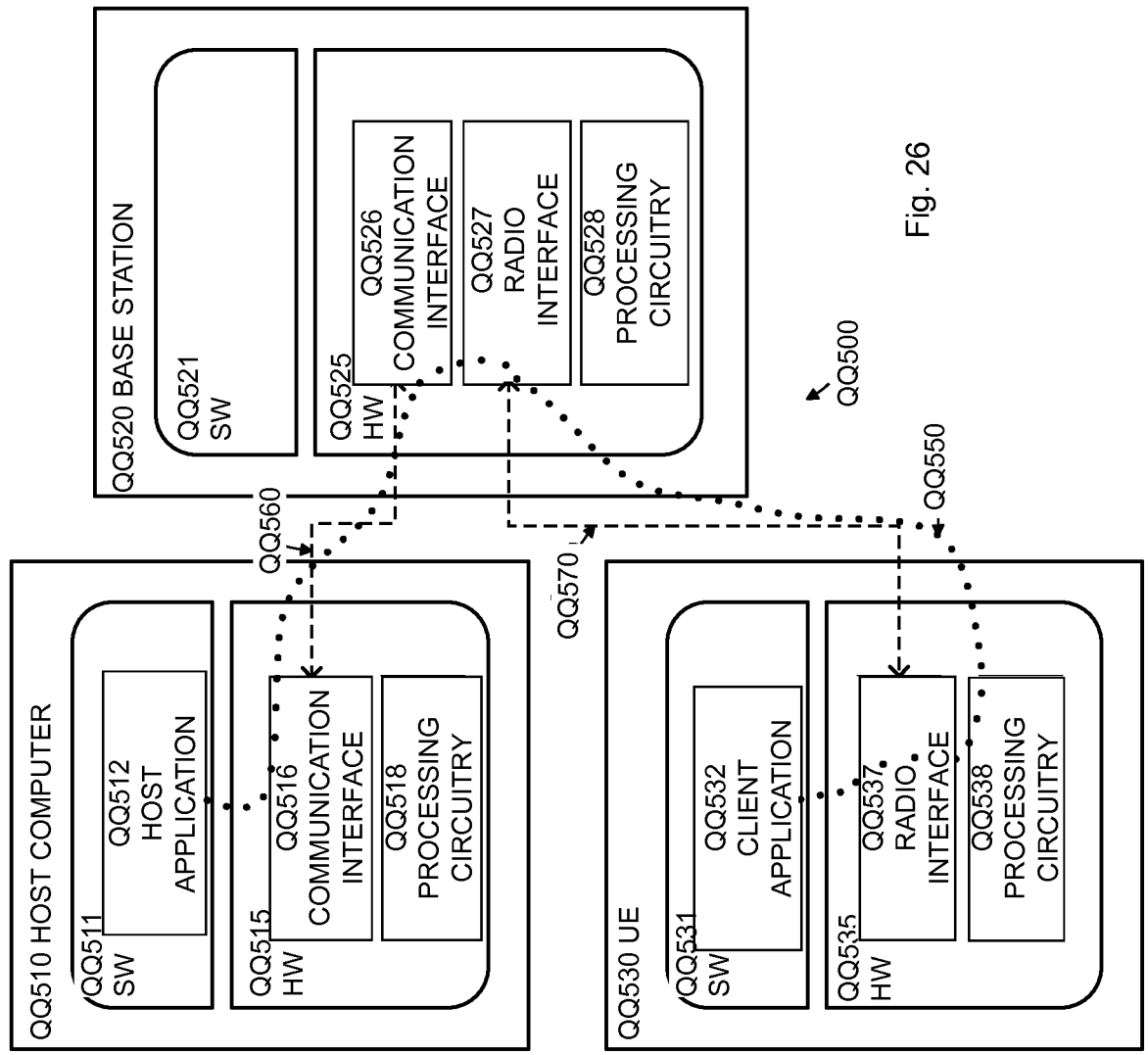

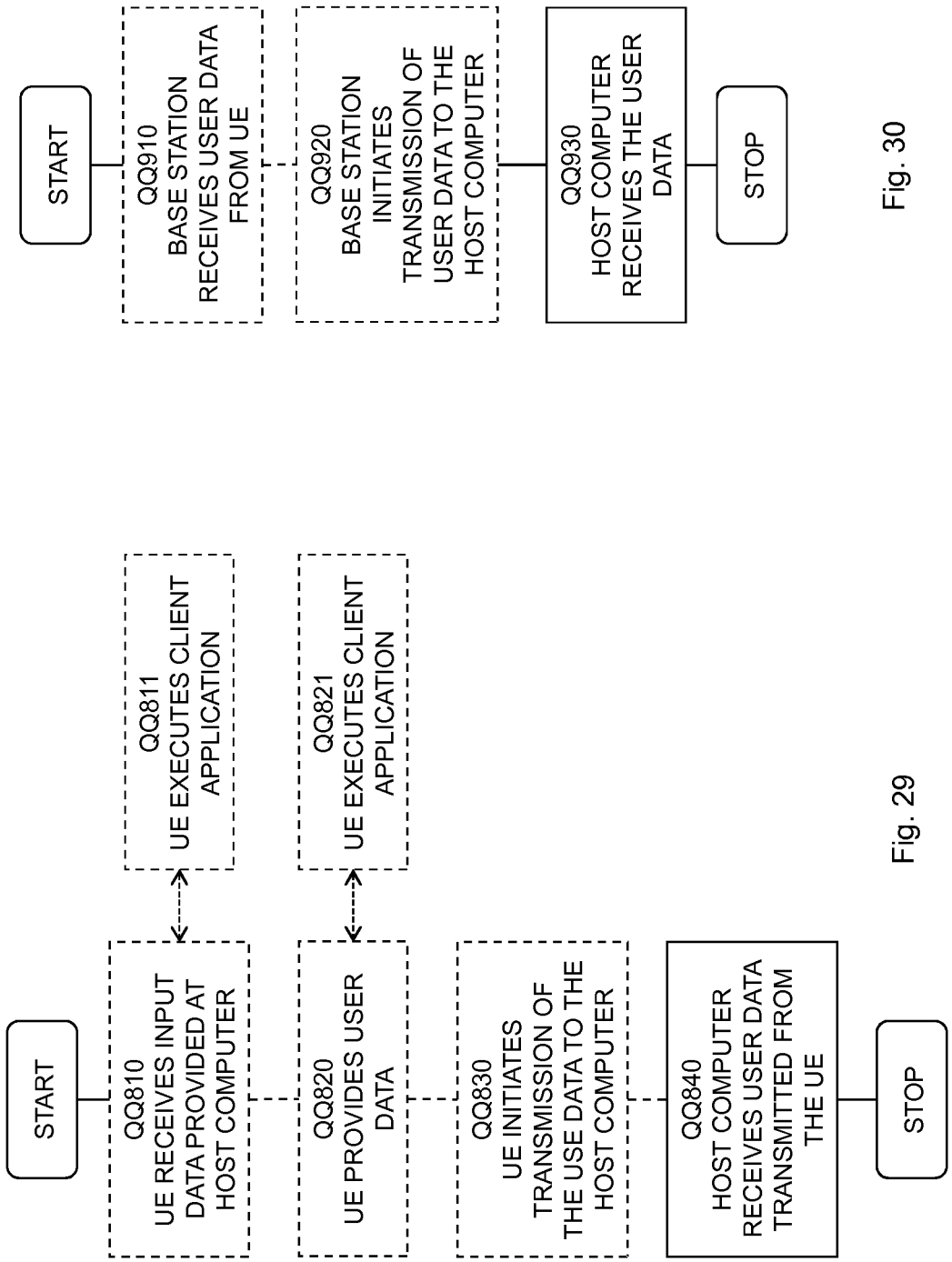

VIDEO FIDELITY MEASURE

PRIORITY

This nonprovisional application is a U.S. National Stage Filing under 35 U.S.C. § 371 of International Patent Application Serial No. PCT/EP2018/073237 filed Aug. 29, 2018 and entitled "*Video Fidelity Measure*" which is hereby incorporated by reference in its entirety.

TECHNICAL FIELD

The invention generally relates to methods, devices, encoder, computer program and carrier for determining video fidelity measures.

BACKGROUND

The successful deployment of any video processing technology requires some form of quality analysis to validate the processing results. This may be used for pre-processing stages, e.g., grain noise removal, color space conversions and video de-interlacing; video compression, e.g., in-loop rate-distortion optimization, profile creation and tuning; and/or as an external procedure to validate and/or compare the results of some video processors, e.g., encoder comparisons.

The currently best video quality analysis is to use subjective scores as the evaluation criteria. These scores are assigned by human viewers and are mapped to mean opinion score (MOS) or differential mean opinion score (DMOS) range. They are optimal in a sense that both video statistics and human visual system (HVS) properties are considered and the video quality is judged by humans, i.e., the target receiver for which the videos were created.

Obtaining reliable subjective scores requires setting-up a psychophysical experiment, meeting requirements for the viewing conditions, following experimental protocol and data analysis stages. Performing such subjective experiments on a lot of video content and/or with a lot of human viewers is generally impractical and very costly. For these reasons, and to be able to include video quality analysis into a continuous integration process, automatic, data-driven methods are preferred. These methods belong to one of the three following categories:

- full-reference methods, in which both original and distorted videos are available for quality assessment algorithm;
- reduced-reference methods, in which some information is extracted from the original video and sent via an auxiliary channel to be used along the distorted video for quality evaluation; and
- non-reference methods, also referred to as single-ended methods, in which only distorted video is available for the quality evaluation.

Among the above three types, full-reference methods are the most reliable as all information is available in the quality evaluation, while the non-reference methods are the least reliable but do not require any additional information except for the distorted video.

The full-reference methods typically use the intensity channel or all three color channels to compare the original video and the distorted video and judge the distortion in a quantitative manner. The most common methods in this category rely on the L2-norm of the difference between original and distorted videos and include mean square error (MSE) and peak signal to noise ratio (PSNR). Other methods perform quality evaluation based on more abstract properties, such as picture structures within the video as used in structural similarity (SSIM) and its derivatives. These video fidelity metrics can also be improved through knowledge of where humans tend to fixate in pictures [1].

Most of the current video quality evaluation methods face a tradeoff between execution speed, i.e., runtime of the metric, and complexity, i.e., modelling capabilities. The fastest video fidelity metrics do not use any of the HVS properties, thereby resulting in a poor correlation with subjective quality judgements. However, the more sophisticated the model, the more time it would take to evaluate video quality. This makes it unsuitable for time-constrained environments especially when real-time operation is required.

There is therefore a need for a video fidelity measure that can be used to evaluate quality of video sequences, such as during video processing.

SUMMARY

It is a general objective to provide a video fidelity measure having a good correlation to the human visual system and still comparatively low execution speed.

This and other objectives are met by embodiments as disclosed herein.

An aspect of the embodiments relates to a method of determining a video fidelity measure for a video sequence. The method comprises, for at least one distorted picture in the video sequence, determining a distorted difference picture as a pixel-wise difference between at least a portion of the distorted picture and at least a corresponding portion of a preceding distorted picture preceding the distorted picture in the video sequence. The method also comprises determining an original difference picture as a pixel-wise difference between at least a corresponding portion of an original picture and at least a corresponding portion of a preceding original picture preceding the original picture. The method further comprises determining a first map representing, for each pixel in the at least a portion of the distorted picture, a distortion in pixel values between the pixel and a corresponding pixel in the original picture. The method additionally comprises determining a second map representing, for each pixel in the distorted difference picture, a distortion in pixel values between the pixel and a corresponding pixel in the original difference picture. The method also comprises determining a third map as an aggregation of a fourth map representing, for each pixel in the at least a portion of the distorted picture, a local variability in pixel values and a fifth map representing, for each corresponding pixel in the original picture, a local variability in pixel values. The method further comprises determining a sixth map as an aggregation of a seventh map representing, for each pixel in the distorted difference picture, a local variability in pixel values and an eighth map representing, for each corresponding pixel in the original difference picture, a local variability in pixel values. The method also comprises determining the video fidelity measure based on the first map, the second map, the third map and the sixth map.

Another aspect of the embodiment relates to a method of encoding a video sequence. The method comprises encoding at least a portion of an original picture in the video sequence according to multiple coding modes to obtain multiple encoded candidate picture portions and decoding the multiple encoded candidate picture portions to obtain multiple decoded candidate picture portions. The method also comprises determining, for each of the multiple decoded candidate picture portions, a respective video fidelity measure according to the aspect above. The method further comprises selecting, among the multiple encoded candidate picture portions, an encoded candidate picture portion as encoded representation of the at least a portion of the original picture at least partly based on the respective video fidelity measures.

A further aspect of the embodiments relates to a method of selecting an encoder profile for an encoder. The method comprises encoding at least one original picture in a video sequence using multiple encoder profiles to obtain multiple encoded pictures and decoding the multiple encoded pictures to obtain multiple decoded pictures. The method also comprises determining, for each of the multiple decoded pictures, a respective video fidelity measure according to the aspect above. The method further comprises selecting, among the multiple encoder profiles, an encoder profile for the encoder based at least partly on the respective video fidelity measures.

An aspect of the embodiments relates to a device for determining a video fidelity measure for a video sequence. The device is configured to, for at least one distorted picture in the video sequence, determine a distorted difference picture as a pixel-wise difference between at least a portion of the distorted picture and at least a corresponding portion of a preceding distorted picture preceding the distorted picture in the video sequence. The device is also configured to determine an original difference picture as a pixel-wise difference between at least a corresponding portion of an original picture and at least a corresponding portion of a preceding original picture preceding the original picture. The device is further configured to determine a first map representing, for each pixel in the at least a portion of the distorted picture, a distortion in pixel values between the pixel and a corresponding pixel in the original picture. The device is additionally configured to determine a second map representing, for each pixel in the distorted difference picture, a distortion in pixel values between the pixel and a corresponding pixel in the original difference picture. The device is also configured to determine a third map as an aggregation of a fourth map representing, for each pixel in the at least a portion of the distorted picture, a local variability in pixel values and a fifth map representing, for each corresponding pixel in the original picture, a local variability in pixel values. The device is further configured to determine a sixth map as an aggregation of a seventh map representing, for each pixel in the distorted difference picture, a local variability in pixel values and an eighth map representing, for each corresponding pixel in the original difference picture, a local variability in pixel values. The device is also configured to determine the video fidelity measure based on the first map, the second map, the third map and the sixth map.

Another aspect of the embodiments relates to an encoder comprising a device for determining a video fidelity measure for a video sequence according to above. The encoder is configured to encode at least a portion of an original picture in the video sequence according to multiple coding modes to obtain multiple encoded candidate picture portions and decode the multiple encoded candidate pictures to obtain multiple decoded candidate picture portions. The encoder is also configured to select, among the multiple encoded candidate picture portions, an encoded candidate picture portion as encoded representation of the at least a portion of the original picture at least partly based on respective video fidelity measures determined by the device for each of the multiple decoded candidate picture portions.

A further aspect of the embodiments relates to a device for selecting an encoder profile for an encoder. The device comprises a device for determining a video fidelity measure for a video sequence according to above. The device for selecting an encoder profile is configured to encode at least one original picture in the video sequence using multiple encoder profiles to obtain multiple encoded pictures and decode the multiple encoded pictures to obtain multiple decoded pictures. The device is also configured to select, among the multiple encoder profiles, an encoder profile for the encoder based at least partly on respective video fidelity measures determined by the device for determining a video fidelity measure.

A related aspect of the embodiment defines a network device comprising a device according to above and/or an encoder according to above.

Yet another aspect of the embodiments relates to a computer program comprising instructions, which when executed by at least one processor, cause the at least one processor to determine, for at least one distorted picture in a video sequence, a distorted difference picture as a pixel-wise difference between at least a portion of the distorted picture and at least a corresponding portion of a preceding distorted picture in the video sequence. The at least one processor is also caused to determine, for the at least one distorted picture in the video sequence, an original difference picture as a pixel-wise difference between at least a corresponding portion of an original picture and at least a corresponding portion of a preceding original picture. The at least one processor is further caused to determine, for the at least one distorted picture in the video sequence, a first map representing, for each pixel in the at least a portion of the distorted picture, a distortion in pixel values between the pixel and a corresponding pixel in the original picture. The at least one processor is additionally caused to determine, for the at least one distorted picture in the video sequence, a second map representing, for each pixel in the distorted difference picture, a distortion in pixel values between the pixel and a corresponding pixel in the original difference picture. The at least one processor is also caused to determine, for the at least one distorted picture in the video sequence, a third map as an aggregation of a fourth map representing, for each pixel in the at least a portion of the distorted picture, a local variability in pixel values and a fifth map representing, for each corresponding pixel in the original picture, a local variability in pixel values. The at least one processor is further caused to determine, for the at least one distorted picture in the video sequence, a sixth map as an aggregation of a seventh map representing, for each pixel in the distorted difference picture, a local variability in pixel values and an eighth map representing, for each corresponding pixel in the original difference picture, a local variability in pixel values. The at least one processor is also caused to determine, for the at least one distorted picture in the video sequence, the video fidelity measure based on the first map, the second map, the third map and the sixth map.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The video fidelity measure has a good correlation with the human visual system as assessed using both linear and rank correlations with subjective scores. It is fast in terms of execution speed. The video fidelity measure statistically outperforms many of the prior art metrics and has smaller mean absolute error and root mean squares errors on MOS/DMOS scores than such prior art metrics.

BRIEF DESCRIPTION OF THE DRAWINGS

The embodiments, together with further objects and advantages thereof, may best be understood by referring to the following description taken together with the accompanying drawings, in which:

FIG. 1 schematically illustrates processing of original pictures in a video sequence resulting in distorted pictures;

FIG. 2 is a flow chart illustrating a method of determining a video fidelity measure for a video sequence according to an embodiment;

FIG. 3 is a flow chart illustrating additional, optional steps of the method in FIG. 2 according to an embodiment;

FIG. 4 is a flow chart illustrating an embodiment of determining a video fidelity measure in FIG. 2;

FIG. 5 is a flow chart illustrating an additional, optional step of the method in FIG. 2 according to an embodiment;

FIG. 6 is a flow chart illustrating an additional, optional step of the method in FIG. 2 or 5 according to an embodiment;

FIG. 7 is a flow chart illustrating a method of encoding a video sequence according to an embodiment;

FIG. 8 is a flow chart illustrating an additional, optional step of the method in FIG. 7 according to an embodiment;

FIG. 9 is a flow chart illustrating a method of selecting an encoder profile for encoding a video sequence;

FIG. 26 is a schematic diagram illustrating an example of a host computer communicating via a base station with a user equipment over a partially wireless connection in accordance with some embodiments;

FIG. 29 is a flowchart illustrating a method implemented in a communication system in accordance with an embodiment;

FIG. 30 is a flowchart illustrating a method implemented in a communication system in accordance with an embodiment;

DETAILED DESCRIPTION

Figure 10:
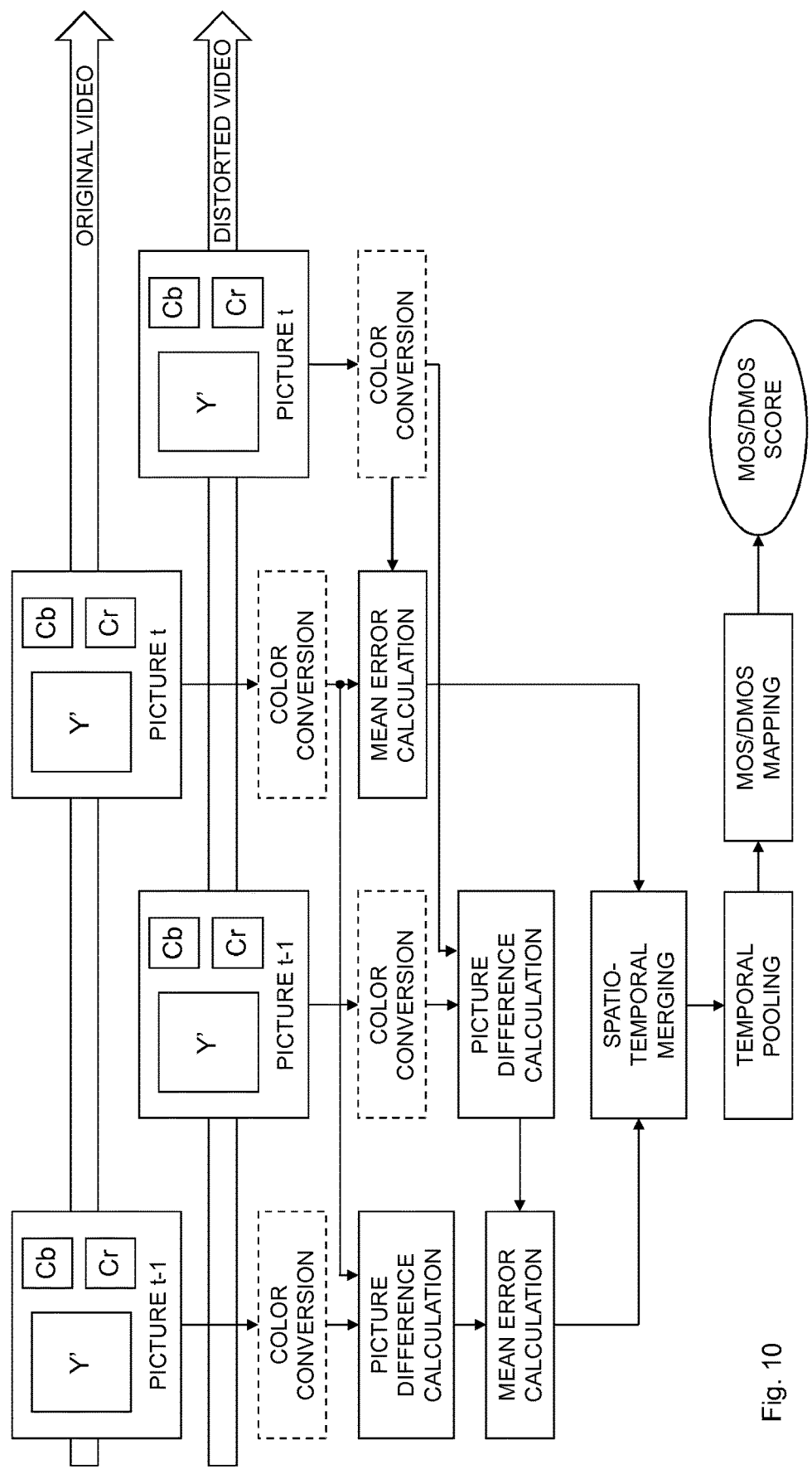
FIG. 10 schematically illustrates an embodiment of determining a video fidelity measure for a video sequence.

Throughout the drawings, the same reference numbers are used for similar or corresponding elements.

The present invention generally relates to determination of video fidelity measures, and in particular to determining such video fidelity measures suitable for video quality analysis and evaluation.

The video fidelity measure of the embodiments is determined in a full-reference method having access to both original pictures, sometimes referred to as reference pictures, and distorted pictures, also referred to as degraded or processed pictures. FIG. 1 schematically illustrates the general concept of processing original pictures 20, 21, also referred to as original images or original frames herein, in an input video sequence or stream 2 resulting in distorted pictures 10, 11, also referred to as distorted images or distorted frames, in an output video sequence or stream 1. The original pictures 20, 21 input in such a picture or video processing could be pictures of a video sequence 2, such as captured by a video camera or computer-generated pictures. The picture or video processing as shown in FIG. 1 could be any processing that is applied to original pictures 20, 21 and that may result in a distortion or degradation in the quality of the original pictures 20, 21 due to changes in pixel values of the pixels 24 in the original pictures 20, 21. Non-limiting examples of such picture or video processing includes video coding, also referred to as video compression, and various pre-processing stages prior to such video coding. For instance, the video fidelity measure of the embodiments could be used in connection with in-loop rate-distortion optimization (RDO), encoder profile creation and tuning, etc., i.e., generally controlling or optimizing the video coding. The video fidelity measure may also, or alternatively, be used to validate and/or compare the results of different video encoders or encoder profiles, e.g., in encoder competitions or comparisons. In connection with pre-processing stages, the video fidelity measure of the embodiments may, for instance, be used to control or optimize, and/or validate or compare, noise removal processing, color space conversions, de-interlacing and other such video pre-processing stages.

"Original" as used herein for original pictures 20, 21 indicate that the original pictures 20, 21 are to be input into a distortion-causing picture or video processing. Original should, however, not be interpreted limited as only referring to pictures directly output from a video camera or a computer-based video generating source. In fact, the original pictures 20, 21 may have been subject to upstream picture or video processing operations, including such picture or video processing operations that may cause a distortion in pixel values and thereby a degradation in quality. Original should thereby be interpreted with the regard to a current picture or video processing operation regardless of any previous or upstream such video processing operation.

The expressions "video fidelity" and "video quality" are sometimes used interchangeably in the art of video quality assessment. Video fidelity is, however, relating to the ability to discriminate between two video sequences 1, 2. Video quality is, on the other hand, more related to the preference for one video sequence over another. Accordingly, video fidelity and video fidelity measures relate to full-reference methods, in which both original pictures 20, 21 and distorted pictures 10, 11 are available for assessment, whereas video quality and video quality measures are more relevant for non-reference methods, in which only the distorted pictures 10, 11 are available in the assessment.

Various color spaces and formats are available and used to represent the colors of pixels 14, 24 in pictures 10, 11, 20, 21 and in video sequences 1, 2. Non-limiting, but illustrative, examples of such color spaces or formats include red (R), green (G), blue (B) color, i.e., RGB color; luma (Y') and chroma (Cb, Cr) color, i.e., Y'CbCr color; luminance (Y) and chrominance (X, Z) color, i.e., XYZ color; luma or intensity (I) and chroma (Ct, Cp) color, i.e., ICtCp color. In such a case, a pixel value as used herein could be any color component value, such as R, G, B, Y', Cb, Cr, X, Y, Z, I, Ct or Cp value. In a particular embodiment, a pixel value is a luma value (Y') or a chroma value (Cb or Cr).

Pixels 14, 24 and pixel values 14, 24 of pictures 10, 11, 20, 21 in video sequences 1, 2 are also referred to as samples and sample values in the art.

FIG. 2 is a flow chart illustrating a method of determining a video fidelity measure for a video sequence 1, see also FIG. 1. The method comprises various steps S1 to S7 as shown in FIG. 2. These steps S1 to S7 are performed for at least one distorted picture 10 in the video sequence 1. The method comprises determining, in step S1, a distorted difference picture 30 as a pixel-wise difference between at least a portion 12 of the distorted picture 10 and at least a corresponding portion 13 of a preceding distorted picture 11 preceding the distorted picture 10 in the video sequence 1. The method also comprises determining, in step S2, an original difference picture 40 as a pixel-wise difference between at least a corresponding portion 22 of an original picture 20 and at least a corresponding portion 23 of a preceding original picture 21 preceding the original picture 20. The method further comprises determining, in step S3, a first map representing, for each pixel 14 in the at least a portion 12 of the distorted picture 10, a distortion in pixel values between the pixel 14 and a corresponding pixel 24 in the original picture 20. The method also comprises determining, in step S4, a second map representing, for each pixel 34 in the distorted difference picture 30, a distortion in pixel values between the pixel 34 and a corresponding pixel 44 in the original difference picture 40. The method additionally comprises determining, in step S5, a third map as an aggregation of a fourth map representing, for each pixel 14 in the at least a portion 12 of the distorted picture 10, a local variability in pixel values and a fifth map representing, for each corresponding pixel 24 in the original picture 20, a local variability in pixel values. Step S6 correspondingly comprises determining a sixth map as an aggregation of a seventh map representing, for each pixel 34 in the distorted difference picture 30, a local variability in pixel values and an eighth map representing, for each corresponding pixel 44 in the original difference picture 40, a local variability in pixel values. The method further comprises determining the video fidelity measure based on the first map, the second map, the third map and the sixth map in step S7.

Steps S1 and S2, steps S3 and S4, and steps S5 and S6 of FIG. 2 can be performed serially in any order, e.g., step S1 prior to step S2 or step S2 prior to step S1, or at least partly in parallel. Correspondingly, steps S3+S4 and steps S5+S6 could be performed serially in any order or at least partly in parallel.

Corresponding pixel 24, 34, 44 as used herein indicates a pixel 24, 34, 44 in the preceding distorted picture 11, the original picture 20, the preceding original picture 21, the distorted difference picture 30 and/or the original difference picture 40 having the same coordinate or position in the preceding distorted picture 11, the original picture 20, the preceding original picture 21, the distorted difference picture 30 and/or the original difference picture 40 as a pixel 14 has in the distorted picture 10. For instance, a pixel 14 having the coordinate (i,j) in the distorted picture 10 has a corresponding pixel 24 with the coordinate (i,j) in the original picture 20 and a corresponding pixel 34, 44 with the coordinate (i,j) in the distorted difference picture 30 or in the original difference picture 40.

The video fidelity measure of the embodiments is based on a spatial component reflecting distortions in pixel values in a spatial domain, i.e., between an original picture 20 prior to the distortion-causing picture or video processing and a distorted version of the original picture 20 following the distortion-causing picture or video processing, i.e., the distorted picture 10 in FIG. 1. Hence, the distorted picture 10 in the (output) video sequence 1 is a distorted or degraded version of the original picture 20 in the (input) video sequence 2. Correspondingly, the preceding distorted picture 11 in the (output) video sequence 1 is a distorted or degraded version of the preceding original picture 21 in the (input) video sequence 2. Hence, the distorted picture 10 has a same picture or frame number as the original picture 20, and the preceding distorted picture 11 has a same picture or frame number as the preceding original picture 21.

The spatial component of the video fidelity measure is represented by the first map determined in step S3 and the third map determined in step S5.

The video fidelity measure of the embodiments is also based on a temporal component reflecting distortions in pixel values in a temporal domain, i.e., between an original difference picture 30 and a distorted version of this original difference picture 30, i.e., the distorted difference picture 40. The distorted difference picture 30 is obtained based on pixel-wise differences between the at least a portion 12 of the distorted picture 10 and the at least a corresponding portion 13 of a distorted picture preceding the distorted picture 10 in the video sequence 1, i.e., the preceding distorted picture 11. Correspondingly, the original difference picture 40 is obtained based on pixel-wise differences between the at least a corresponding portion 22 of the original picture 20 and the at least a corresponding portion 23 of an original picture preceding the original picture 20 in the video sequence 2, i.e., the preceding original picture 21.

"Preceding" as used herein relates to an order of distorted pictures 10, 11 and of original pictures 20, 21 in the video sequence 1, 2. In an embodiment, preceding as used herein relates to an output or display order. For instance, the original pictures 20, 21 of the video sequence 2 may be encoded in a video encoder in a so-called coding order. The bitstream of encoded original pictures may then be decoded in a video decoder in a so-called decoding order, which is the same as the coding order, to obtain the distorted pictures 10, 11. The distorted pictures 10, 11 may then be displayed on a screen or are otherwise output for some other purpose than display. These distorted pictures 10, 11 are then displayed or output in a so-called display or output order. This display or output order is typically the same as the order in which the original pictures 20, 21 are input to the video encoder, i.e., the order in the video sequence 2. However, the display or output order may be different from the coding/decoding order. The display or output order is typically defined by picture or frame numbers of the original and distorted pictures 20, 21, 10, 11. An example of such a picture or frame number is picture order count (POC).

The preceding distorted/original picture 11, 21 thereby preferably precedes the distorted/original picture 10, in the video sequence 1, 2 in display order. For instance, if the distorted picture 10 and thereby the original picture 20 has the picture or frame number t, then the preceding distorted picture 11 and thereby the preceding original picture 21 has picture or frame number t-k, where t, k are integers. In a particular embodiment k=1, i.e., the preceding distorted picture 11 is directly or immediately preceding the distorted picture 10 in the video sequence 1 and the preceding original picture 21 is directly or immediately preceding the original picture 20 in the video sequence 2. In other embodiments, k is a positive integer larger than one, i.e., the preceding distorted/original picture 11, 21 are further past distorted/original pictures in the video sequence 1, 2.

The temporal component of the video fidelity measure is represented by the second map determined in step S4 and the sixth map determined in step S6.

The first and second maps determined in steps S3 and S4 are preferably both representing distortions in pixel values. The difference between these maps is that the first map relates to the spatial domain, whereas the second map relates to the temporal domain. Correspondingly, the third and sixth maps determined in steps S5 and S6 preferably both correlate with visual attention or saliency, i.e., where humans tend to fixate while looking at the distorted pictures 10, 11, and thereby indicate picture regions that are important for the HVS. The difference between these maps is that the third map relates to the spatial domain, whereas the sixth map relates to the temporal domain.

The processing in steps S4 and S6 with regard to determining respective maps is preferably substantially the same as the processing in steps S3 and S5 but with the difference in that in steps S3 and S5 pixel values in the distorted picture 10 and the original picture 20 are used in the determinations of the first and third maps, whereas in steps S4 and S6 pixel values in the distorted difference picture 30 and the original difference picture 40 are used in the determinations of the second and sixth maps.

The video fidelity measure of the embodiments is based on four maps determined for at least a portion 12 of the distorted picture 10. "Map" as used herein represents a data set having the same resolution as the at least a portion 12 of the distorted picture 10 in terms of number of data entries and pixels. In more detail, the at least a portion 12 of the distorted picture 10 could as an illustrative, but non-limiting, example be defined as comprising m×n pixels 14 having a respective pixel value for some integer values m, n. The map then has the same resolution, i.e., m×n data entries, one such data entry for each pixel 14 in the at least a portion 12 of the distorted picture 10. The map could thereby be regarded as an array, such as a two-dimensional (2D) array, or a matrix with data entries and where the array or matrix has the same resolution as the pixel-resolution of the at least a portion 12 of the distorted picture 10.

The first and second maps determined in step S3, S4 represent distortions in pixel values, i.e., degradations or differences in pixel values between pixels 14 in the at least a portion 12 of the distorted picture 10 and corresponding pixels 24 in a corresponding portion 22 of the original picture 20 or degradations or differences in pixel values between pixels 34 in the distorted difference picture 30 and corresponding pixels 44 in the original difference picture 40. This first and second maps thereby reflect differences in pixel values between the original picture 20 and the distorted picture 10 or between the original difference picture 40 and the distorted difference picture 30 and where such differences are due to the picture or video processing applied to the original pictures 20, 21 to form the distorted pictures 10, 11 as a distorted or degraded version of the original pictures 20, 21. The third and sixth map as determined in steps S5 and S6 are included in the determination of the video fidelity measure since errors across the distorted picture 10, i.e., distortion in pixel values, do not have the same visual impact for the human visual system (HVS). The third and sixth maps correlate with visual attention or saliency, i.e., where humans tend to fixate while looking at the pictures, and thereby indicates picture regions that are important for the HVS. The third and sixth maps can thereby be used to weight the distortions in the first and second maps more heavily in important picture regions as compared to in other regions of the distorted picture 10 that are of less importance for the HVS. As a result, a video fidelity measure that is adapted to the HVS is obtained.

The third map is determined in step S5 as an aggregation of the fourth map and the fifth map and the sixth map is determined in step S6 as an aggregation of the seventh map and the eighth map. The fourth and fifth maps represent respective local variability in pixel values in the distorted picture 10 and the original picture and the seventh and the eighth maps represent respective local variability in pixel values in the distorted difference picture 30 and the original difference picture 40. This local variability in pixel values with regard to a pixel 14 in the distorted picture 10, a corresponding pixel 24 in the original picture 20, a corresponding pixel 34 in the distorted difference picture 30 or a corresponding pixel 44 in the original difference picture 40 corresponds to a variability in pixel values in a neighborhood in the distorted picture 10, the original picture 20, the distorted difference picture 30 or the original difference picture 40 relative to the pixel 14 or the corresponding pixel 24, 34, 44. For instance, local variability in pixel values with regard to a pixel 14 in the distorted picture 10 reflects how and/or how much pixel values of neighboring or adjacent pixels 14 in the distorted picture 10 vary.

In an embodiment, the first map determined in step S3 is a first distortion map representing, for each pixel 14 in the at least a portion 12 of the distorted picture 10, a distortion in pixel values between the pixel 14 and the corresponding pixel 24 in the original picture 20. The second map determined in step S4 is a second distortion map representing, for each pixel 34 in the distorted difference picture 30, a distortion in pixel values between the pixel 34 and the corresponding pixel 44 in the original difference picture 40. The third map determined in step S5 is a first visual importance map determined as an aggregation of a first variability map representing, for each pixel 14 in the at least a portion 12 of the distorted picture 10, the local variability in pixel values and a second variability map representing, for each corresponding pixel 24 in the original picture 20, the local variability in pixel values. The sixth map determined in step S6 is a second visual importance map determined as an aggregation of a third variability map representing, for each pixel 34 in the distorted difference picture 30, the local variability in pixel values and a fourth variability map representing, for each corresponding pixel 44 in the original difference picture 40, the local variability in pixel values. In this embodiment, the video fidelity measure is determined based on the first and second distortion maps and the first and second visual importance maps.

The maps determined in FIG. 2 could be determined for at least a portion 12 of the distorted picture 10 as mentioned above. This portion 12 could then constitute a part of, but not the whole, distorted picture 10. The portion 12 could for instance correspond to a macroblock of pixels 14, a block of pixels 14, a coding block, a coding unit, a slice of a frame or picture or some other partition of a distorted picture 10 into a group or set of pixels 14.

In another embodiment, the maps are determined for the whole distorted picture 10 and thereby the whole original picture 20. In such an embodiment, step S1 comprises determining the distorted difference picture as a pixel-wise difference between the distorted picture 10 and the preceding distorted picture 11 in the video sequence 1. Step S2 comprises, in this embodiment, determining the original difference picture 40 as a pixel-wise difference between the original picture 20 and the preceding original picture 21. In this embodiment, step S3 comprises determining the first map representing, for each pixel 14 in the distorted picture 10, a distortion in pixel values between the pixel 14 and the corresponding pixel 24 in the original picture 20. Step S5 comprises, in this embodiment, determining the third map as an aggregation of the fourth map representing, for each pixel 14 in the distorted picture 10, the local variability in pixel values and the fifth map representing, for each corresponding pixel 24 in the original picture 20, the local variability in pixel values.

The distorted difference picture 30 is determined in step S1 as a pixel-wise difference between the at least a portion 12 of the distorted picture 10 and the at least a corresponding portion 13 of the preceding distorted picture 11, e.g., $I_{\Delta 1,t}(i,j)=I_{1,t}(i,j)-I_{1,t-1}(i,j)$, wherein $I_{1,t}(i,j)$ denotes a pixel value of a pixel 14 at coordinate or position (i,j) in the distorted picture 10 and $I_{1,t-1}(i,j)$ denotes a pixel value of a corresponding pixel at coordinate or position (i,j) in the preceding distorted picture 11. The original difference picture 40 is correspondingly determined in step S2 as a pixel-wise difference between the at least a corresponding portion 22 of the original picture 20 and the at least a corresponding portion 23 of the preceding original picture 21, e.g., $I_{\Delta 2,t}(i,j)=I_{2,t}(i,j)-I_{2,t-1}(i,j)$, wherein $I_{2,t}(i,j)$ denotes a pixel value of a pixel 24 at coordinate or position (i,j) in the original picture 20 and $I_{2,t-1}(i,j)$ denotes a pixel value of a corresponding pixel at coordinate or position (i,j) in the preceding original picture 21. In the following, $I_{1/2}(i,j)$ and $I_{\Delta 1/\Delta 2}(i,j)$ are used to represent $I_{1/2,t}(i,j)$ and $I_{\Delta 1/\Delta 2,t}(i,j)$, i.e., omitting the t subscripts.

The first and second maps determined in steps S3 and S4 represent distortions in pixel values. Such distortions thereby reflect differences or degradations in pixel values caused by the picture or video processing applied to the original pictures 20, 21 to obtain the distorted pictures 10, 11 as respective distorted or degraded versions of the original pictures 20, 21. The first map could thereby be defined as $f_1(I_1(i,j), I_2(i,j))$, such as $f_1(I_1(i,j)-I_2(i,j))$, for some function $f_1(x,y)$. The second map could correspondingly be defined as $f_2(I_{\Delta 1}(i,j), I_{\Delta 2}(i,j))$, such as $f_2(I_{\Delta 1}(i,j) I_{\Delta 2}(i,j))$, for some function $f_2(x,y)$, wherein $I_{\Delta 1}(i,j)$ denotes a pixel value of a pixel 34 at coordinate or position (i,j) in the distorted difference picture 30 and $I_{\Delta 2}(i,j)$ denotes a pixel value of a corresponding pixel 44 at coordinate or position (i,j) in the original difference picture 40. The two functions $f_1(x,y)$, $f_2(x,y)$ may be different functions. However, in a preferred embodiment the two functions are the same function, i.e., $f_1(x,y)=f_2(x,y)=f(x,y)$, Hence, in an embodiment, the first map is a function of pixel-wise differences in pixel values between pixels 14 in the at least a portion 12 of the distorted picture 10 and corresponding pixels 24 in the original picture 20 and the second map is a function of pixel-wise differences in pixel values between pixels 34 in the distorted difference picture 30 and corresponding pixels 44 in the original difference picture 40.

Various functions $f_1(x)$, $f_2(x)$ could be used in steps S3 and S4 to determine the first and second maps. For instance, step S3 could comprise determining the first map representing, for each pixel 14 in the at least a portion 12 of the distorted picture 10, an absolute difference in pixel values between the pixel 14 and the corresponding pixel 24 in the original picture 20, e.g., $f_1(|I_1(i,j)-I_2(i,j)|)$. Step S4 then preferably comprises determining the second map representing, for each pixel 34 in the distorted difference picture 30, an absolute difference in pixel values between the pixel 34 and the corresponding pixel 44 in the original difference picture 40, e.g., $f_2(|I_{\Delta 1}(i,j)-I_{\Delta 2}(i,j)|)$.

In a particular embodiment, step S3 comprises determining the first map $DM_1(i,j)$ based on, such as equal to, $|I_1(i,j)-I_2(i,j)|^p$, wherein p is a positive power parameter, and step S4 comprises determining the second map $DM_2(i,j)$ based on, such as equal to, $|I_{\Delta 1}(i,j)-I_{\Delta 2}(i,j)-I_{\Delta 2}(i,j)|^p$.

The power parameter p is a positive number larger than zero. This power parameter can be used to enhance small differences in pixel values and/or saturate large differences in pixel values. Generally, a large value of the power parameter enhances large differences in pixel values, while suppressing small differences in pixel values, whereas a small value of the power parameter instead enhances small differences in pixel values while saturating larger such differences in pixel values between pixels 14, 34 in the distorted picture 10 or the distorted difference picture 30 and corresponding pixels 24, 44 in the original picture 20 or the original difference picture 40.

In an embodiment, the power parameter p is within a range of from 0.0001 up to 0.50, preferably within a range of from 0.005 up to 0.30, and more preferably within a range of from 0.01 up to 0.20. For instance, the power parameter p could be 0.025, which has been optimized on training video quality assessment (VQA) databases for H.264 distortion type.

Other functions $f_1(x)$ could be used in step S3 to determine the first map, such as Minkowski distance $|I_1(i,j)-I_2(i,j)|^a$ using, for instance, a power parameter $a=0.5$ or $a=1$, the latter ($a=1$) also denoted City-Block metric; Lorentzian norm equation $\log(1+|I_1(i,j)-I_2(i,j)|)$; Jensen difference $$(I_2(i,j) \times \log(I_2(i,j)) + I_1(i,j) \times \log(I_1(i,j)))/2 - \left(\frac{(I_1(i,j)+I_2(i,j))}{2}\right) \times \log(I_1(i,j)+I_2(i,j))/2;$$

or Topsoe difference $$I_2(i,j) \times \log\left(2 \times \frac{I_2(i,j)}{I_1(i,j)+I_2(i,j)}\right) + I_1(i,j) \times \log\left(2 \times \frac{I_1(i,j)}{I_1(i,j)+I_2(i,j)}\right).$$

These same functions could also be used in step S4 to determine the second map by replacing $I_1(i,j)$, $I_2(i,j)$ by $I_{A1}(i,j)$, $I_{A2}(i,j)$.

Step S5 in FIG. 2 determines the third map $VIM_1(i,j)$ as an aggregation of the fourth map $VM_1(i,j)$ and fifth map $VM_2(i,j)$, e.g., $VIM_1(i,j)=(VM_1(i,j),VM_2(i,j))$ for some aggregation function $g_1(x,y)$. Correspondingly, step S6 comprises determining the sixth map $VIM_2(i,j)$ as an aggregation of the seventh map $VM_3(i,j)$ and eighth map $VM_4(i,j)$, e.g., $VIM_2(i,j)=g_2(VM_3(i,j),VM_4(i,j))$ for some aggregation function $g_2(x,y)$. In a particular embodiment, $g_1(x,y)=g_2(x,y)=g(x,y)$. In an embodiment, the aggregation is an aggregation of pixel-wise maxima of the fourth map $VM_1(i,j)$ and the fifth map $VM_2(i,j)$, $VIM_1(i,j)=\max(VM_1(i,j),VM_2(i,j))$, and of the seventh map $VM_3(i,j)$ and the eighth map $VM_4(i,j)$, $VIM_2(i,j)=\max(VM_3(i,j),VM_4(i,j))$. In this embodiment, the third map thereby reflects, in each pixel or coordinate (i,j), the maximum local variability in pixel values for the given pixel 14, 24 or coordinate (i,j) in the distorted picture 10 and in the original picture 20 and the sixth map thereby reflects, in each pixel or coordinate (i,j), the maximum local variability in pixel values for the given pixel 34, 44 or coordinate (i,j) in the distorted difference picture 30 and in the original difference picture 40

The embodiments are, however, not limited to pixel-wise maxima as an example of aggregation of the third and fourth maps or the seventh and eighth maps. Other examples include arithmetic mean or average $VIM_{1/2}(i,j)=(VM_{1/3}(i,j)+VM_{2/4}(i,j))/2$, geometric mean $VIM_{1/2}(i,j)=\sqrt{VM_{1/3}(i,j) \times VM_{2/4}(i,j)}$, harmonic mean $VIM_{1/2}(i,j)=VM_{1/3}(i,j) \times VM_{2/4}(i,j)/(VM_{1/3}(i,j)+VM_{2/4}(i,j))$, $VIM_{1/2}(i,j)=(\sqrt{VM_{1/3}(i,j)}+\sqrt{VM_{2/4}(i,j)})^2$ or $VIM_{1/2}(i,j)=\sqrt{VM_{1/3}(i,j)+VM_{2/4}(i,j)}$ as illustrative, but non-limiting, further examples.

As mentioned in the foregoing, the local variability as represented by the fourth and fifth maps, and the seventh and eighth maps is preferably the local variability in pixel values in a pixel neighborhood in the distorted picture 10 and the original picture 20, and in the distorted difference picture 30 and the original difference picture 40, respectively. In an embodiment, step S5 therefore comprises determining the third map as the aggregation of the fourth map representing, for each pixel 14 in the at least a portion 12 of the distorted picture 10, the local variability in pixel values in a pixel neighborhood of the pixel 14 in the distorted picture 10 and the fifth map representing, for each corresponding pixel 24 in the original picture 20, the local variability in pixel values in a pixel neighborhood of the corresponding pixel 24 in the original picture 20. In this embodiment, step S6 comprises determining the sixth map as the aggregation of the seventh map representing, for each pixel 34 in the distorted difference picture 30, the local variability in pixel values in a pixel neighborhood of the pixel 34 in the distorted difference picture 30 and the eighth map representing, for each corresponding pixel 44 in the original difference picture 40, the local variability in pixel values in a pixel neighborhood of the corresponding pixel 44 in the original difference picture 40

Various local variabilities in pixel values could be used according to the embodiments. For instance, the fourth and fifth maps, and the seventh and eighth maps could represent the local variance in pixel values in the distorted picture 10 and the original picture 20, and in the distorted difference picture 30 and the original difference picture 40, respectively. In such an embodiment, step S5 comprises determining the third map as the aggregation of the fourth map representing, for each pixel 14 in the at least a portion 12 of the distorted picture 10, a local variance in pixel values and the fifth map representing, for each corresponding pixel 24 in the original picture 20, a local variance in pixel values. This embodiment also comprises determining, in step S6, the sixth map as the aggregation of the seventh map representing, for each pixel 34 in the distorted difference picture 30, a local variance in pixel values and the eighth map representing, for each corresponding pixel 44 in the original difference picture 40, a local variance in pixel values.

In an embodiment, the fourth map $VM_1(i,j)$ is equal to the local variance in pixel values, i.e., $VM_1(i,j)=var_1(i,j)$, wherein $var_1(i,j)$ is a first variance map representing the local variance in pixel values in a pixel neighborhood of a pixel 14 at coordinate (i,j) in the distorted picture 10 and the fifth map $VM_2(i,j)$ is equal to the local variance in pixel values, i.e., $VM_2(i,j)=var_2(i,j)$, wherein $var_2(i,j)$ is a second variance map representing the local variance in pixel values in a pixel neighborhood of the corresponding pixel 24 at coordinate (i,j) in the original picture 20. In this embodiment, the seventh map $VM_3(i,j)$ is equal to the local variance in pixel values, i.e., $VM_3(i,j)=var_3(i,j)$, wherein $var_3(i,j)$ is a third variance map representing the local variance in pixel values in a pixel neighborhood of a pixel 34 at coordinate (i,j) in the distorted difference picture 30 and the eighth map $VM_4(i,j)$ is equal to the local variance in pixel values, i.e., $VM_4(i,j)=var_4(i,j)$, wherein $var_4(i,j)$ is a fourth variance map representing the local variance in pixel values in a pixel neighborhood of the corresponding pixel 44 at coordinate (i,j) in the original difference picture 40.

In another embodiment, the fourth, fifth, seventh and eighth maps are based on respective non-linearly mapped and normalized local variances in pixel values. In this embodiment, step S5 comprises determining the third map as the aggregation of the fourth map representing, for each pixel 14 in the at least a portion 12 of the distorted picture 10, a non-linearly mapped and normalized local variance in pixel values and the fifth map representing, for each corresponding pixel 24 in the original picture 20, a non-linearly mapped and normalized local variance in pixel values. Step S6 comprises determining the sixth map as the aggregation of the seventh map representing, for each pixel 34 in the distorted difference picture 30, a non-linearly mapped and normalized local variance in pixel values and the eighth map representing, for each corresponding pixel 44 in the original difference picture 40, a non-linearly mapped and normalized local variance in pixel values.

FIG. 3 is a flow chart illustrating additional steps of the method in FIG. 2 according to a particular embodiment using non-linearly mapped and normalized local variances. The method continues from step S4 in FIG. 2. A next step S10 comprises determining a first variance map representing, for each pixel 14 in the at least a portion 12 of the distorted picture 10, a local variance in pixel values. Step S11 comprises determining a first variability map as a non-linearly mapped and normalized version of the first variance map. Step S12 comprises determining a second variance map representing, for each corresponding pixel 24 in the original picture 20, a local variance in pixel values and step S13 comprises determining a second variability map as a non-linearly mapped and normalized version of the second variance map. A next step S14 comprises determining a third variance map representing, for each pixel 34 in the distorted difference picture 30, a local variance in pixel values. Step S15 comprises determining a third variability map as a non-linearly mapped and normalized version of the third variance map. Step S16 comprises determining a fourth variance map representing, for each corresponding pixel 44 in the original difference picture 40, a local variance in pixel values and step S17 comprises determining a fourth variability map as a non-linearly mapped and normalized version of the fourth variance map.

Steps S10+S11, S12+S13, S14+S15 and S16+S17 can be performed serially in any order or at least partly in parallel. The method then continues to step S5 in FIG. 2, which comprises, in this embodiment, determining the third map as the aggregation of the first variability map and the second variability map and step S6 comprises, in this embodiment, determining the sixth map as the aggregation of the third variability map and the fourth variability map.

In a particular embodiment, step S11 of FIG. 3 comprises determining the first variability map $VM_1(i,j)$ based on, such as equal to, $$\frac{\text{var}_1(i,j)^q}{\sum_i \sum_j \text{var}_1(i,j)^q},$$

wherein $\text{var}_1(i,j)$ represents the first variance map and q is a positive power parameter. Step S13 correspondingly comprises, in this particular embodiment, determining the second variability map $VM_2(i,j)$ based on, such as equal to, $$\frac{\text{var}_2(i,j)^q}{\sum_i \sum_j \text{var}_2(i,j)^q},$$

wherein $\text{var}_2(i,j)$ represents the second variance map. In this particular embodiment, step S15 comprises determining the third variability map $VM_3(i,j)$ based on, such as equal to, $$\frac{\text{var}_3(i,j)^q}{\sum_i \sum_j \text{var}_3(i,j)^q},$$

wherein $\text{var}_3(i,j)$ represents the third variance map, and step S17 comprises determining the fourth variability map $VM_4(i,j)$ based on, such as equal to, $$\frac{\text{var}_4(i,j)^q}{\sum_i \sum_j \text{var}_4(i,j)^q},$$

wherein $\text{var}_4(i,j)$ represents the fourth variance map.

The parameter q defines the non-linearity of the variance maps. In an embodiment, q is within a range of from 0.05 up to 2.00, preferably within a range of from 0.10 up to 1.50, and more preferably within a range of from 0.20 up to 1.20. For instance, the parameter q could be 1.05, which has been optimized on training VQA databases for H.264 distortion type.

In a particular embodiment, step S10 of FIG. 3 comprises determining the first variance map $\text{var}_1(i,j)$ based on, such as equal to, $N^2 \sum_{k=-M}^{M} \sum_{l=-M}^{M} I_1(i-k,j-l)^2 - (\sum_{k=-M}^{M} \sum_{l=-M}^{M} I_1(i-k,j-l))^2$, wherein $$M = \frac{N-1}{2}$$

and N is a positive odd integer, and step S12 correspondingly comprises determining the second variance map $\text{var}_2(i,j)$ based on, such as equal to, $N^2 \sum_{k=-M}^{M} \sum_{l=-M}^{M} I_2(i-k,j-l)^2 - (\sum_{k=-M}^{M} \sum_{l=-M}^{M} I_2(i-k,j-l))^2$. In this particular embodiment, step S14 comprises determining the third variance map $\text{var}_3(i,j)$ based on, such as equal to, $\sum_{k=-M}^{M} \sum_{l=-M}^{M} I_{\Delta 1}(i-k,j-l)^2$, and step S16 correspondingly comprises determining the fourth variance map $\text{var}_4(i,j)$ based on, such as equal to, $\sum_{k=-M}^{M} \sum_{l=-M}^{M} I_{\Delta 2}(i-k,j-l)^2$.

The positive odd parameter N defines the size of the pixel neighborhood, within which the local variance is determined. The positive odd parameter N is preferably larger than one and is, preferably selected among the group consisting of 3, 5, 7, 9, 11 and 13, more preferably selected among the group consisting of 3, 5, 7 and 9, such as selected among the group consisting of 3, 5 and 7, and more preferably being 3 or 5. For instance, the parameter N could be 5, which has been optimized on training VQA databases for H.264 distortion type.

In the above presented particular embodiment, the local variance is determined using a box filter, i.e., uniform filter, having a filter size as defined by the positive odd parameter N. Other types of filters could be used to calculate the local variance, such as a plus or cross-shaped filters, Gaussian filters, or binomial filters.

In the above described particular embodiments, the third map, also referred to as first visual importance map, is determined as an aggregation of the fourth map, also referred to as first variability map, and the fifth map, also referred to as the second variability map, wherein the first and second variability maps are determined as non-linearly mapped and normalized versions of the first and second variance maps. Correspondingly, the sixth map, also referred to as second visual importance map, is determined as an aggregation of the seventh map, also referred to as third variability map, and the eighth map, also referred to as the fourth variability map, wherein the third and fourth variability maps are determined as non-linearly mapped and normalized versions of the third and fourth variance maps.

In other embodiments, the first to fourth variability maps could instead represent standard deviation in the pixel neighborhoods, such as $VM_{1-4}(i,j)=\sqrt{var_{1-4}(i,j)}$. Instead of determining variability maps as representing local variance in pixel values, such as non-linearly mapped and normalized local variance in pixel values, the variability maps may represent other types of local variability in pixel values, such as contrast $f_2$ as defined under Textural Features 2) Contrast on page 619 in [7], correlation $f_3$ as defined under Textural Features 3) Correlation on page 619 in [7] or information measure of correlation $f_{12}$ as defined under Textural Features 12) Information Measures of Correlation on page 619 in [7], the teaching of which with regard to calculating contrast $f_2$, correlation $f_3$ and information measure of correlation $f_{12}$ is hereby incorporated by reference.

In an embodiment, step S7 in FIG. 2 is performed as illustrated in FIG. 4. In this embodiment, the method continues from step S6 in FIG. 2. A next step S20 comprises determining a ninth map, also referred to as first visual distortion map, by weighting pixel-wise the first map by the third map. A next step S21, which could be performed prior to, following or at least partly in parallel with step S20, comprises determining a tenth map, also referred to as second visual distortion map, by weighting pixel-wise the second map by the sixth map. The video fidelity measure is then determined in step S26 based on the ninth map and the tenth map.

"Pixel-wise weighting" the first/second map by the third/sixth map implies that a value at coordinate or pixel (i,j) in the first/second map is weighted by a weight corresponding to the value at coordinate or pixel (i,j) in the third/sixth map. Hence, the pixel-wise weighting is a coordinate-wise or position-wise weighting.

In an embodiment, step S20 comprises determining the ninth map $VDM_1(i,j)=VIM_1(i,j)\times DM_1(i,j)$, wherein $DM_1(i,j)$ represents the first map, also referred to as first distortion map, and $VIM_1(i,j)$ represents the third map, also referred to as first visual importance map. Step S21 comprises, in this embodiment, determining the tenth map $VDM_2(i,j)=VIM_2(i,j)\times DM_2(i,j)$, wherein $DM_2(i,j)$ represents the second map, also referred to as second distortion map, and $VIM_2(i,j)$ represents the sixth map, also referred to as second visual importance map.

Hence, the first or second visual distortion map is preferably constructed by weighting pixel-wise the first or second distortion map by the first or second visual importance map. This means that distortions in pixel regions that are of high HVS importance can be weighted heavier as compared to distortions in other less important pixel regions in the distorted picture 10 or the distorted difference picture 30.

In an embodiment, the method comprises an additional step S22 as indicated in FIG. 4. This step S22 comprises determining a first mean error $ME_1(I_1,I_2)$ based on a sum of the ninth map $\Sigma_i\Sigma_j VDM_1(i,j)$, wherein $I_1, I_2$ represent pixel values and (i,j) represents a coordinate of a pixel 14 in the distorted picture 10 and of a corresponding pixel 24 in the original picture 20. The method also comprises a next step S23, which comprises determining a second mean error $ME_2(I_{\Delta 1}, I_{\Delta 2})$ based on a sum of the tenth map $\Sigma_i\Sigma_j VDM_2(i,j)$, wherein $I_{\Delta 1}, I_{\Delta 2}$ represent pixel values and (i,j) represents a coordinate of a pixel 34 in the distorted difference picture 30 and of a corresponding pixel 44 in the original difference picture 40. The method then continues to step S26, which comprises, in this embodiment, determining the video fidelity measure based on the first mean error and the second mean error. Steps S22 and S23 can be performed serially in any order or at least partly in parallel.

In the case of grayscale pictures 10, 11, 20, 21, or when there is a desire to reduce the computations, only the mean error for one type of pixel value is calculated and is used as video fidelity measure. This type of pixel value is then preferably pixel values for the intensity channel, such as being a luma value (Y'), a luminance value (Y) or an intensity value (I).

In the case of color pictures, the above described process of calculating mean errors is preferably performed on all three color channels, such as intensity channel (Y', Y or I) and chromatic channels, i.e., chroma values (Cb, Cr) or chromaticity values (X, Z).

In this embodiment, step S22 preferably comprises determining a first mean error $ME_1(Y_1,Y_2)$ for an intensity channel and first mean errors $ME_1(U_1,U_2)$, $ME_1(V_1,V_2)$ for chromatic channels. $Y_{1/2}$ represents luma (Y'), luminance (Y) or intensity (I) channels for the distorted picture 10/original picture 20 and $U_{1/2}, V_{1/2}$ represent chroma (Cb, Cr) or chromaticity (X, Z) channels for the distorted picture 10/original picture 20. Step S23 comprises, in this embodiment, determining a second mean error $ME_2(Y_{\Delta 1}, Y_{\Delta 2})$ for an intensity channel and second mean errors $ME_2(U_{\Delta 1}, U_{\Delta 2})$, $ME_2(V_{\Delta 1}, V_{\Delta 2})$ for chromatic channels. $Y_{\Delta 1/\Delta 2}$ represents luma (Y'), luminance (Y) or intensity (I) channels for the distorted difference picture 30/original difference picture 40 and $U_{\Delta 1/\Delta 2}, V_{\Delta 1/\Delta 2}$ represent chroma (Cb, Cr) or chromaticity (X, Z) channels for the distorted difference picture 30/original difference picture 40. In this embodiment, step S26 comprises determining the video fidelity measure based on the first mean error for the intensity channel, the first mean errors for the chromatic channels, the second mean error for the intensity channel and the second mean errors for the chromatic channels.

In a particular embodiment, the method comprises additional steps S24 and S25 as shown in FIG. 4. These steps can be performed serially in any order or at least partly in parallel. Step S24 comprises determining a first picture quality rating $PQR_1(I_1,I_2)$ based on a normalized linear combination of the first mean error for the intensity channel and the first mean errors for the chromatic channels. Step S25 comprises determining a second picture quality rating $PQR_2(I_{\Delta 1},I_{\Delta 2})$ based on a normalized linear combination of the second mean error for the intensity channel and the second mean errors for the chromatic channels. In this embodiment, step S26 comprises determining the video fidelity measure based on a combination of the first picture quality rating and the second picture quality rating.

In a particular embodiment, step S24 comprises determining the first picture quality rating based on, such as equal to, $$c\times n_Y \times ME_1(Y_1, Y_2) + (1-c)\times n_C \times \frac{ME_1(U_1, U_2) + ME_1(V_1, V_2)}{2},$$

wherein c is a positive number larger than 0 but smaller than 1 and $n_Y$, $n_C$ are normalization coefficients defined based on the bit depth of the distorted picture 10 and the original picture 20. Step S25 comprises, in this particular embodiment, determining the second picture quality rating based on, such as equal to, $$c \times n_{\Delta Y} \times ME_2(\Delta Y_{\Delta 1}, \Delta Y_{\Delta 2}) +$$
$$(1-c) \times n_{\Delta C} \times \frac{ME_2(U_{\Delta 1}, U_{\Delta 2}) + ME_2(V_{\Delta 1}, \Delta V_{\Delta 2})}{2},$$

wherein $n_{\Delta Y}$, $n_{\Delta C}$ are normalization coefficients defined based on the bit depth of the distorted difference picture 30 and the original difference picture 40.

The linearization parameter c, also referred to as convex mixing parameter, is preferably within a range of from 0.10 up to 0.95, preferably within a range of from 0.30 up to 0.90, and more preferably within a range of from 0.50 up to 0.90. For instance, the parameter c could be 0.69, which has been optimized on training VQA databases for H.264 distortion type.

The normalization coefficients $n_Y$, $n_C$, $n_{\Delta Y}$, $n_{\Delta C}$ are defined based on the bit depth of the distorted picture 10 and the original picture 20 ($n_Y$, $n_C$) or the bit depth of the distorted difference picture 30 and the original difference picture 40 ($n_{\Delta Y}$, $n_{\Delta C}$) and, optionally also based on the encoding scheme used for encoding the reference pictures 20.

In an embodiment, the normalization coefficients $n_Y$, $n_C$ are defined by $n_Y=(219\cdot 2^{BD-8})^{-p}$, $n_C=(224\cdot 2^{BD-8})^{-p}$, wherein BD is the bit depth of the color channels and p is the previously described positive power parameter. Correspondingly, the normalization coefficients $n_{\Delta Y}$, $n_{\Delta C}$ are defined by $n_{\Delta Y}=(2\cdot 219\cdot 2^{BD-8})^{-p}$, $n_{\Delta C}=(2\cdot 224\cdot 2^{BD-8})^{-p}$.

In the case of color pictures, it is generally preferred to calculate a respective mean error for each color channel and then combine the mean errors into the picture quality rating as mentioned above. However, in order to reduce the execution time, the processing can be simplified by, for instance, avoiding calculating mean errors for the chromatic channels and thereby only for the intensity channel. This corresponds to setting the parameter c to one.

In an embodiment, step S26 comprises determining the video fidelity measure based on $$(d \times PQR_1(I_1, I_2)^r + (1-d) \times PQR_2(I_{\Delta 1}, I_{\Delta 2})^r)^{\frac{1}{r}},$$

wherein d is a positive number larger than 0 but smaller than 1 and r is a positive power parameter.

The linearization parameter d, also referred to as convex mixing parameter, is preferably within a range of from 0.10 up to 0.95, preferably within a range of from 0.30 up to 0.90, and more preferably within a range of from 0.50 up to 0.90. For instance, the parameter d could be 0.70, which has been optimized on training VQA databases for H.264 distortion type.

The power parameter r is preferably within a range of from 0.001 up to 1.5, preferably within a range of from 0.005 up to 1.25, and more preferably within a range of from 0.01 up to 1.00. For instance, the power parameter r could be 0.08, which has been optimized on training VQA databases for H.264 distortion type.

Also other embodiments of combining or aggregating the spatial component (first picture quality rating $PQR_1(I_1,I_2)$) and the temporal component (the second picture quality rating $PQR_2(I_{\Delta 1},I_{\Delta 2})$) into the video fidelity measure could be used according to the embodiments.

For instance, the video fidelity measure could be determined based on a maximum of the first picture quality rating and the second picture quality rating, i.e. $\max(PQR_1(I_1,I_2), PQR_2(I_{\Delta 1},I_{\Delta 2}))$. Further alternatives include determining the video fidelity measure based on an average of the first picture quality rating and the second picture quality rating, i.e. $(PQR_1(I_1,I_2)+PQR_2(I_{\Delta 1},I_{\Delta 2}))/2$, as geometric mean $\sqrt{PQR_1(I_1,I_2) \times PQR_2(I_{\Delta 1},I_{\Delta 2})}$, harmonic mean $PQR_1(I_1,I_2) \times PQR_2(I_{\Delta 1},I_{\Delta 2})/(PQR_1(I_1,I_2)+PQR_2(I_{\Delta 1},I_{\Delta 2}))$, $(\sqrt{PQR_1(I_1,I_2)}+\sqrt{PQR_2(I_{\Delta 1},I_{\Delta 2})})^2$ or $\sqrt{PQR_1(I_1,I_2)+PQR_2(I_{\Delta 1},I_{\Delta 2})}$ as illustrative, but non-limiting, further examples.

In an embodiment, steps S1 to S7 in FIG. 2 are performed for multiple, i.e., at least two, distorted pictures 10, 11 in the video sequence 1, which is schematically illustrated by the line L1 in FIG. 2. For instance, steps S1 to S7 could be performed for all distorted pictures 10, 11 in the video sequence 1 and as output from the picture or video processing. Alternatively, steps S1 to S7 could be performed for a subset of the distorted pictures 10, 11 in the video sequence 1.

Hence, in an embodiment, the method as shown in FIG. 2 comprises determining, in step S1 and for each distorted picture 10 among multiple distorted pictures 10, 11 in the video sequence 1, a distorted difference picture 30 as a pixel-wise difference between at least a portion 12 of the distorted picture 10 and at least a corresponding portion 13 of a preceding distorted picture 11 preceding the distorted picture in the video sequence 1. The method also comprises determining, in step S2 and for each distorted picture 10 among the multiple distorted pictures 10, 11, an original difference picture 40 as a pixel-wise difference between at least a corresponding portion 22 of an original picture 20 and at least a corresponding portion 23 of a preceding original picture 21 preceding the original picture 20. The method further comprises determining, in step S3 and for each distorted picture 10 among the multiple distorted pictures 10, 11, a first map representing, for each pixel 14 in the at least a portion 12 of the distorted picture 10, a distortion in pixel values between the pixel 14 and a corresponding pixel 24 in the original picture 20. The method additionally comprises determining, in step S4 and for each distorted picture 10 among the multiple distorted pictures 10, 11, a second map representing, for each pixel 34 in the distorted difference picture 30, a distortion in pixel values between the pixel 34 and a corresponding pixel 44 in the original difference picture 40. The method comprises determining, in step S5 and for each distorted picture 10 among the multiple distorted pictures 10, 11, a third map as an aggregation of a fourth map representing, for each pixel 14 in the at least a portion 12 of the distorted picture 10, a local variability in pixel values and a fifth map representing, for each corresponding pixel 24 in the original picture 20, a local variability in pixel values. The method also comprises determining, in step S6 and for each distorted picture 10 among the multiple distorted pictures 10, 11, a sixth map as an aggregation of a seventh map representing, for each pixel 34 in the distorted difference picture 30, a local variability in pixel values and an eighth map representing, for each corresponding pixel 44 in the original difference picture 40, a local variability in pixel values. The method further comprises determining, in step S7 and for each distorted picture 10 among the multiple distorted pictures 10, 11, a video fidelity measure for the distorted picture based on the first map, the second map, the third map and the sixth map.

In the case of a first distorted picture in the video sequence 1, then no preceding distorted picture and no preceding original picture are available. Accordingly, no temporal component can be determined for the video fidelity measure. In such a case, only the spatial component could be determined. This corresponds to omitting steps S1, S2, S4 and S6 in FIG. 2 and then determine the video fidelity measure based on the first map determined in step S3 and the third map determined in step S5 in FIG. 5. Correspondingly, in the embodiment shown in FIG. 5, steps S14 to S17 would then be omitted and steps S21, S23 and S25 could be omitted from the embodiment shown in FIG. 4.

A respective video fidelity measure is preferably determined for each of the multiple distorted pictures 10, 11. In such an embodiment, the method may comprise an additional, optional step as shown in FIG. 5. The method continues from step S7 in FIG. 2 or indeed from step S26 in FIG. 4. A next step S8 comprises selecting a video fidelity measure among the multiple video fidelity measures determined for the multiple distorted pictures 10, 11 as video fidelity measure for the video sequence 1.

In an embodiment, the selection in step S8 comprises selecting a video fidelity measure representing a lowest video fidelity among the multiple video fidelity measures. Generally, the higher value of the image fidelity measure, the lower the quality or fidelity. Hence, in such an embodiment step S8 comprises selecting the largest or highest video fidelity measure among the multiple video fidelity measures.

In another embodiment, the selection in step S8 comprises selecting an average or mean video fidelity measure of the multiple video fidelity measures. In this embodiment, the average video fidelity measure is thereby determined for the multiple distorted pictures 10, 11 in the video sequence 1. Another variant of this embodiment is to select the median of the multiple video fidelity measures in step S8.

In further embodiment, step S8 does not necessarily involve selecting a single video fidelity measure. In clear contrast, step S8 comprises selecting a range of video fidelity measures determined for multiple successive distorted pictures 10, 11 in the video sequence 1. For example, a user could be interested in obtaining video fidelity measures for a portion of the video sequence 1 containing, for instance generally hard to process, such as encode, video content. In such a case, video fidelity measures determined for the distorted pictures 10, 11 in this portion of the video sequence 1 could be selected in step S8.

In yet another embodiment, the multiple video fidelity measures are kept in a buffer or array, such as ring buffer or array, which is first sorted in ascending order, i.e., from smallest video fidelity measure to largest video fidelity measure. In this embodiment, a video fidelity measure corresponding to a position or index round(h×(BL−1)) is selected from the sorted buffer or array and used as video fidelity measure. In this case round(x) is a round-to-nearest integer function, h is an experimentally chosen parameter selected within a range of from 0.5 up to 1.0, preferably within a range of from 0.75 up to 1.0 and more preferably within a range of from 0.9 up to 1.0. For instance, the parameter h could be 0.998, which has been optimized on training VQA databases for H.264 distortion type. BL denotes the buffer or array length. In an embodiment, the buffer or array indexing follows C-based convention, i.e., indexing starts from 0.

The above presented embodiment is a probabilistic pooling and is essentially a percentile-based selection process. For short analysis intervals and h values close to 1, e.g., 0.998, the index will point to the last element in the sorted buffer or array. It is an expected behavior and corresponds to using the highest value, i.e., maximum video fidelity measure, as video fidelity measure for the video sequence 1.

Also other embodiments of selecting or temporally pooling video fidelity measures could be used according to the embodiments. Such other embodiments include Minkowski pooling $$\left(\frac{1}{L}\sum_{t=0}^{L-1} VQR_t^\gamma\right)^{\frac{1}{\gamma}},$$

wherein $VQR_t$, for video quality rating, represents the video fidelity measure for the $i^{th}$ distorted picture 10 in the video sequence 1, L represents the total number of distorted pictures 10, 11 in the video sequence 1 and γ is a Minkowski's power parameter that is larger than 2.

Another option is to apply an exponential smoothing filter, such as an autoregressive 1 (AR(1)) filter, such as $VQR'_t=\rho \times VQR_t+(1-\rho)\times VQR'_{t-1}$ for t>0 and in which $VQR'_0=VQR_0$. ρ is a smoothing factor close to 0, e.g., $\rho<10^{-2}$.

The mean opinion score (MOS) range and the differential MOS (DMOS) range are traditionally used in order to compare various video fidelity and quality metrics or measures.

In an embodiment, the method comprises an additional step S9 as shown in FIG. 6. The method then continues from step S7 in FIG. 2, step S26 in FIG. 4 or step S8 in FIG. 5. Step S9 comprises converting the video fidelity measure to a DMOS range or a MOS range.

In an embodiment, the video quality measure of the embodiments, denoted VQR here below, can be mapped to the DMOS range or scale according to:

$$DMOS(VQR) = \frac{100}{1+\exp(-\alpha_1(VQR-\alpha_2))} - \alpha_3,$$

$$\alpha_3 = \frac{100}{1+\exp(\alpha_1 \times \alpha_2)}$$

The alpha parameters $\alpha_1$, $\alpha_2$ are the solution of a non-linear least squares (NLS) fitting of scores produced by the present algorithm to human subjective quality judgement contained in the training picture databases. In an embodiment, the alpha parameter $\alpha_1$ is selected within the range of 7 and 15 and the alpha parameter $\alpha_2$ is selected within the range of 0.7 and 1.4. For instance, an alpha parameter $\alpha_1=9.7467$ and an alpha parameter $\alpha_2=1.2251$ have been optimized on training VQA databases for H.264 distortion type, and an alpha parameter $\alpha_1=11.5328$ and an alpha parameter $\alpha_2=1.0354$ have been optimized on training VQA databases for H.264 distortion type when using optional correction for integration area.

In an alternative embodiment, a standard sigmoidal mapping as suggested by the Video Quality Experts Group (VQEG) could be used to the DMOS scale, see equations 3 and 4 in [8]:

$$DMOS(VQR) = \beta_1\left(\frac{1}{2} - \frac{1}{1+\exp(\beta_2(VQR-\beta_3))}\right) + \beta_4 VQR + \beta_5$$

The calculated DMOS values can then be remapped to the MOS range or scale using the following equation:

$$MOS(DMOS(VQR))=\gamma_1 \times DMOS+\gamma_2$$

wherein $\gamma_1=-4/100$ and $\gamma_2=5$ are used to invert the DMOS scale and remap it to the [1, 5] MOS range.

This final video fidelity measure selected in step S8 in FIG. 5 represents spatio-temporally merged and temporally pooled distortion per pixel. For some viewing scenarios, a localized distortion, e.g., distorted in an 8×8 block of pixels, will have much bigger visual impact on small resolution videos, e.g., 176×144, than on bigger resolution videos, e.g., 3840×2160. For these scenarios, the video fidelity could should preferably assign to the same local distortion, a bigger importance on small resolution videos and decrease it with the increase in resolution. In the present video fidelity algorithm, denoted VIVIQA for visually important video and image quality assessment herein, this preferably happens automatically because of the normalization scheme introduced during VIM calculations.

However, after some point, increasing video resolution while keeping the same viewing distance should not reduce the importance of the distortion any further as once the distortion is noticeable in some picture area(s), inspecting the remaining picture areas will not lower already acquired sense of degradation and its magnitude. This behavior can be achieved by analyzing video resolution in terms of the viewing angles and using the concept of eye integration area.

Considering an optimal viewing distance where one pixel corresponds to one arc minute of visual angle [9], the angular dimensions (in degrees) of a picture (luma channel) become (H is picture height, W is picture width):

$$fX = \frac{W}{60}, fY = \frac{H}{60}, fArea = fX \cdot fY$$

Assuming that the human eye can integrate visual stimuli over a limited spatial extent Smax (default is 12° corresponding to the maximum angular dimension of the integration area as proposed in [10]), then adjusted picture or frame dimensions (smoothly limited to Smax) can be expressed as:

$$iX = \left(\frac{1}{fX^2} + \frac{1}{Smax^2}\right)^{-\frac{1}{2}}, iY = \left(\frac{1}{fY^2} + \frac{1}{Smax^2}\right)^{-\frac{1}{2}}, iArea = iX \cdot iY$$

Accumulating video fidelity measure (VQR) values over the above integration area and normalizing it by the original picture or frame angular size, results in a corrected VQR value (cVQR):

$$cVQR = \frac{iArea}{fArea} VQR$$

This formula can be also understood that for small video resolutions, i.e., smaller than the integration area, spatial integration of distortions over the entire picture is optimal, while for resolutions bigger than the integration area, the surplus of distorted pixels will have a limited impact over what was already detected and integrated.

It should be noted that Smax parameter does not necessarily need to correspond to the eye integration area, which is used for psychophysical experiments at the visibility threshold, and may be fine-tuned to a particular video database, which provides a variety of video resolutions in it. An initial value for this parameter could be set to 60°.

In this embodiment, the VQR measure input in the DMOS algorithm may thereby be replaced by the cVQR measure.

Some of the embodiments uses knowledge of the width and height of the original video. In some viewing scenarios and quality evaluation conditions, the exact video resolution may be unavailable and could, for instance, be inferred from knowledge of the dimensions of the display device and its viewing distance.

Such lack of knowledge of video resolution may be the result of a complicated video processing pipeline where videos are rescaled multiple times or in conditions where video fidelity evaluation should mimic conditions of subjective tests with human observers. In such scenarios, only the final resolution could be available, which may not correspond to the resolution in which the video was encoded and/or degraded, e.g., by rescaling both original and distorted videos in some part of the processing chain.

In order to assure consistency of the video fidelity measure across various video processing schemes, the videos may be rescaled in a way to mimic retinal image and this can be achieved when video dimension, display size and viewing distance are analyzed in terms of viewing angles.

Considering a display device characterized by the diagonal size ds and aspect ratio ar of the screen. The physical width dw and height dh of the screen can be calculated as:

$$dw=ds \cdot \cos(\cot^{-1}(ar)), dh=ds \cdot \sin(\cot^{-1}(ar))$$

If dd represents the distance to the display device in units of the device height, i.e., dd=3 means that distance is three display heights, then the physical distance to the display device is pd=dd·dh, and the following equation for the horizontal viewing angle $\theta_H$ holds:

$$\tan\left(\frac{\theta_H}{2}\right) = \frac{\frac{dw}{2}}{pd} = \frac{1}{2}\frac{dw}{dd \cdot dh} = \frac{ar}{2dd} \Rightarrow \theta_H = 2\tan^{-1}\left(\frac{ar}{2dd}\right) \text{ [rad]}$$

Similarly, for the vertical viewing angle $\theta_v$:

$$\tan\left(\frac{\theta_V}{2}\right) = \frac{\frac{dh}{2}}{pd} = \frac{1}{2}\frac{dh}{dd \cdot dh} = \frac{1}{2dd} \Rightarrow \theta_V = 2\tan^{-1}\left(\frac{1}{2dd}\right) \text{[rad]}$$

For input video resolution iW×iH available at the input of video fidelity evaluation algorithm, the number of pixels per degree of horizontal ppdH, and respectively vertical ppdV viewing angles become:

$$ppdH = \frac{\pi \cdot iW}{180 \cdot \theta_H}, ppdV = \frac{\pi \cdot iH}{180 \cdot \theta_V}$$

Assuming that at the optimal viewing distance 1 pixel corresponds to 1 arc minute of visual angle, or alternatively, the human eye cannot discern more details if the pixel density is bigger than 60 pixels per degree of visual angle, then to optimally process the input video, and to avoid processing of details that will not be visible because of the viewing distance, the video may be rescaled horizontally by the following horizontal rescaling factor:

$$rfH = \frac{60}{ppdH} = \frac{60 \cdot 180 \cdot \theta_H}{\pi \cdot iW} = \frac{60 \cdot 180 \cdot 2 \cdot \tan^{-1}\left(\frac{ar}{2dd}\right)}{\pi \cdot iW}$$

and, similarly in vertical dimension, by the vertical rescaling factor:

$$rfV = \frac{60}{ppdV} = \frac{60 \cdot 180 \cdot \theta_V}{\pi \cdot iH} = \frac{60 \cdot 180 \cdot 2 \cdot \tan^{-1}\left(\frac{1}{2dd}\right)}{\pi \cdot iH}$$

Then, adjusted for the viewing distance, new dimensions of the input video become:

$$W = \text{round}[rfH \cdot iW] = \text{round}\left[\frac{21600}{\pi}\tan^{-1}\left(\frac{ar}{2dd}\right)\right],$$

$$H = \text{round}[rfV \cdot iH] = \text{round}\left[\frac{21600}{\pi}\tan^{-1}\left(\frac{1}{2dd}\right)\right]$$

where round [x] is the round to nearest integer operator and W and H should be used as target for a resizing operation used to process pictures before the actual video fidelity evaluation algorithm. It should be noted that since density of 60 pixels per degree of visual angle is arbitrary and some authors report up to 240 pixels per degree at the fovea, the above equations can be adjusted to assure specific memory requirements, to preserve exactly the aspect ratio and/or to assure that the resulting video width and height are multiplies of some integer number, e.g., multiplies of 4.

As an example, consider the aspect ratio ar=16/9 and the distance to the display device dd=6 picture heights, then using the equation for W and H above, the video should be resized to 1012×572. Rounding this to a more common 1280×720 resolution can still be considered as optimal as in this case, the corresponding density is ≈76 pixels per degree of visual angle, i.e., a value in the limits of current state-of-the-art knowledge.

Note also that the above equations are for video rescaling with the objective to avoid processing of details that will not be visible to an average human eye. They form an upper limit for video resolution but, without a more elaborate analysis in the spatial frequency domain, it is not possible to recover the original video resolution.

For example, an original 640×360 video rescaled to 2560×1440 and viewed from a distance of 6 picture heights, would require downscaling back to 1280×720 using the previous example. It is still twice the original resolution, so it is suboptimal from the video processing point of view as upscaling can only reduce the amount of information in the image so there is no gain of using higher than necessary resolution.

The proposed VIVIQA algorithm used to calculate the video fidelity measure accepts two video sequences, streams or files 1, 2 as its input. The two video sequences 1, 2, i.e., one comprising distorted pictures 10, 11 and one comprising original pictures 20, 21, could, for instance, be loaded from an internal or external storage or streaming device. The two video sequences 1, 2 preferably have the same dimensions, i.e., distorted and original pictures 10, 11, 20, 21 with the same height and width in terms of number of pixels; preferably have the same frame rates; preferably have the same scan type, such as progressive or interlaced; preferably have the same number of color channels, e.g., grayscale (one or three color channels) vs. color (three color channels); and preferably have the same color gamut.

For instance and with reference to FIGS. 1 and 10, the distorted pictures and the original pictures are represented as integer Y'CbCr data. If the distorted and original pictures are not represented as integer Y'CbCr data, they could be converted to an integer Y'CbCr representation, such as an integer BT.709 Y'CbCr representation, with the same bit-depth and chroma sampling as the original video sequence. If bit-depth and chroma sampling schemes are different for the original video sequence and the distorted video sequence, they could be upscaled to the bigger of the two bit-depths and chroma-resampled to the finer of the two chroma sampling schemes. If color gamuts and/or dynamic ranges of the original and distorted video sequences are different, the optional color conversion could also include gamut mapping (GM) and/or tone mapping (TM) operations.

Once both video sequences are unified for the color coding perspective, they are preferably represented as planar intensity channel, e.g., luma channel Y' in BT.709 parlance, and two chromatic channels, e.g., Cb and Cr channels in BT.709 parlance. At this stage, both grayscale and color videos can be processed using the same building blocks and processing of color videos can be speed up by performing computations on intensity channel only, which is considered the most important from the HVS perspective as compared to the chromatic channels.

BT.709, also referred to as ITU-R Recommendation BT.709 or Rec. 709, should merely be seen as an illustrative example of color gamut and the embodiments are not limited thereto but can also be applied to other color gamuts, such as DCI-P3, also referred to as CDI/P3; BT.2100, also referred to as ITU-R Recommendation BT.2100 or Rec. 2100; BT.2020, also referred to as ITU-R Recommendation BT.2020 or Rec. 2020; BT.601, also referred to as ITU-R Recommendation BT.601 or Rec. 601; and sRGB.

The optionally converted (Y'CbCr) color channels of the original and distorted video sequences are then fed to the VIVIQA algorithm and are processed in two paths. The first path, 'spatial distortion path', uses pixel data of current original and distorted pictures (picture number t) to estimate a mean error of spatial distortion or degradation. In parallel, the current original and distorted pictures (picture number t) and respective previous, preferably in display order, original and distorted pictures (picture number t-1) are used to calculate pixel-wise differences, i.e., the distorted difference picture and the original difference picture, which are processed in the 'temporal degradation path'. The pixel-wise differences are preferably calculated for each color channel as:

$$Y_\Delta(i,j) = Y_t(i,j) - Y_{t-1}(i,j)$$

$$U_\Delta(i,j) = U_t(i,j) - U_{t-1}(i,j)$$

$$V_\Delta(i,j) = V_t(i,j) - V_{t-1}(i,j)$$

where $Y_t(i,j)$, $U_t(i,j)$, $V_t(i,j)$ denote pixel value of a pixel at coordinate (i,j) of respectively luma, first chroma and second chroma channels at time instant t. The pixel-wise differences have the same dimensions as original channels, but their dynamic range have doubled.

Both the original and distorted pictures at time instant t and the original and distorted difference pictures at time instant t are then separately fed to mean error calculation blocks in FIG. 10 in order to estimate both spatial and temporal errors for, preferably, each distorted picture in the video sequence. These mean errors are then merged to form a spatio-temporal mean error per distorted picture and pooled in time to obtain a mean error for the entire video sequence. This error is, in a final stage, optionally converted to a standard MOS/DMOS interval scale. This calculation ends the processing done by the proposed VIVIQA algorithm.

Figure 11:
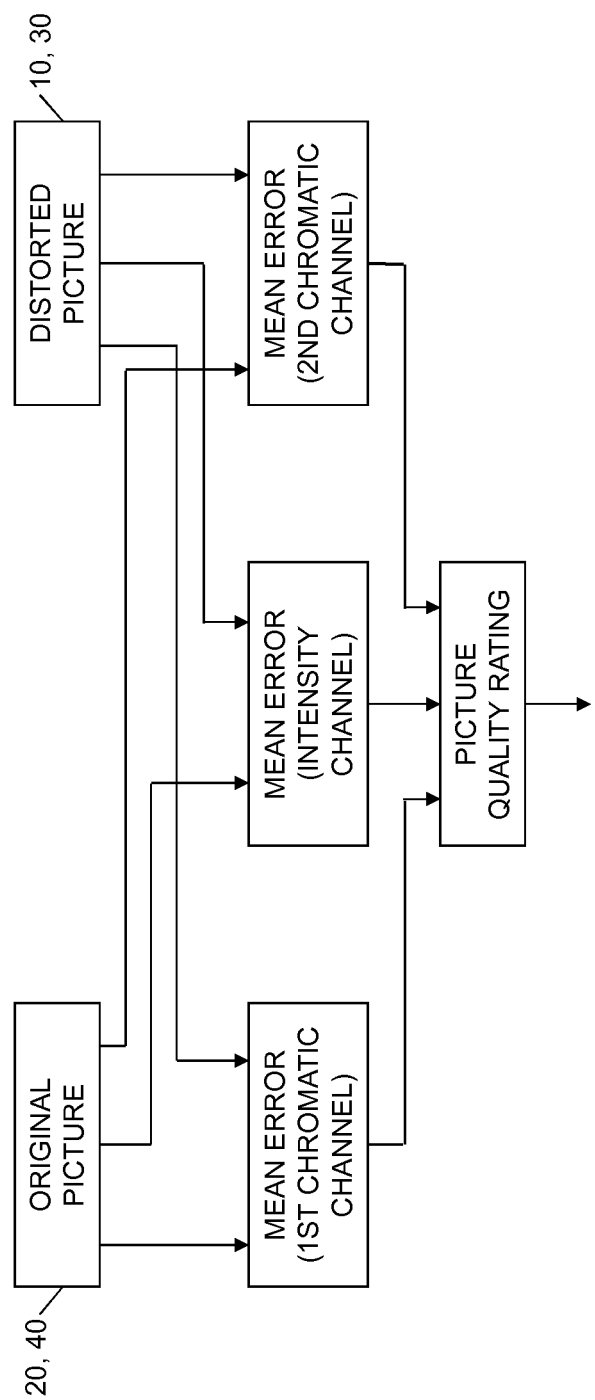
FIG. 11 schematically illustrates an embodiment of determining picture quality rating for the embodiment shown in FIG. 10.

FIG. 11 schematically illustrates an embodiment of calculating the mean errors in FIG. 10 in more detail for the respective color channels. Firstly, the mean errors between original and distorted color channels are calculated separately for the intensity channel and the two chromatic channels, and then aggregated to form a picture quality rating (PQR). This calculation of the picture quality rating is done both in the spatial domain using the distorted and original pictures 10, 20 and in the temporal domain using the distorted and original difference pictures 30, 40.

Figure 12:
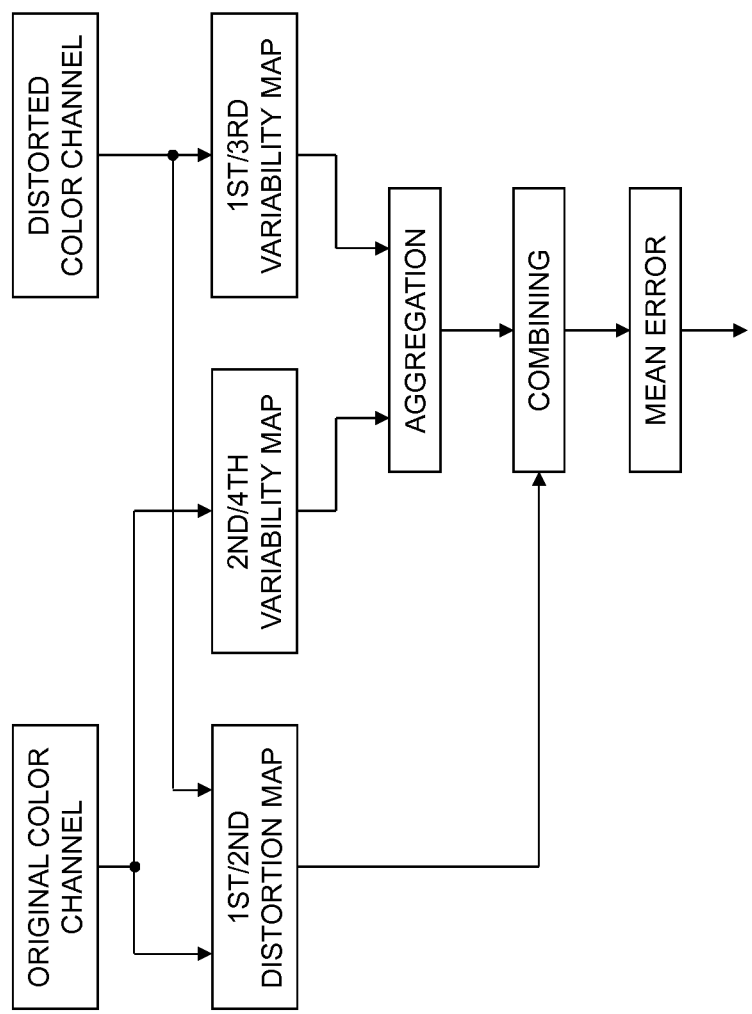
FIG. 12 schematically illustrates an embodiment of determining mean error for the embodiment shown in FIG. 11.

FIG. 12 schematically illustrates an embodiment of calculating the mean errors in FIG. 11 in more detail for the respective color channels. Firstly, a distortion map is determined as a representation of pixel value distortions or differences between the original color channel and the distorted color channel. Respective variability maps are determined for the original and distorted color channels and aggregated into a visual importance map. The visual importance map is combined with the distortion map into a visual distortion map, which is summed to get the mean error for the particular color channel. This calculation of the mean error is done both in the spatial domain using the distorted and original pictures 10, 20 and in the temporal domain using the distorted and original difference pictures 30, 40.

The video fidelity measure of the present embodiments can advantageously be used in connection with video coding instead of prior art evaluation metrics and measures, such as sum of absolute differences (SAD) and sum of squared errors (SSE). The video fidelity measure can then be used inside the encoding process and encoder in order to select coding modes and/or coding parameters.

FIG. 7 is a flow chart illustrating a method of encoding a video sequence 2. The method comprises steps S30 to S33, which are performed for at least one original picture 20 in the video sequence 2. The method comprises encoding, in step S30, at least a portion 22 of the original picture 20 according to multiple coding modes to obtain multiple encoded candidate picture portions. The multiple encoded candidate picture portions are decoded in step S31 to obtain multiple decoded candidate picture portions 12. The following step S32 comprises determining, for each of the multiple decoded candidate picture portions 12, a respective video fidelity measure according to any of the embodiments. A next step S33 comprises selecting, among the multiple encoded candidate picture portions, an encoded candidate picture portion as encoded representation of the least a portion 22 of the original picture 20 at least partly based on the respective video fidelity measures.

Thus, at least a portion 22 of the original picture 20 is encoded according to multiple coding modes. This at least portion 22 of the original picture 20 could be in the form of a macroblock of pixels 24, a coding block or coding unit of pixels 24 or samples, generally referred to as a block of pixels 24 herein. The various coding modes include, for instance, different intra coding modes, such as planar mode, DC mode and various angular modes; inter coding modes, such as uni-directional (P) or bi-directional (B) inter coding; different intra or inter partitions, such as 32×32 pixels, 16×16 pixels, 8×8 pixels or 4×4 pixels. Each such coding mode results in a respective encoded candidate picture portion. The encoded candidate picture portion is then decoded to obtain a decoded candidate picture portion 12 that corresponds to the at least a portion 12 of the distorted picture 10 in FIG. 1.

Video coding, such as of a video sequence 2, typically includes transformation into the frequency domain, quantization and then entropy coding. Correspondingly, video decoding includes the inverse of these operations, i.e., decoding, inverse quantization and inverse transformation. Thus, encoding as defined herein may include these sub-steps of transformation, quantization and (entropy) encoding, whereas decoding may include the sub-steps of decoding, inverse quantization and inverse transformation.

The video fidelity measure of the embodiments is calculated for each of the multiple decoded candidate picture portions 12 in step S32 and is then used in step S33 to select which of the multiple encoded candidate picture portions to use as the encoded representation of the at least a portion 22 of the original picture 20. Hence, the video fidelity measure is thereby employed to identify the coding mode and the resulting encoded candidate picture portion that in some sense is best or optimal in a way defined at least partly based on the video fidelity measure.

In a particular embodiment, the video fidelity measure determined in step S32 is used to determine a rate-distortion measure, which in turn is used in step S33 to select encoded candidate picture portion. This particular embodiment is illustrated in FIG. 8. The method continues from step S32 in FIG. 7. A next step S40 comprises determining, for each of the multiple decoded candidate picture portions 12, a respective rate-distortion measure based on the respective video fidelity measure and a rate representing a bit cost of representing the at least a portion 22 of the original picture 20 with the encoded candidate portion. The method then continues to step S33, which in this embodiment comprises selecting, among the multiple encoded candidate picture portions, an encoded candidate picture portion as encoded representation of the at least a portion 22 of the original picture 20 based on the respective rate-distortion measure.

In an embodiment, step S33 comprises selecting the encoded candidate picture portion that minimizes the rate-distortion measure.

In this particular embodiment, a coding mode and thereby an encoded candidate picture portion is selected in a so-called rate-distortion optimization (RDO) using a rate-distortion measure determined based on the video fidelity measure of the embodiments. The target of RDO is to minimize the distortion D for a given rate $R_C$ by appropriate selections of coding modes and parameters, i.e., $$\min\{D\}, \text{ subject to } R \le R_C$$

However, such a minimization is a constrained problem, which is hard to solve. Accordingly, the minimization above is therefore generally converted to a RDO based on minimizing the Lagrangian cost function J:

$$\min\{J\}, J=D+\lambda R$$

wherein $\lambda$ is the Lagrange multiplier.

Prior art RDOs have often used SAD or SSE as a measure of the distortion D in the Lagrangian cost function. However, such distortion measures are not optimal from the HVS perspective. Accordingly, the video fidelity measure of the present embodiments is advantageously used as distortion parameter D in the Lagrangian cost function.

The video fidelity measure of the present embodiments can also find other uses in connection with video coding in addition to selection of coding mode and encoded candidate picture portion. For instance, the video fidelity measure can also, or alternatively, be used to select encoder profile of an encoder. An encoder profile is a combination of high-level parameters, such as size of the motion estimation search, number of considered coding unit or block splitting schemes, entropy encoder choice, depth of coding tree unit, etc.

FIG. 9 is a flow chart illustrating a method of selecting an encoder profile for an encoder. The method comprises encoding at least one original picture 20 in a video sequence 2 using multiple encoder profiles to obtain multiple encoded pictures in step S50. A next step S51 comprises decoding the multiple encoded pictures to obtain multiple decoded pictures 10. A respective video fidelity measure according to the embodiments is then determined in step S52 for each of the multiple decoded pictures 10. The following step S53 comprises selecting, among the multiple encoder profiles, an encoder profile for the encoder based at least partly on the respective video fidelity measures.

In a particular embodiment, step S53 comprises selecting the encoder profile resulting in the best video fidelity or quality as defined based on the respective video fidelity measures.

Various video sequences 2 of original pictures 20 can be used in the method of FIG. 8 to select encoder profile. For instance, the video sequence 2 could be a pre-defined video sequence 2 of various original pictures 20, such as including both generally hard to encode content and easy to encode content, which can be used to test and evaluate various encoders and encoder profiles. In another embodiment, multiple video sequence 2 of original pictures 20 are available and that could be adapted to different contents. For instance, a first video sequence 2 comprises sports content, a second video sequence 2 comprises movie content, a third video sequence 2 comprises news content, a fourth video sequence 2 comprises cartoon content, etc. In such a case, an appropriate video sequence 2 could be selected based on the content of the video to be encoded by the encoder to thereby have a most suitable video sequence 2 when selecting encoder profile for the encoder. In a further embodiment, the video sequence 2 could constitute a portion of the video sequence 2 to be encoded by an encoder, the encoder profile of which is to be selected. For instance, an initial portion of a video sequence 2 could be used in the method shown in FIG. 9 to select an appropriate encoder profile based on the video fidelity measure of the embodiments. Once a suitable encoder profile has been selected the original pictures 20 of the video sequence 2 can be encoded by the encoder using the selected encoder profile.

The actual values of the various parameters mentioned herein, such as the positive power parameters p, q and N, and optionally the linearization parameters c, d, power parameter r, parameter h and/or the alpha parameters $\alpha_1$, $\alpha_2$, can be determined in a training phase on various VQA databases. For instance, the training phase may involve maximizing correlation, such as average Spearman's rank correlation over the available VQA databases, with the associated subjective scores. The present embodiments are thereby not limited to the actual parameter values presented herein and these values may be adjusted in additional training phases based on access to more VQA databases and/or in the case of using different picture encoders or encoder profiles.

Another aspect of the embodiments relates to a device for determining a video fidelity measure for a video sequence 1. The device is configured to, for at least one distorted picture 10 in the video sequence 1, determine a distorted difference picture 30 as a pixel-wise difference between at least a portion 12 of the distorted picture 10 and at least a corresponding portion 13 of a preceding distorted picture 11 preceding the distorted picture 10 in the video sequence 1. The device is also configured to determine an original difference picture 40 as a pixel-wise difference between at least a corresponding portion 22 of an original picture 20 and at least a corresponding portion 23 of a preceding original picture 21 preceding the original picture 20. The device is further configured to determine a first map representing, for each pixel 14 in the at least a portion 12 of the distorted picture 10, a distortion in pixel values between the pixel 14 and a corresponding pixel 24 in the original picture 20. The device is additionally configured to determine a second map representing, for each pixel 34 in the distorted difference picture 30, a distortion in pixel values between the pixel 34 and a corresponding pixel 44 in the original difference picture 40. The device is also configured to determine a third map as an aggregation of a fourth map representing, for each pixel 14 in the at least a portion 12 of the distorted picture 10, a local variability in pixel values and a fifth map representing, for each corresponding pixel 24 in the original picture 20, a local variability in pixel values. The device is further configured to determine a sixth map as an aggregation of a seventh map representing, for each pixel 34 in the distorted difference picture 30, a local variability in pixel values and an eighth map representing, for each corresponding pixel 44 in the original difference picture 40, a local variability in pixel values. The device is also configured to determine the video fidelity measure based on the first map, the second map, the third map and the sixth map.

In an embodiment, the device is configured to determine the distorted difference picture 30 as a pixel-wise difference between the distorted picture 10 and the preceding distorted picture 11 in the video sequence 1 and determine the original difference picture 40 a pixel-wise difference between the original picture 20 and the preceding original picture 21. The device is also, in this embodiment, configured to determine the first map representing, for each pixel 14 in the distorted picture 10, a distortion in pixel values between the pixel 14 and the corresponding pixel 24 in the original picture 20 and determine the third map as an aggregation of the fourth map representing, for each pixel 14 in the distorted picture 10, the local variability in pixel values and the fifth map representing, for each corresponding pixel 24 in the original picture 20, the local variability in pixel values.

In an embodiment, the device is configured to determine the first map representing, for each pixel 14 in the at least a portion 12 of the distorted picture 10, an absolute difference in pixel values between the pixel 14 and the corresponding pixel 24 in the original picture 20. The device is also, in this embodiment, configured to determine the second map representing, for each pixel 34 in the distorted difference picture 30, an absolute difference in pixel values between the pixel 34 and the corresponding pixel 44 in the original difference picture 40.

In an embodiment, the device is configured to determine the first map $DM_1(i,j)$ based on $|I_1(i,j)-I_2(i,j)|^p$, wherein $I_1(i,j)$ denotes pixel value of a pixel 14 at coordinate (i,j) in the distorted picture 10, $I_2(i,j)$ denotes pixel value of a corresponding pixel 24 at coordinate (i,j) in the original picture 20 and p is a positive power parameter. The device is also, in this embodiment, configured to determine the second map $DM_2(i,j)$ based on $|I_{A1}(i,j)-I_{A2}(i,j)|^p$, wherein $I_{A1}(i,j)$ denotes pixel value of a pixel 34 at coordinate (i,j) in the distorted difference picture 30 and $I_{A2}(i,j)$ denotes pixel value of a corresponding pixel 44 at coordinate (i,j) in the original difference picture 40.

In an embodiment, the device is configured to determine the third map $VIM_1(i,j)$ as an aggregation of pixel-wise maxima of the fourth map $VM_1(i,j)$ and the fifth map $VM_2(i,j)$, $VIM_1(i,j)=\max(VM_1(i,j),VM_2(i,j))$. The device is also, in this embodiment, configured to determine the sixth map $VIM_2(i,j)$ as an aggregation of pixel-wise maxima of the seventh map $VM_3(i,j)$ and the eighth map $VM_4(i,j)$, $VIM_2(i,j)=\max(VM_3(i,j),VM_4(i,j))$.

In an embodiment, the device is configured to determine the third map as the aggregation of the fourth map representing, for each pixel 14 in the at least a portion 12 of the distorted picture 10, the local variability in pixel values in a pixel neighborhood of the pixel 14 in the distorted picture 10 and the fifth map representing, for each corresponding pixel 24 in the original picture 20, the local variability in pixel values in a pixel neighborhood of the corresponding pixel 24 in the original picture 20. The device is also, in this embodiment, configured to determine the sixth map as the aggregation of the seventh map representing, for each pixel 34 in the distorted difference picture 30, the local variability in pixel values in a pixel neighborhood of the pixel 34 in the distorted difference picture 30 and the eighth map representing, for each corresponding pixel 44 in the original difference picture 40, the local variability in pixel values in a pixel neighborhood of the corresponding pixel 44 in the original difference picture 40.

In an embodiment, the device is configured to determine the third map as the aggregation of the fourth map representing, for each pixel 14 in the at least a portion 12 of the distorted picture 10, a local variance in pixel values and the fifth map representing, for each corresponding pixel 24 in the original picture 20, a local variance in pixel values. The device is also, in this embodiment, configured to determine the sixth map as the aggregation of the seventh map representing, for each pixel 34 in the distorted difference picture 30, a local variance in pixel values and the eighth map representing, for each corresponding pixel 44 in the original difference picture 40, a local variance in pixel values.

In an embodiment, the device is configured to determine the third map as the aggregation of the fourth map representing, for each pixel 14 in the at least a portion 12 of the distorted picture 10, a non-linearly mapped and normalized local variance in pixel values and the fifth map representing, for each corresponding pixel 24 in the original picture 20, a non-linearly mapped and normalized local variance in pixel values. The device is also, in this embodiment, configured to determine the sixth map as the aggregation of the seventh map representing, for each pixel 34 in the distorted difference picture 30, a non-linearly mapped and normalized local variance in pixel values and the eighth map representing, for each corresponding pixel 44 in the original difference picture 40, a non-linearly mapped and normalized local variance in pixel values.

The device is also, in this embodiment, configured to the device is configured to determine a first variance map representing, for each pixel 14 in the at least a portion 12 of the distorted picture 10, a local variance in pixel values and determine a first variability map as a non-linearly mapped and normalized version of the first variance map. The device is also, in this embodiment, configured to determine a second variance map representing, for each corresponding pixel 24 in the original picture 20, a local variance in pixel values and determine a second variability map as a non-linearly mapped and normalized version of the second variance map. The device is further, in this embodiment, configured to determine a third variance map representing, for each pixel 34 in the distorted difference picture 30, a local variance in pixel values and determine a third variability map as a non-linearly mapped and normalized version of the third variance map. The device is additionally, in this embodiment, configured to determine a fourth variance map representing, for each corresponding pixel 44 in the original difference picture 40, a local variance in pixel values and determine a fourth variability map as a non-linearly mapped and normalized version of the fourth variance map. The device is also, in this embodiment, configured to determine the third map as the aggregation of the first variability map and the second variability map and determine the sixth map as the aggregation of the third variability map and the fourth variability map.

In an embodiment, the device is configured to determine the first variability map $VM_1(i,j)$ based on $$\frac{\text{var}_1(i,j)^q}{\sum_i\sum_j \text{var}_1(i,j)^q},$$

wherein $\text{var}_1(i,j)$ represents the first variance map and q is a positive power parameter. The device is also, in this embodiment, configured to determine the second variability map $VM_2(i,j)$ based on $$\frac{\text{var}_2(i,j)^q}{\sum_i\sum_j \text{var}_2(i,j)^q},$$

wherein $\text{var}_2(i,j)$ represents the second variance map. The device is further, in this embodiment, configured to determine the third variability map $VM_3(i,j)$ based on $$\frac{\text{var}_3(i,j)^q}{\sum_i\sum_j \text{var}_3(i,j)^q},$$

wherein $\text{var}_3(i,j)$ represents the third variance map. The device is additionally, in this embodiment, configured to determine the fourth variability map $VM_4(i,j)$ based on $$\frac{\text{var}_4(i,j)^q}{\sum_i\sum_j \text{var}_4(i,j)^q},$$

wherein $\text{var}_4(i,j)$ represents the fourth variance map.

In an embodiment, the device is configured to determine the first variance map $\text{var}_1(i,j)$ based on $N^2\sum_{k=-M}^{M}\sum_{l=-M}^{M}I_1(i-k,j-l)^2-(\sum_{k=-M}^{M}\sum_{l=-M}^{M}I_1(i-k,j-l))^2$, wherein $I_1(i,j)$ represents pixel value of a pixel 14 at coordinate $(i,j)$ in the distorted picture 10, $$M = \frac{N-1}{2}$$

and N is a positive odd integer. The device is also, in this embodiment, configured to determine the second variance map $\text{var}_2(i,j)$ based on $N^2\sum_{k=-M}^{M}\sum_{l=-M}^{M}I_2(i-k,j-l)^2-(\sum_{k=-M}^{M}\sum_{l=-M}^{M}I_2(i-k,j-l))^2$, wherein $I_2(i,j)$ represents pixel value of a corresponding pixel 24 at coordinate $(i,j)$ in the original picture 20. The device is further, in this embodiment, configured to determine the third variance map $\text{var}_3(i,j)$ based on $\sum_{k=-M}^{M}\sum_{l=-M}^{M}I_{\Delta 1}(i-k,j-l)^2$, wherein $I_{\Delta 1}(i,j)$ represents pixel value of a pixel 34 at coordinate $(i,j)$ in the distorted difference picture 30. The device is additionally, in this embodiment, configured to determine the fourth variance map $var_4(i,j)$ based on $\Sigma_{k=-M}^{M}\Sigma_{l=-M}^{M}I_{\Delta2}(i-k,j-l)^2$, wherein $I_{\Delta2}(i,j)$ represents pixel value of a corresponding pixel 44 at coordinate (i,j) in the original difference picture 40.

In an embodiment, the device is configured to determine a ninth map by weighting pixel-wise the first map by the third map and determine a tenth map by weighting pixel-wise the second map by the sixth map. The device is also, in this embodiment, configured to determine the video fidelity measure based on the ninth map and the tenth map.

In an embodiment, the device is configured to determine the ninth map $VDM_1(i,j)=VIM_1(i,j)\times DM_1(i,j)$, wherein $DM_1(i,j)$ represents the first map and $VIM_1(i,j)$ represents the third map. The device is also, in this embodiment, configured to determine the tenth map $VDM_2(i,j)=VIM_2(i,j)\times DM_2(i,j)$, wherein $DM_2(i,j)$ represents the second map and $VIM_2(i,j)$ represents the sixth map.

In an embodiment, the device is configured to determine a first mean error $ME_1(I_1,I_2)$ based on a sum of the ninth map $\Sigma_i\Sigma_j VDM_1(i,j)$, wherein $I_1,I_2$ represent pixel values and (i,j) represents a coordinate of a pixel 14 in the distorted picture 10 and of a corresponding pixel 24 in the original picture 20. The device is also, in this embodiment, configured to determine a second mean error $ME_2(I_{\Delta2},I_{\Delta2})$ based on a sum of the tenth map $\Sigma_i\Sigma_j VDM_2(i,j)$, wherein $I_{\Delta1},I_{\Delta2}$ represent pixel values and (i,j) represents a coordinate of a pixel 34 in the distorted difference picture 30 and of a corresponding pixel 44 in the original difference picture 40. The device is further, in this embodiment, configured to determine the video fidelity measure based on the first mean error and the second mean error.

In an embodiment, the device is configured to determine a first mean error $ME_1(Y_1,Y_2)$ for an intensity channel and first mean errors $ME_1(U_1,U_2)$, $ME_1(V_1,V_2)$ for chromatic channels and determine a second mean error $ME_2(Y_{\Delta1},Y_{\Delta2})$ for an intensity channel and second mean errors $ME_2(U_{\Delta1},U_{\Delta2})$, $ME_2(V_{\Delta1},V_{\Delta2})$ for chromatic channels. The device is also, in this embodiment, configured to determine a first picture quality rating $PQR_1(I_1,I_2)$ based on a normalized linear combination of the first mean error for the intensity channel and the first mean errors for the chromatic channels and determine a second picture quality rating $PQR_2(I_{\Delta1},I_{\Delta2})$ based on a normalized linear combination of the second mean error for the intensity channel and the second mean errors for the chromatic channels. The device is further, in this embodiment, configured to determine the video fidelity measure based on a combination of the first picture quality rating and the second picture quality rating.

In an embodiment, the device is configured to determine the first picture quality rating based on $$c\times n_Y\times ME_1(Y_1,Y_2)+(1-c)\times n_C\times \frac{ME_1(U_1,U_2)+ME_1(V_1,V_2)}{2},$$

wherein c is a positive number larger than 0 but smaller than 1 and $n_Y$, $n_C$ are normalization coefficients defined based on the bit depth of the distorted picture 10 and the original picture 20. The device is also, in this embodiment, configured to determine the second picture quality rating based on $C\times n_{\Delta Y}\times$ $$ME_2(\Delta Y_{\Delta1},\Delta Y_{\Delta2})+(1-c)\times n_{\Delta C}\times \frac{ME_2(U_{\Delta1},U_{\Delta2})+ME_2(V_{\Delta1},\Delta V_{\Delta2})}{2},$$

wherein $n_{\Delta Y}$, $n_{\Delta C}$ are normalization coefficients defined based on the bit depth of the distorted difference picture and the original difference picture 40.

In an embodiment, the device is configured to determine the video fidelity measure based on $$(d\times PQR_1(I_1,I_2)^r+(1-d)\times PQR_2(I_{\Delta1},I_{\Delta2})^r)^{\frac{1}{r}},$$

wherein d is a positive number larger than 0 but smaller than 1 and r is a positive power parameter.

In an embodiment, the device is configured to determine respective video quality for multiple distorted pictures 10, 11 of the video sequence 1.

Thus, in an embodiment, the device is configured to determine, for each distorted picture 10 among multiple distorted pictures 10, 11 in the video sequence, a distorted difference picture 30 as a pixel-wise difference between at least a portion 12 of the distorted picture 10 and at least a corresponding portion 13 of a preceding distorted picture 11 preceding the distorted picture 10 in the video sequence 1. The device is also configured to determine, for each distorted picture 10 among the multiple distorted pictures 10, 11, an original difference picture 40 as a pixel-wise difference between at least a corresponding portion 22 of an original picture 20 and at least a corresponding portion 23 of a preceding original picture 21 preceding the original picture 20. The device is further configured to determine, for each distorted picture 10 among the multiple distorted pictures 10, 11, a first map representing, for each pixel 14 in the at least a portion 12 of the distorted picture 10, a distortion in pixel values between the pixel 14 and a corresponding pixel 24 in the original picture 20. The device is additionally configured to determine, for each distorted picture 10 among the multiple distorted pictures 10, 11, a second map representing, for each pixel 34 in the distorted difference picture 30, a distortion in pixel values between the pixel 34 and a corresponding pixel 44 in the original difference picture 40. The device is also configured to determine, for each distorted picture 10 among the multiple distorted pictures 10, 11, a third map as an aggregation of a fourth map representing, for each pixel 14 in the at least a portion 12 of the distorted picture 10, a local variability in pixel values and a fifth map representing, for each corresponding pixel 24 in the original picture 20, a local variability in pixel values. The device is further configured to determine, for each distorted picture 10 among the multiple distorted pictures 10, 11, a sixth map as an aggregation of a seventh map representing, for each pixel 34 in the distorted difference picture 30, a local variability in pixel values and an eighth map representing, for each corresponding pixel 44 in the original difference picture 40, a local variability in pixel values. The device is additionally configured to determine, for each distorted picture 10 among the multiple distorted pictures 10, 11, a video fidelity measure for the distorted picture 10 based on the first map, the second map, the third map and the sixth map.

In an embodiment, the device is configured to select a video fidelity measure among the multiple respective video fidelity measures determined for the multiple distorted pictures 10, 11 as video fidelity measure for the video sequence 1.

In an embodiment, the device is configured to select a video fidelity measure representing a worst video fidelity among the multiple video fidelity measures.

In an embodiment, the device is configured to select a range of video fidelity measures determined for multiple successive distorted pictures 10, 11 in the video sequence 1.

In an embodiment, the device is configured to convert the video fidelity measure to a differential mean opinion score (DMOS) range or a mean opinion score (MOS) range.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 13:
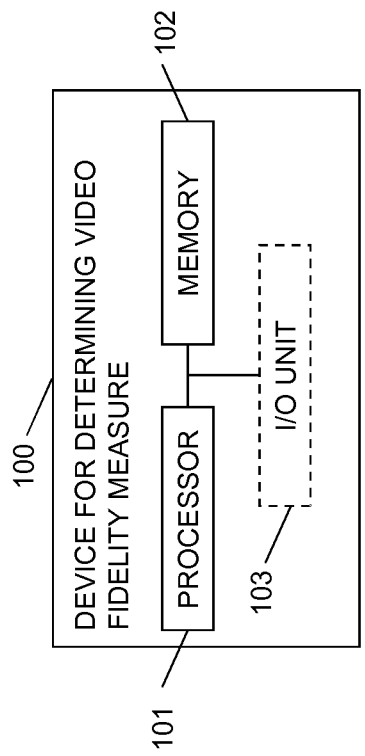
FIG. 13 is a block diagram of a device for determining a video fidelity measure for a video sequence according to an embodiment.

FIG. 13 is a schematic block diagram illustrating an example of a device 100 for determining a video fidelity measure for a video sequence according to an embodiment. In this particular example, the device 100 comprises a processor 101, such as processing circuitry, and a memory 102. The memory 102 comprises instructions executable by the processor 101.

In an embodiment, the processor 101 is operative to determine the distorted difference picture 30 as a pixel-wise difference between the at least a portion 12 of the distorted picture 10 and the at least a corresponding portion 13 of the preceding distorted picture 11 in the video sequence 1. The processor 101 is also operative to determine the original difference picture 40 as a pixel-wise difference between the at least a corresponding portion 22 of the original picture 20 and at least a corresponding portion 23 of the preceding original picture 21. The processor 101 is further operative to determine the first map representing, for each pixel 14 in the at least a portion 12 of the distorted picture 10, the distortion in pixel values between the pixel 14 and the corresponding pixel 24 in the original picture 20 and determine the second map representing, for each pixel 34 in the distorted difference picture 30, the distortion in pixel values between the pixel 34 and the corresponding pixel 44 in the original difference picture 40. The processor 101 is additionally operative to determine the third map as the aggregation of the fourth map representing, for each pixel 14 in the at least a portion 12 of the distorted picture 10, the local variability in pixel values and the fifth map representing, for each corresponding pixel 24 in the original picture 20, the local variability in pixel values. The processor 101 is also operative to determine the sixth map as the aggregation of the seventh map representing, for each pixel 34 in the distorted difference picture 30, the local variability in pixel values and the eighth map representing, for each corresponding pixel 44 in the original difference picture 40, the local variability in pixel values. The processor 101 is further operative to determine the video fidelity measure based on the first map, the second map, the third map and the sixth map.

Optionally, the device 100 may also include a communication circuit, represented by a respective input/output (I/O) unit 103 in FIG. 13. The I/O unit 103 may include functions for wired and/or wireless communication with other devices, servers and/or network nodes in a wired or wireless communication network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, I/O circuitry, input port(s) and/or output port(s).

Figure 14:
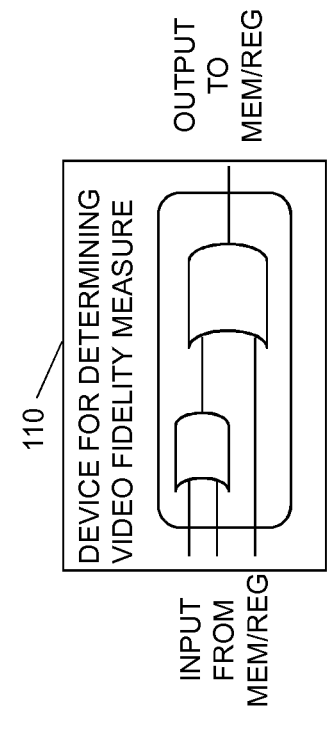
FIG. 14 is a block diagram of a device for determining a video fidelity measure for a video sequence according to another embodiment.

FIG. 14 is a schematic block diagram illustrating a device 110 for determining a video fidelity measure for a video sequence based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 15:
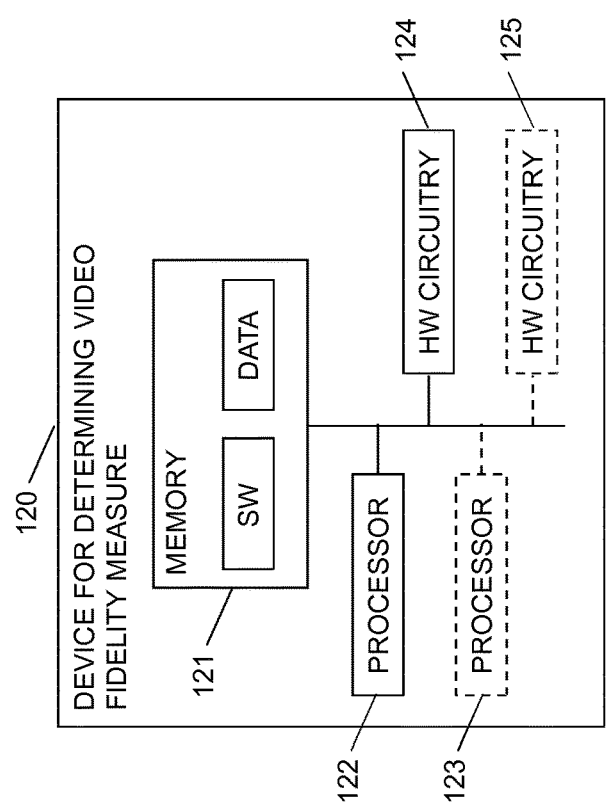
FIG. 15 is a block diagram of a device for determining a video fidelity measure for a video sequence according to a further embodiment.

FIG. 15 is a schematic block diagram illustrating yet another example of a device 120 for determining a video fidelity measure for a video sequence based on combination of both processor(s) 122, 123 and hardware circuitry 124, 125 in connection with suitable memory unit(s) 121. The overall functionality is, thus, partitioned between programmed software for execution on one or more processors 122, 123 and one or more pre-configured or possibly reconfigurable hardware circuits 124, 125. The actual hardware-software partitioning can be decided by a system designer based on a number of factors including processing speed, cost of implementation and other requirements.

Figure 16:
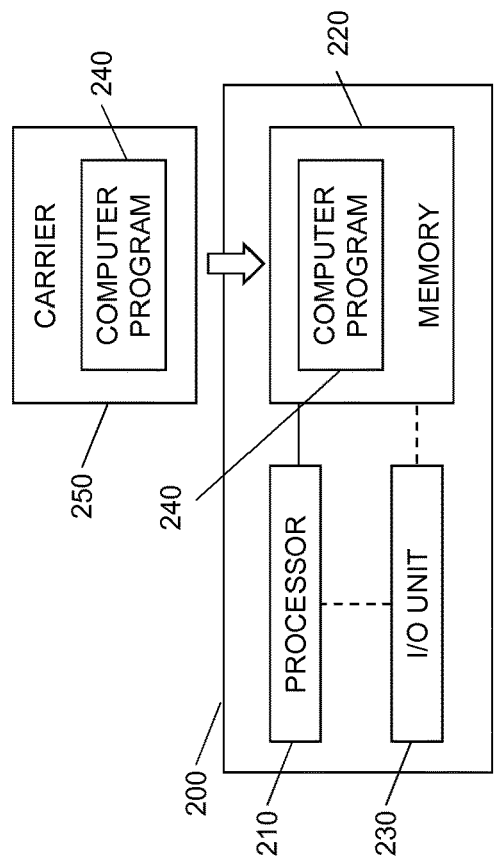
FIG. 16 schematically illustrates a computer program based implementation of an embodiment.

FIG. 16 is a computer program based implementation of a device 200 for determining a video fidelity measure for a video sequence according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as pictures and video fidelity measures.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by at least one processor 210, cause the at least one processor 210 to determine, for at least one distorted picture in a video sequence, a distorted difference picture as a pixel-wise difference between at least a portion of the distorted picture and at least a corresponding portion of a preceding distorted picture in the video sequence. The at least one processor 210 is also caused to determine, for the at least one distorted picture in the video sequence, an original difference picture as a pixel-wise difference between at least a corresponding portion of an original picture and at least a corresponding portion of a preceding original picture. The at least one processor 210 is further caused to determine, for the at least one distorted picture in the video sequence, a first map representing, for each pixel in the at least a portion of the distorted picture, a distortion in pixel values between the pixel and a corresponding pixel in the original picture. The at least one processor 210 is additionally caused to determine, for the at least one distorted picture in the video sequence, a second map representing, for each pixel in the distorted difference picture, a distortion in pixel values between the pixel and a corresponding pixel in the original difference picture. The at least one processor 210 is also caused to determine, for the at least one distorted picture in the video sequence, a third map as an aggregation of a fourth map representing, for each pixel in the at least a portion of the distorted picture, a local variability in pixel values and a fifth map representing, for each corresponding pixel in the original picture, a local variability in pixel values. The at least one processor 210 is further caused to determine, for the at least one distorted picture in the video sequence, a sixth map as an aggregation of a seventh map representing, for each pixel in the distorted difference picture, a local variability in pixel values and an eighth map representing, for each corresponding pixel in the original difference picture, a local variability in pixel values. The at least one processor 210 is also caused to determine, for the at least one distorted picture in the video sequence, the video fidelity measure based on the first map, the second map, the third map and the sixth map.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 stored on a computer-readable storage medium, such as the memory 220, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may, thus, be loaded into the operating memory 220 for execution by the processing circuitry 210.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 17:
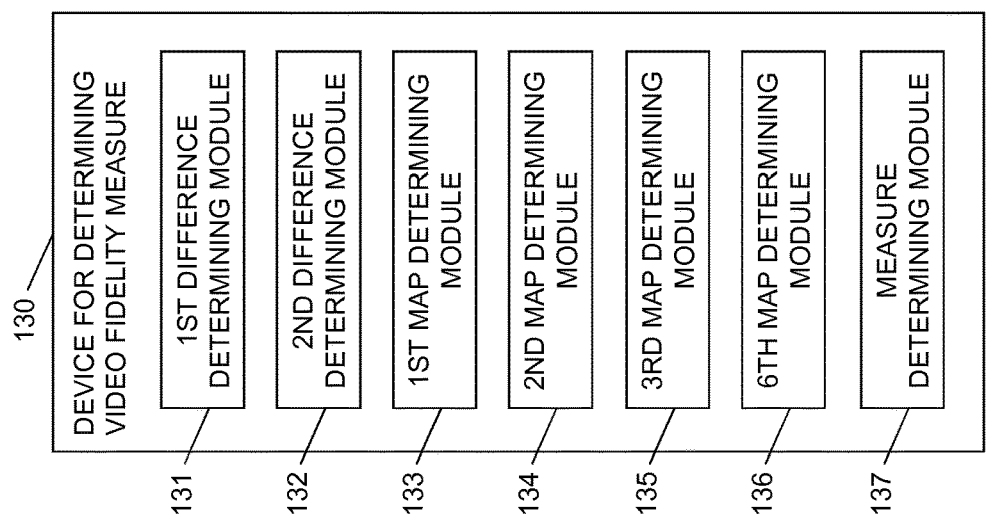
FIG. 17 is a block diagram of a device for determining a video fidelity measure for a video sequence according to yet another embodiment.

FIG. 17 is a block diagram of a device 130 for determining a video fidelity measure for a video sequence. The device 130 comprises a first difference determining module 131 for determine, for at least one distorted picture in the video sequence, a distorted difference picture as a pixel-wise difference between at least a portion of the distorted picture and at least a corresponding portion of a preceding distorted picture in the video sequence. The device 130 also comprises a second difference determining module 132 for determining, for the at least one distorted picture in the video sequence, an original difference picture as a pixel-wise difference between at least a corresponding portion of an original picture and at least a corresponding portion of a preceding original picture. The device 130 further comprises a first map determining module 133 for determining, for the at least one distorted picture in the video sequence, a first map representing, for each pixel in the at least a portion of the distorted picture, a distortion in pixel values between the pixel and a corresponding pixel in the original picture. The device 130 additionally comprises a second map determining module 134 for determining, for the at least one distorted picture in the video sequence, a second map representing, for each pixel in the distorted difference picture, a distortion in pixel values between the pixel and a corresponding pixel in the original difference picture. The device 130 also comprises a third map determining module 135 for determining, for the at least one distorted picture in the video sequence, a third map as an aggregation of a fourth map representing, for each pixel in the at least a portion of the distorted picture, a local variability in pixel values and a fifth map representing, for each corresponding pixel in the original picture, a local variability in pixel values. The device 130 further comprises a sixth map determining module 136 for determining, for the at least one distorted picture in the video sequence, a sixth map as an aggregation of a seventh map representing, for each pixel in the distorted difference picture, a local variability in pixel values and an eighth map representing, for each corresponding pixel in the original difference picture, a local variability in pixel values. The device 130 also comprises a measure determining module 137 for determining, for the at least one distorted picture in the video sequence, the video fidelity measure based on the first map, the second map, the third map and the sixth map.

Figure 18:
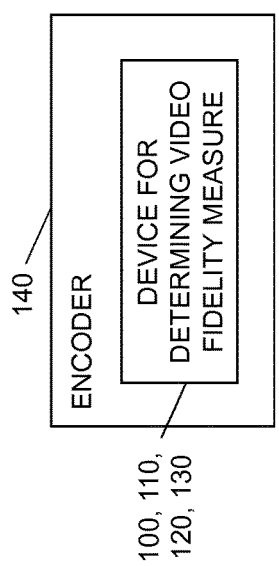
FIG. 18 is a block diagram of an encoder according to an embodiment.

A further aspect of the embodiments relates to an encoder 140 as shown in FIG. 18. The encoder 140 comprises a device 100, 110, 120, 130 for determining a video fidelity measure for a video sequence according to any of the embodiments, such as illustrated in any of FIGS. 13-17. The encoder 140 is configured to encode at least a portion of an original picture in the video sequence according to multiple coding modes to obtain multiple encoded candidate picture portions and decode the multiple encoded candidate pictures to obtain multiple decoded candidate picture portions. The encoder 140 is also configured to select, among the multiple encoded candidate picture portions, an encoded candidate picture portion as encoded representation of the at least a portion of the original picture at least partly based on respective video fidelity measures determined by the device 100, 110, 120, 130 for each of the multiple decoded candidate picture portions.

In an embodiment, the encoder 140 is configured to determine, for each of the multiple decoded candidate picture portions, a respective rate-distortion measure based on the respective video fidelity measure and a rate representing a bit cost of representing the at least a portion of the original picture with the encoded candidate picture portion. The encoder 140 is also configured, in this embodiment, to select, among the multiple encoded candidate picture portions, an encoded candidate picture portion as encoded representation of the at least a portion of the original picture based on the respective rate-distortion measure.

Figure 19:
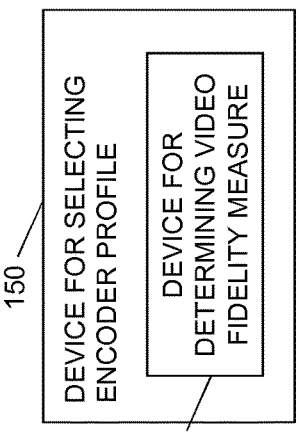
FIG. 19 is a block diagram of a device for selecting an encoder profile for encoding a video sequence according to an embodiment.

Yet another aspect of the embodiments relates to device 150 for selecting an encoder profile for an encoder as shown in FIG. 19. The device 150 comprises a device 100, 110, 120, 130 for determining a video fidelity measure for a video sequence according to any of the embodiments, such as illustrated in any of FIGS. 13-17. The device 150 is configured to encode at least one original picture in the video sequence using multiple encoder profiles to obtain multiple encoded pictures and decode the multiple encoded pictures to obtain multiple decoded pictures. The device 150 is also configured to select, among the multiple encoder profiles, an encoder profile for the encoder based at least partly on respective video fidelity measures determined by the device 100, 110, 120, 130 for determining a video fidelity measure.

It is also becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources, such as networks, servers, storage, applications and general or customized services.

There are different forms of virtualization that can be useful in this context, including one or more of:
- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (N Is), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and NIC(s), as well as non-transitory machine readable storage media having stored thereon software. During operation, the processor(s) executes the software to instantiate one or more sets of one or more applications. While one embodiment does not implement virtualization, alternative embodiments may use different forms of virtualization for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a set of applications. In an example embodiment, each of the software containers, also called virtualization engines, virtual private servers, or jails, is a user space instance, typically a virtual memory space. These user space instances may be separate from each other and separate from the kernel space in which the operating system is executed. Then, the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, network devices, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level. It should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device. In certain embodiments of such a hybrid network device, a platform Virtual Machine (VM), such as a VM that implements functionality of a special-purpose network device, could provide for para-virtualization to the hardware present in the hybrid network device.

Figure 20:
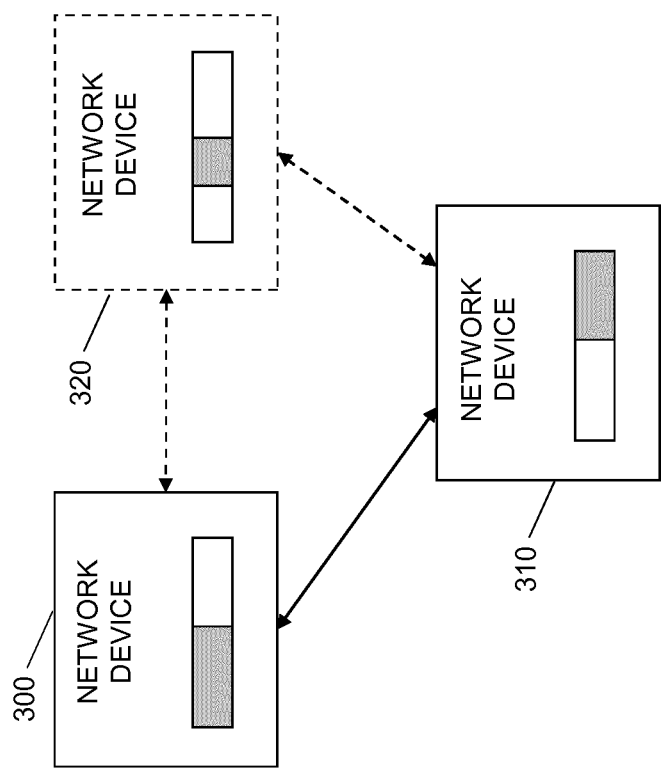
FIG. 20 schematically illustrates a distributed implementation among network devices.

FIG. 20 is a schematic diagram illustrating an example of how functionality can be distributed or partitioned between different network devices in a general case. In this example, there are at least two individual, but interconnected network devices 300, 310, which may have different functionalities, or parts of the same functionality, partitioned between the network devices 300, 310. There may be additional network device 320 being part of such a distributed implementation. The network devices 300, 310, 320 may be part of the same wireless or wired communication system, or one or more of the network devices may be so-called cloud-based network devices located outside of the wireless or wired communication system.

As used herein, the term "network device" may refer to any device located in connection with a communication network, including but not limited to devices in access networks, core networks and similar network structures. The term network device may also encompass cloud-based network devices.

Hence, yet another aspect of the embodiments relates to a network device comprising a device for determining a video fidelity measure for a video according to the embodiments, such as illustrated in any of FIGS. 13-17; an encoder according to the embodiments, such as illustrated in FIG. 18; and/or a device for selecting an encoder profile for an encoder according to the embodiments, such as illustrated in FIG. 19.

Figure 21:
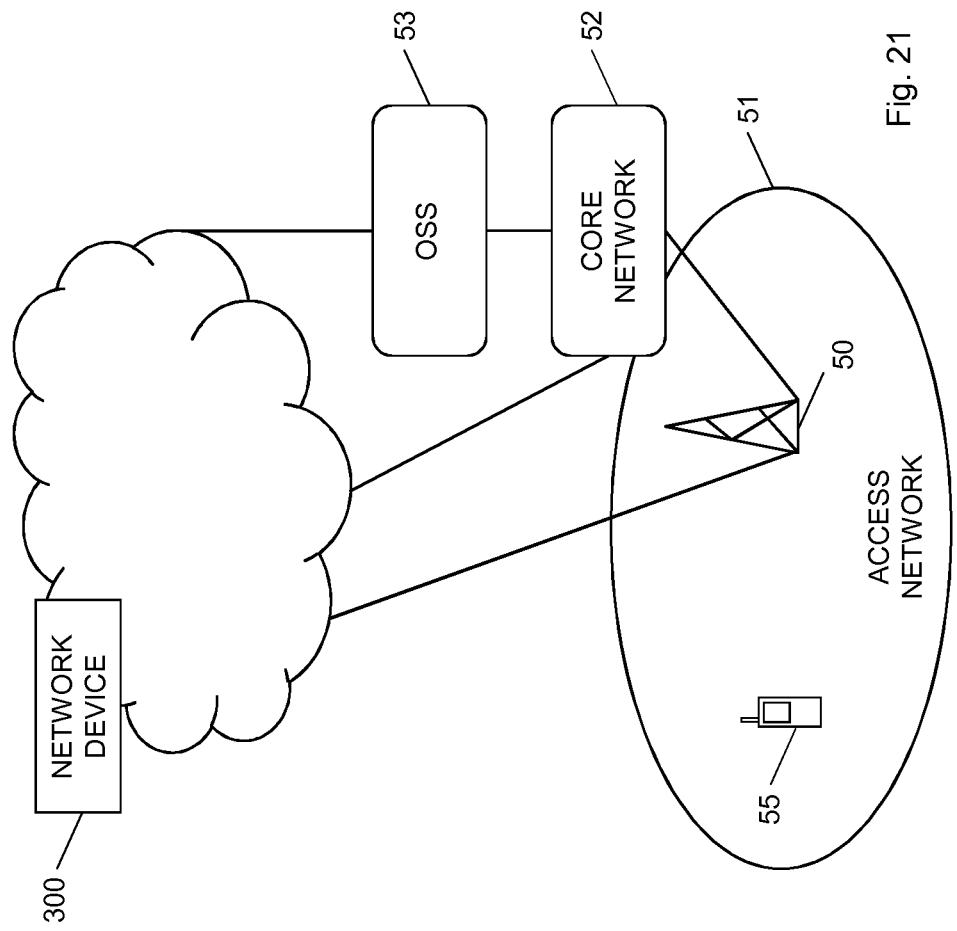
FIG. 21 is a schematic illustration of an example of a wireless communication system with one or more cloud-based network devices according to an embodiment.

FIG. 21 is a schematic diagram illustrating an example of a wireless communication system, including a radio access network (RAN) 51 and a core network 52 and optionally an operations and support system (OSS) 53 in cooperation with one or more cloud-based network devices 300. The figure also illustrates a wireless device 55 connected to the RAN 31 and capable of conducting wireless communication with a RAN node 50, such as a network node, a base station, node B (NB), evolved node B (eNB), next generation node B (gNB), etc.

The network device 300 illustrated as a cloud-based network device 300 in FIG. 21 may alternatively be implemented in connection with, such as at, the RAN node 50.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 22 to 26.

Figure 22:
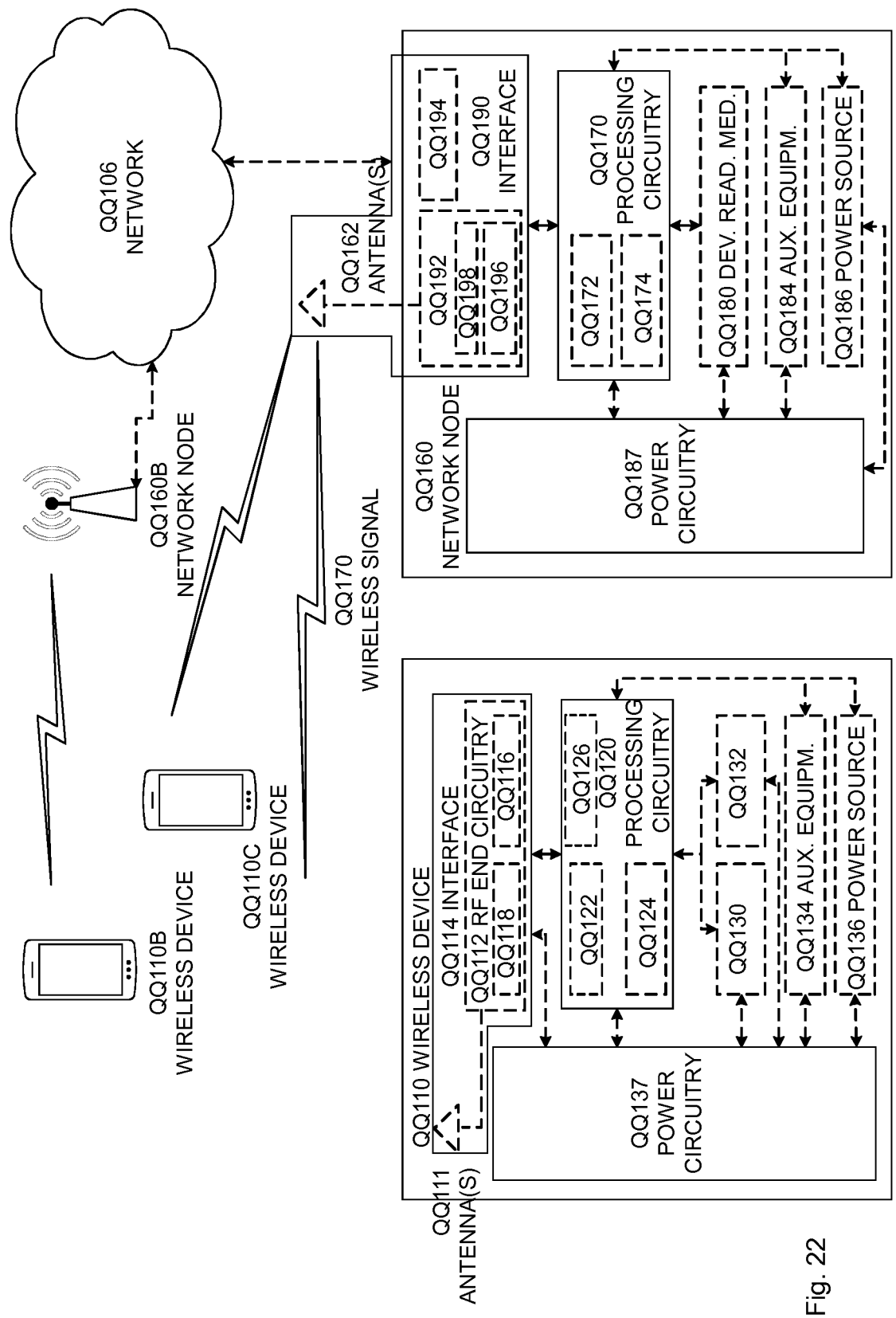
FIG. 22 is a schematic diagram illustrating an example of a wireless network in accordance with some embodiments.

FIG. 22 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 22. For simplicity, the wireless network of FIG. 22 only depicts network QQ106, network nodes QQ160 and QQ160B, and wireless devices (WDs) QQ110, QQ110B, and QQ110C. In practice, a wireless network may further include any additional elements suitable to support communication between wireless devices or between a wireless device and another communication device, such as a landline telephone, a service provider, or any other network node or end device. Of the illustrated components, network node QQ160 and WD QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, "network node" refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment, such as MSR BSs, network controllers, such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 22, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 22 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174.

In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 22 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 23:
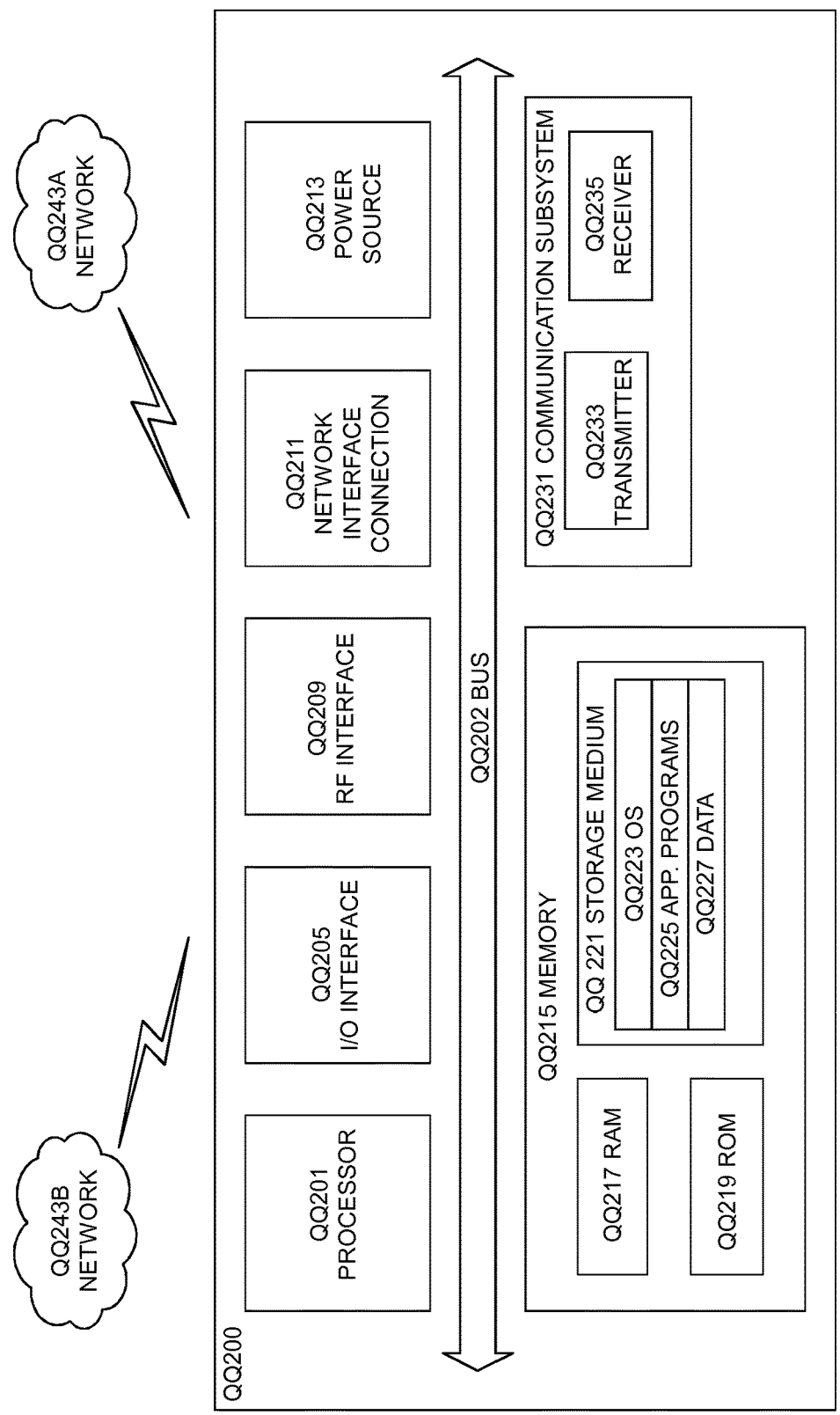
FIG. 23 is a schematic diagram illustrating an example of an embodiment of a wireless device in accordance with some embodiments.

FIG. 23 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 23, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 23 is a UE, the components discussed herein are equally applicable to a WD, and vice-versa.

In FIG. 23, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ213, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 23, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer. In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 23, RF interface QQ209 may be configured to provide a communication interface to RF components such as a transmitter, a receiver, and an antenna. Network connection interface QQ211 may be configured to provide a communication interface to network QQ243A. Network QQ243A may encompass wired and/or wireless networks such as a local-area network (LAN), a wide-area network (WAN), a computer network, a wireless network, a telecommunications network, another like network or any combination thereof. For example, network QQ243A may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD- DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 23, processing circuitry QQ201 may be configured to communicate with network QQ243B using communication subsystem QQ231. Network QQ243A and network QQ243B may be the same network or networks or different network or networks. Communication subsystem QQ231 may be configured to include one or more transceivers used to communicate with network QQ243B. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243B may encompass wired and/or wireless networks such as a local-area network (LAN), a wide-area network (WAN), a computer network, a wireless network, a telecommunications network, another like network or any combination thereof. For example, network QQ243B may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 24:
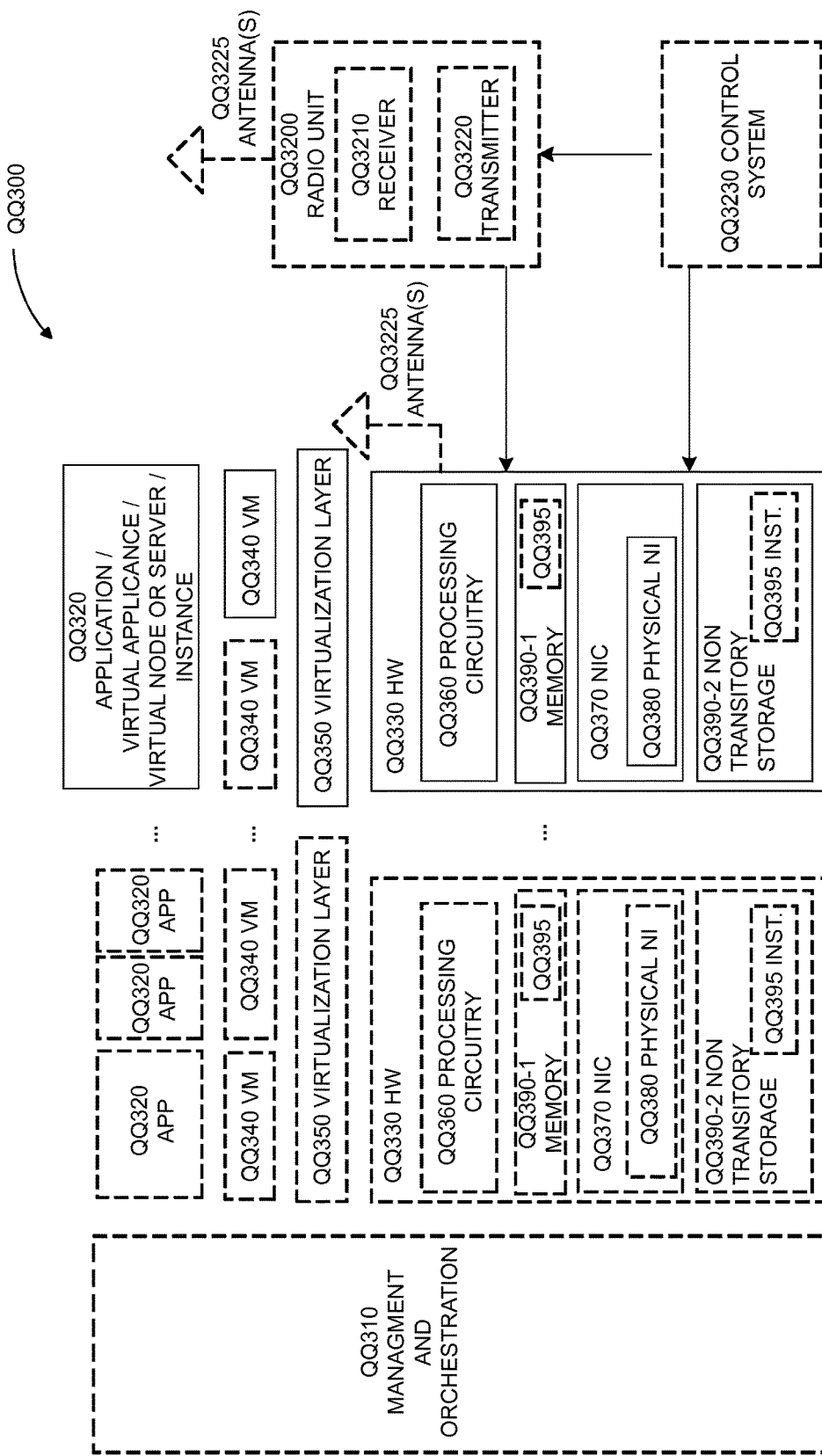
FIG. 24 is a schematic block diagram illustrating an example of a virtualization environment in which functions implemented by some embodiments may be virtualized.

FIG. 24 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analogue hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM).

Virtualization layer QQ350 may present a virtual operating platform that appears like networking hardware to virtual machine QQ340.

As shown in FIG. 24, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 24.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 25:
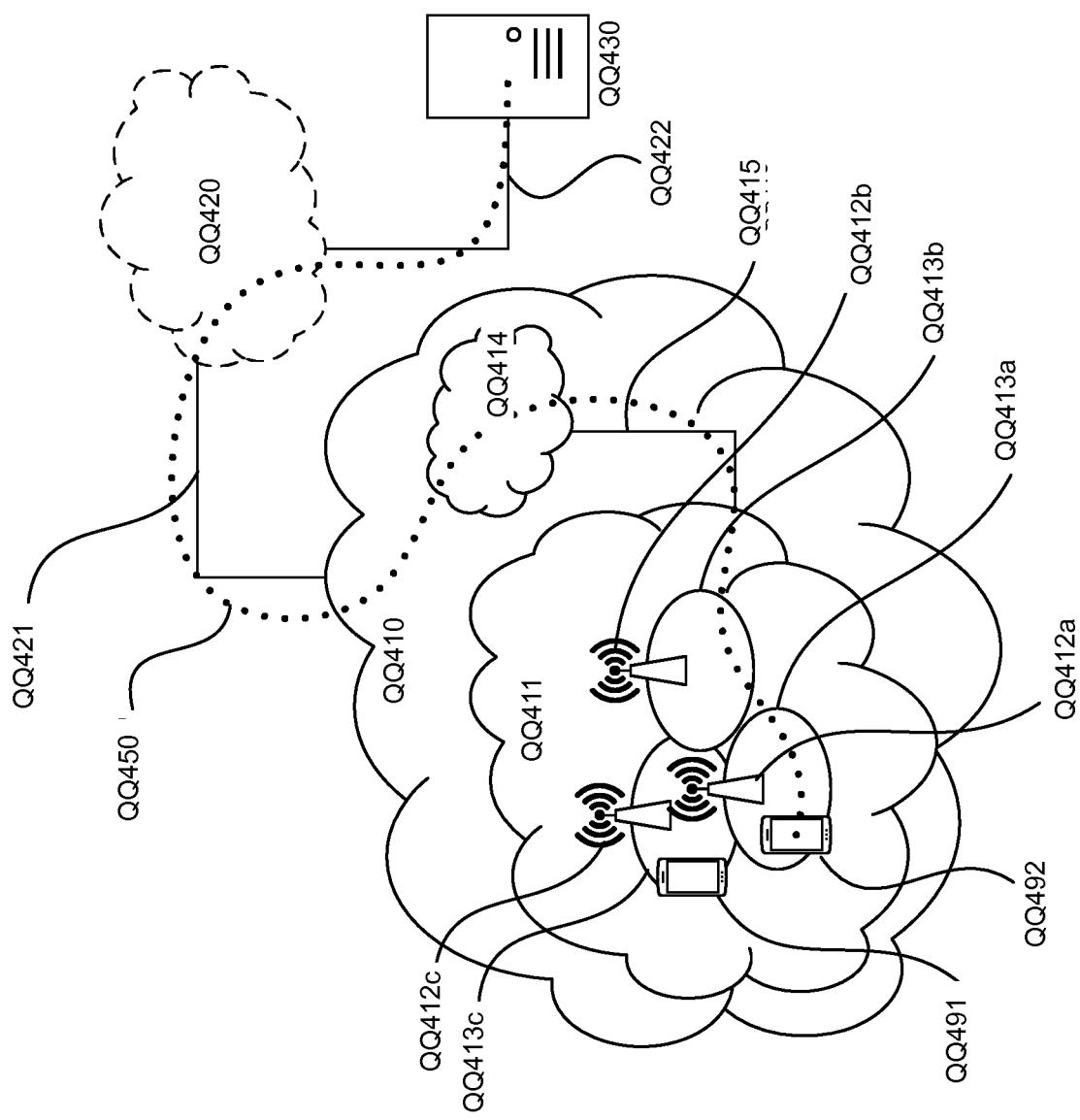
FIG. 25 is a schematic diagram illustrating an example of a telecommunication network connected via an intermediate network to a host computer in accordance with some embodiments.

FIG. 25 is a schematic diagram illustrating an example of a telecommunication network connected via an intermediate network to a host computer in accordance with some embodiments.

With reference to FIG. 25, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 25 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

FIG. 26 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 26. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 26) served by base station QQ520. Communication interface QQ526 may be configured to facilitate connection QQ560 to host computer QQ510. Connection QQ560 may be direct or it may pass through a core network (not shown in FIG. 26) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 26 may be similar or identical to host computer QQ430, one of base stations QQ412a, QQ412b, QQ412c and one of UEs QQ491, QQ492 of FIG. 23, respectively. This is to say, the inner workings of these entities may be as shown in FIG. 26 and independently, the surrounding network topology may be that of FIG. 25.

In FIG. 26, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 28:
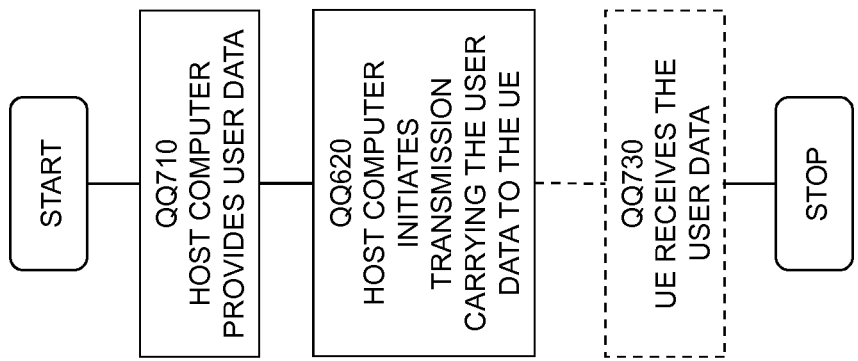
FIG. 28 is a flowchart illustrating a method implemented in a communication system in accordance with an embodiment.
Figure 27:
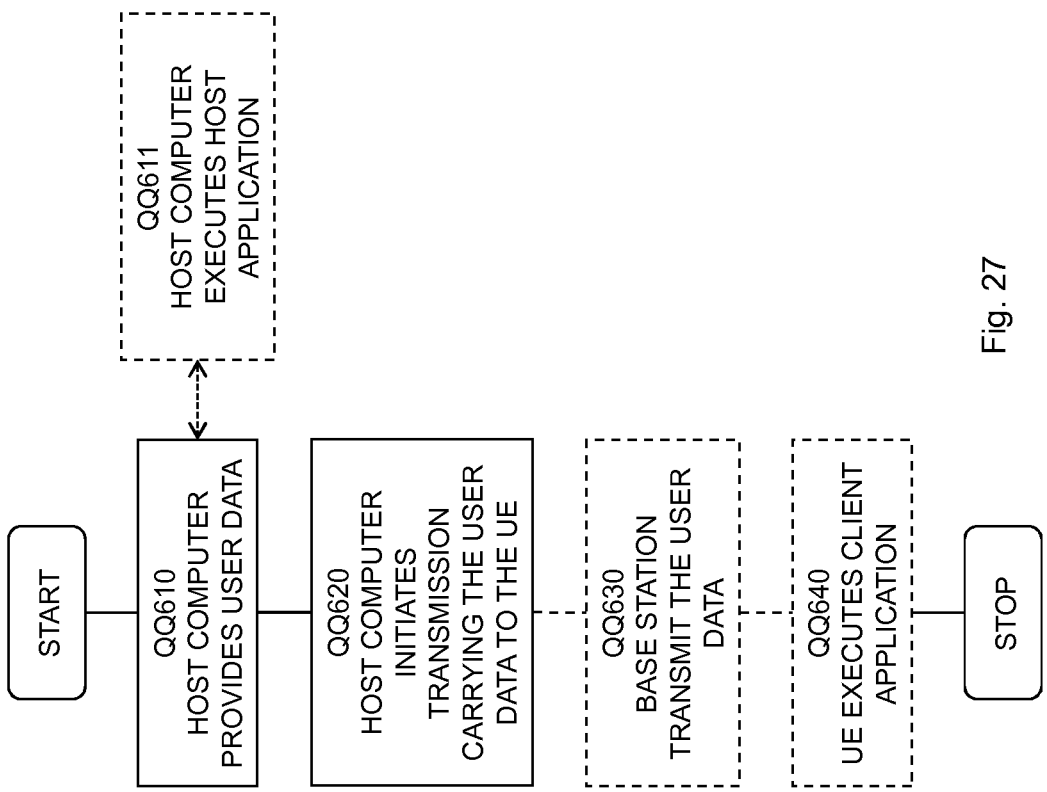
FIG. 27 is a flowchart illustrating a method implemented in a communication system in accordance with an embodiment.

FIGS. 27 and 28 are schematic flow diagrams illustrating examples of methods implemented in a communication system including, e.g. a host computer, and optionally also a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 22 to 26. For simplicity of the present disclosure, only drawing references to FIG. 27 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 28 is a flowchart illustrating a method implemented in a communication system, in accordance with one embodiment. The communication system includes a host computer, a base station and a UE which may be those described with reference to FIGS. 22 to 26. For simplicity of the present disclosure, only drawing references to FIG. 28 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIGS. 29 and 30 are schematic diagrams illustrating examples of methods implemented in a communication system including a host computer, a base station and a user equipment in accordance with some embodiments.

FIG. 29 is a flowchart illustrating a method implemented in a communication system, in accordance with one embodiment. The communication system includes a host computer, a base station and a UE which may be those described with reference to FIGS. 22 to 26. For simplicity of the present disclosure, only drawing references to FIG. 29 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 30 is a flowchart illustrating a method implemented in a communication system, in accordance with one embodiment. The communication system includes a host computer, a base station and a UE which may be those described with reference to FIGS. 22 to 26. For simplicity of the present disclosure, only drawing references to FIG. 30 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting numbered embodiments will be given.

Group A Embodiments

1. A method performed by a wireless device for video fidelity measure determination. The method comprising, for at least one distorted picture in a video sequence:
  determining a distorted difference picture as a pixel-wise difference between at least a portion of the distorted picture and at least a corresponding portion of a preceding distorted picture preceding the distorted picture in the video sequence;
  determining an original difference picture as a pixel-wise difference between at least a corresponding portion of an original picture and at least a corresponding portion of a preceding original picture preceding the original picture;
  determining a first map representing, for each pixel in the at least a portion of the distorted picture, a distortion in pixel values between the pixel and a corresponding pixel in the original picture;
  determining a second map representing, for each pixel in the distorted difference picture, a distortion in pixel values between the pixel and a corresponding pixel in the original difference picture;
  determining a third map as an aggregation of a fourth map representing, for each pixel in the at least a portion of the distorted picture, a local variability in pixel values and a fifth map representing, for each corresponding pixel in the original picture, a local variability in pixel values;
  determining a sixth map as an aggregation of a seventh map representing, for each pixel in the distorted difference picture, a local variability in pixel values and an eighth map representing, for each corresponding pixel in the original difference picture, a local variability in pixel values; and
  determining the video fidelity measure based on the first map, the second map, the third map and the sixth map.

2. A method performed by a wireless device for encoding a video sequence. The method comprising:
  encoding at least a portion of an original picture in the video sequence according to multiple coding modes to obtain multiple encoded candidate picture portions;
  decoding the multiple encoded candidate picture portions to obtain multiple decoded candidate picture portions;
  determining, for each of the multiple decoded candidate picture portions, a respective video fidelity measure according to embodiment 1; and
  selecting, among the multiple encoded candidate picture portions, an encoded candidate picture portion as encoded representation of the at least a portion of the original picture at least partly based on the respective video fidelity measures.

3. A method performed by a wireless device for selecting an encoder profile for an encoder. The method comprising:
  encoding at least one original picture in a video sequence using multiple encoder profiles to obtain multiple encoded pictures;
  decoding the multiple encoded pictures to obtain multiple decoded pictures;

determining, for each of the multiple decoded pictures, a respective video fidelity measure according to embodiment 1 using the at least one original picture as reference picture; and selecting, among the multiple encoder profiles, an encoder profile for the encoder based at least partly on the respective video fidelity measures.

4. The method of any one of the embodiments 1 to 3, further comprising:
providing user data; and
forwarding the user data to a host computer via the transmission to the target network node.

Group B Embodiments

5. A method performed by a network node or device for video fidelity measure determination. The method comprising, for at least one distorted picture in a video sequence:
determining a distorted difference picture as a pixel-wise difference between at least a portion of the distorted picture and at least a corresponding portion of a preceding distorted picture preceding the distorted picture in the video sequence;
determining an original difference picture as a pixel-wise difference between at least a corresponding portion of an original picture and at least a corresponding portion of a preceding original picture preceding the original picture;
determining a first map representing, for each pixel in the at least a portion of the distorted picture, a distortion in pixel values between the pixel and a corresponding pixel in the original picture;
determining a second map representing, for each pixel in the distorted difference picture, a distortion in pixel values between the pixel and a corresponding pixel in the original difference picture;
determining a third map as an aggregation of a fourth map representing, for each pixel in the at least a portion of the distorted picture, a local variability in pixel values and a fifth map representing, for each corresponding pixel in the original picture, a local variability in pixel values;
determining a sixth map as an aggregation of a seventh map representing, for each pixel in the distorted difference picture, a local variability in pixel values and an eighth map representing, for each corresponding pixel in the original difference picture, a local variability in pixel values; and
determining the video fidelity measure based on the first map, the second map, the third map and the sixth map.

6. A method performed by a network node or device for encoding a video sequence. The method comprising:
encoding at least a portion of an original picture in the video sequence according to multiple coding modes to obtain multiple encoded candidate picture portions;
decoding the multiple encoded candidate picture portions to obtain multiple decoded candidate picture portions;
determining, for each of the multiple decoded candidate picture portions, a respective video fidelity measure according to embodiment 5; and
selecting, among the multiple encoded candidate picture portions, an encoded candidate picture portion as encoded representation of the at least a portion of the original picture at least partly based on the respective video fidelity measures.

7. A method performed by a network node or device for selecting an encoder profile for an encoder. The method comprising:
encoding at least one original picture in a video sequence using multiple encoder profiles to obtain multiple encoded pictures;
decoding the multiple encoded pictures to obtain multiple decoded pictures;
determining, for each of the multiple decoded pictures, a respective video fidelity measure according to embodiment 5; and
selecting, among the multiple encoder profiles, an encoder profile for the encoder based at least partly on the respective video fidelity measures.

8. The method of any one of the embodiments 5 to 7, further comprising:
obtaining user data; and
forwarding the user data to a host computer or a wireless device.

Group C Embodiments

9. A wireless device comprising processing circuitry configured to perform any of the steps of any of the Group A embodiments.

10. A network node or device, such as a base station, comprising processing circuitry configured to perform any of the steps of any of the Group B embodiments.

11. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

12. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

13. The communication system of embodiment 12, further including the base station.

14. The communication system of embodiment 12 or 13, further including the UE, wherein the UE is configured to communicate with the base station.

15. The communication system of any one of the embodiments 12 to 14, wherein:
the processing circuitry of the host computer is configured to execute a host application, thereby providing the user data; and the UE comprises processing circuitry configured to execute a client application associated with the host application.

16. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

17. The method of embodiment 16, further comprising, at the base station, transmitting the user data.

18. The method of the embodiment 16 or 17, wherein the user data is provided at the host computer by executing a host application, the method further comprising, at the UE, executing a client application associated with the host application.

19. A user equipment (UE) configured to communicate with a base station, the UE comprising a radio interface and processing circuitry configured to perform any of the steps of any of the Group A embodiments.

20. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

21. The communication system of embodiment 20, wherein the cellular network further includes a base station configured to communicate with the UE.

22. The communication system of embodiment 20 or 21, wherein:
the processing circuitry of the host computer is configured to execute a host application, thereby providing the user data; and
the UE's processing circuitry is configured to execute a client application associated with the host application.

23. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

24. The method of embodiment 23, further comprising at the UE, receiving the user data from the base station.

25. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

26. The communication system of embodiment 25, further including the UE.

27. The communication system of embodiment 25 or 26, further including the base station, wherein the base station comprises a radio interface configured to communicate with the UE and a communication interface configured to forward to the host computer the user data carried by a transmission from the UE to the base station.

28. The communication system of any one of the embodiments 25 to 27, wherein:
the processing circuitry of the host computer is configured to execute a host application; and
the UE's processing circuitry is configured to execute a client application associated with the host application, thereby providing the user data.

29. The communication system of any one of the embodiments 24 to 28, wherein:
the processing circuitry of the host computer is configured to execute a host application, thereby providing request data; and
the UE's processing circuitry is configured to execute a client application associated with the host application, thereby providing the user data in response to the request data.

30. A method implemented in a communication system including a host computer, a base station and a user equipment (UE), the method comprising:
at the host computer, receiving user data transmitted to the base station from the UE, wherein the UE performs any of the steps of any of the Group A embodiments.

31. The method of embodiment 30, further comprising, at the UE, providing the user data to the base station.

32. The method of embodiment 30 or 31, further comprising:
at the UE, executing a client application, thereby providing the user data to be transmitted; and
at the host computer, executing a host application associated with the client application.

33. The method of any of the embodiments 30 to 32, further comprising:
at the UE, executing a client application; and
at the UE, receiving input data to the client application, the input data being provided at the host computer by executing a host application associated with the client application,
wherein the user data to be transmitted is provided by the client application in response to the input data.

34. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

35. The communication system of embodiment 34 further including the base station.

36. The communication system of embodiment 34 or 35, further including the UE, wherein the UE is configured to communicate with the base station.

37. The communication system of any one of the embodiments 34 to 36, wherein:
the processing circuitry of the host computer is configured to execute a host application;
the UE is configured to execute a client application associated with the host application, thereby providing the user data to be received by the host computer.

38. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

39. The method of embodiment 38, further comprising at the base station, receiving the user data from the UE.

40. The method of embodiment 38 or 39, further comprising at the base station, initiating a transmission of the received user data to the host computer.

Group D Embodiments

41. A method for determining a video fidelity measure for a video sequence. The method comprising, for at least one distorted picture in a video sequence:
- determining a distorted difference picture as a pixel-wise difference between at least a portion of the distorted picture and at least a corresponding portion of a preceding distorted picture preceding the distorted picture in the video sequence;
- determining an original difference picture as a pixel-wise difference between at least a corresponding portion of an original picture and at least a corresponding portion of a preceding original picture preceding the original picture;
- determining a first map representing, for each pixel in the at least a portion of the distorted picture, a distortion in pixel values between the pixel and a corresponding pixel in the original picture;
- determining a second map representing, for each pixel in the distorted difference picture, a distortion in pixel values between the pixel and a corresponding pixel in the original difference picture;
- determining a third map as an aggregation of a fourth map representing, for each pixel in the at least a portion of the distorted picture, a local variability in pixel values and a fifth map representing, for each corresponding pixel in the original picture, a local variability in pixel values;
- determining a sixth map as an aggregation of a seventh map representing, for each pixel in the distorted difference picture, a local variability in pixel values and an eighth map representing, for each corresponding pixel in the original difference picture, a local variability in pixel values; and
- determining the video fidelity measure based on the first map, the second map, the third map and the sixth map.

42. A method for encoding a video sequence. The method comprising:
- encoding at least a portion of an original picture in the video sequence according to multiple coding modes to obtain multiple encoded candidate picture portions;
- decoding the multiple encoded candidate picture portions to obtain multiple decoded candidate picture portions;
- determining, for each of the multiple decoded candidate picture portions, a respective video fidelity measure according to embodiment 41; and
- selecting, among the multiple encoded candidate picture portions, an encoded candidate picture portion as encoded representation of the at least a portion of the original picture at least partly based on the respective video fidelity measures.

43. A method for selecting an encoder profile for an encoder. The method comprising:
- encoding at least one original picture in a video sequence using multiple encoder profiles to obtain multiple encoded pictures;
- decoding the multiple encoded pictures to obtain multiple decoded pictures;
- determining, for each of the multiple decoded pictures, a respective video fidelity measure according to embodiment 41; and
- selecting, among the multiple encoder profiles, an encoder profile for the encoder based at least partly on the respective video fidelity measures.

44. A device configured to determine a video fidelity measure for a picture. The device is configured to, for at least one distorted picture in a video sequence:
- determine a distorted difference picture as a pixel-wise difference between at least a portion of the distorted picture and at least a corresponding portion of a preceding distorted picture preceding the distorted picture in the video sequence;
- determine an original difference picture as a pixel-wise difference between at least a corresponding portion of an original picture and at least a corresponding portion of a preceding original picture preceding the original picture;
- determine a first map representing, for each pixel in the at least a portion of the distorted picture, a distortion in pixel values between the pixel and a corresponding pixel in the original picture;
- determine a second map representing, for each pixel in the distorted difference picture, a distortion in pixel values between the pixel and a corresponding pixel in the original difference picture;
- determine a third map as an aggregation of a fourth map representing, for each pixel in the at least a portion of the distorted picture, a local variability in pixel values and a fifth map representing, for each corresponding pixel in the original picture, a local variability in pixel values;
- determine a sixth map as an aggregation of a seventh map representing, for each pixel in the distorted difference picture, a local variability in pixel values and an eighth map representing, for each corresponding pixel in the original difference picture, a local variability in pixel values; and
- determine the video fidelity measure based on the first map, the second map, the third map and the sixth map.

45. A device configured to encode a video sequence. The device is configured to
- encode at least a portion of an original picture in the video sequence according to multiple coding modes to obtain multiple encoded candidate picture portions;
- decode the multiple encoded candidate picture portions to obtain multiple decoded candidate picture portions;
- determine, for each of the multiple decoded candidate picture portions, a respective video fidelity measure using a device according to embodiment 44; and
- select, among the multiple encoded candidate picture portions, an encoded candidate picture portion as encoded representation of the at least a portion of the original picture at least partly based on the respective video fidelity measures.

46. A device configured to select an encoder profile for an encoder. The device is configured to
- encode at least one original picture in a video sequence using multiple encoder profiles to obtain multiple encoded pictures;
- decode the multiple encoded pictures to obtain multiple decoded pictures;

determine, for each of the multiple decoded pictures, a respective video fidelity measure using a device according to embodiment 44; and select, among the multiple encoder profiles, an encoder profile for the encoder based at least partly on the respective video fidelity measures.

47. A wireless device comprising a device according to any one of the embodiments 44 to 46.

48. A network node comprising a device according to any one of the embodiments 44 to 46.

49. A network device comprising a device according to any one of the embodiments 44 to 46.

50. A computer program comprising instructions, which when executed by at least one processor, cause the at least one processor to, for at least one distorted picture in a video sequence:

determine a distorted difference picture as a pixel-wise difference between at least a portion of the distorted picture and at least a corresponding portion of a preceding distorted picture preceding the distorted picture in the video sequence;

determine an original difference picture as a pixel-wise difference between at least a corresponding portion of an original picture and at least a corresponding portion of a preceding original picture preceding the original picture;

determine a first map representing, for each pixel in the at least a portion of the distorted picture, a distortion in pixel values between the pixel and a corresponding pixel in the original picture;

determine a second map representing, for each pixel in the distorted difference picture, a distortion in pixel values between the pixel and a corresponding pixel in the original difference picture;

determine a third map as an aggregation of a fourth map representing, for each pixel in the at least a portion of the distorted picture, a local variability in pixel values and a fifth map representing, for each corresponding pixel in the original picture, a local variability in pixel values;

determine a sixth map as an aggregation of a seventh map representing, for each pixel in the distorted difference picture, a local variability in pixel values and an eighth map representing, for each corresponding pixel in the original difference picture, a local variability in pixel values; and determine the video fidelity measure based on the first map, the second map, the third map and the sixth map.

51. A computer program comprising instructions, which when executed by at least one processor, cause the at least one processor to encode at least a portion of an original picture in a video sequence according to multiple coding modes to obtain multiple encoded candidate picture portions;

decode the multiple encoded candidate picture portions to obtain multiple decoded candidate picture portions;

determine, for each of the multiple decoded candidate picture portions, a respective video fidelity measure using a computer program according to embodiment 50; and select, among the multiple encoded candidate picture portions, an encoded candidate picture portion as encoded representation of the at least a portion of the original picture at least partly based on the respective video fidelity measures.

52. A computer program comprising instructions, which when executed by at least one processor, cause the at least one processor to encode at least one original picture in a video sequence using multiple encoder profiles to obtain multiple encoded pictures;

decode the multiple encoded pictures to obtain multiple decoded pictures;

determine, for each of the multiple decoded pictures, a respective video fidelity measure using a computer program according to embodiment 50; and select, among the multiple encoder profiles, an encoder profile for the encoder based at least partly on the respective video fidelity measures.

53. A computer-program product comprising a computer-readable medium having stored thereon a computer program of any of the embodiments 50 to 52.

54. An apparatus for determining a video fidelity measure for a picture. The apparatus comprises:

a module for determining, for at least one distorted picture in a video sequence, a distorted difference picture as a pixel-wise difference between at least a portion of the distorted picture and at least a corresponding portion of a preceding distorted picture preceding the distorted picture in the video sequence;

a module for determining, for the least one distorted picture, an original difference picture as a pixel-wise difference between at least a corresponding portion of an original picture and at least a corresponding portion of a preceding original picture preceding the original picture;

a module for determining, for the least one distorted picture, a first map representing, for each pixel in the at least a portion of the distorted picture, a distortion in pixel values between the pixel and a corresponding pixel in the original picture;

a module for determining, for the least one distorted picture, a second map representing, for each pixel in the distorted difference picture, a distortion in pixel values between the pixel and a corresponding pixel in the original difference picture;

a module for determining, for the least one distorted picture, a third map as an aggregation of a fourth map representing, for each pixel in the at least a portion of the distorted picture, a local variability in pixel values and a fifth map representing, for each corresponding pixel in the original picture, a local variability in pixel values;

a module for determining, for the least one distorted picture, a sixth map as an aggregation of a seventh map representing, for each pixel in the distorted difference picture, a local variability in pixel values and an eighth map representing, for each corresponding pixel in the original difference picture, a local variability in pixel values; and a module for determining, for the least one distorted picture, the video fidelity measure based on the first map, the second map, the third map and the sixth map.

55. An apparatus for encoding an original picture. The apparatus comprises:

a module for encoding at least a portion of an original picture in video sequence according to multiple coding modes to obtain multiple encoded candidate picture portions;

a module for decoding the multiple encoded candidate picture portions to obtain multiple decoded candidate picture portions;

an apparatus according to embodiment 54 for determining, for each of the multiple decoded candidate picture portions, a respective video fidelity measure; and a module for selecting, among the multiple encoded candidate picture portions, an encoded candidate picture portion as encoded representation of the at least a portion of the original picture at least partly based on the respective video fidelity measures.

56. An apparatus for selecting an encoder profile for an encoder. The apparatus comprises:

a module for encoding at least one original picture in a video sequence using multiple encoder profiles to obtain multiple encoded pictures;

a module for decoding the multiple encoded pictures to obtain multiple decoded pictures;

an apparatus according to embodiment 54 for determining, for each of the multiple decoded pictures, a respective video fidelity measure; and a module for selecting, among the multiple encoder profiles, an encoder profile for the encoder based at least partly on the respective video fidelity measures.

Examples

A video fidelity measure of the present invention was compared to prior art video fidelity measures across four VQA databases:

LIVE database [2, 3];
MCL-V database [4];
VMAF database [5]; and
VQEG database [6.

The prior art video fidelity measures used in the comparison were:

peak signal to noise ratio (PSNR);
structural similarity (SSIM);
multiscale SSIM (MS-SSIM);
information content weighted PSNR (IW-PSNR);
PSNR, human visual system (PSNR-HVS);
PSNR-HVS with contrast masking (PSNR-HVS-M);
visual information fidelity (VIF); and
video multi-method assessment fusion (VMAF).

The video fidelity measure of the present invention was derived in a VIVIQA algorithm as defined below. In the VIVIQA algorithm, the Y'CbCr color channels of the original and distorted video sequences were processed in two paths. The first path, 'spatial degradation path', used pixel data of current original and distorted pictures to estimate mean error of spatial degradation. In parallel, current picture and one previous, in display order, picture were used to calculate pixel-wise picture difference, i.e., the distorted difference picture and the original difference picture, which were processed in the 'temporal degradation path'. The distorted and original difference pictures were calculated for each color channel as:

$$Y_\Delta(i,j) = Y_t(i,j) - Y_{t-1}(i,j)$$

$$U_\Delta(i,j) = U_t(i,j) - U_{t-1}(i,j)$$

$$V_\Delta(i,j) = V_t(i,j) - V_{t-1}(i,j)$$

where $Y_t(i,j)$, $U_t(i,j)$, and $V_t(i,j)$ denote pixel at (i,j) coordinates of respectively luma, first chroma and second chroma channels at time instant t. The distorted and original difference pictures had the same dimensions as the original color channels, but their dynamic range was doubled.

A mean error ME $(I_1, I_2)$ was determined that was a sum over the entire picture of a visual distortion map (VDM), which itself was constructed by weighting pixel-wise a distortion map (DM) by a visual importance map VIM:

$$ME(I_1, I_2) = \sum_{i=1}^{H}\sum_{j=1}^{W} VDM(i,j) = \sum_{i=1}^{H}\sum_{j=1}^{W} VIM(i,j) \cdot DM(i,j) \quad (2)$$

where H is picture height, W is picture width, and DM was calculated from two pictures as:

$$DM(i,j) = |I_1(i,j) - I_2(i,j)|^p \quad (3)$$

where $I_1(i,j)$ and $I_2(i,j)$ denote pixels at coordinate (i,j) of respectively first (distorted) and second (original) pictures, picture represents either pixel data (distorted picture and original picture) or the picture-difference data (distorted difference picture and original difference picture), and parameter p is a power parameter inferred during the training phase and having a value in the range [0.001, 0.20].

The VIM, on the other hand, was the result of aggregation, in the form of pixel-wise maxima of two variability maps (VMs) as:

$$VIM(i,j) = \max(VM_1(i,j), VM_2(i,j)) \quad (4)$$

that themselves were calculated from the following, non-linearly mapped and normalized variance maps:

$$VM_x(i,j) = \frac{\operatorname{var}_x(i,j)^q}{\sum_{i=1}^{H}\sum_{j=1}^{W}\operatorname{var}_x(i,j)^q} \quad (5)$$

with q being a power parameter inferred during the training phase and having a value in the range [0.2, 1.2].

The variance map $\operatorname{var}_x(i,j)$ represented variance calculated in a small neighborhood around the current pixel at location (i,j). This local variance was calculated using a box filter (uniform filter) and can be explicitly written as:

$$\operatorname{var}_x(i,j) = N^2 \sum_{k=-M}^{M}\sum_{l=-M}^{M} I_x(i-k, j-l)^2 - \left(\sum_{k=-M}^{M}\sum_{l=-M}^{M} I_x(i-k, j-l)\right)^2, \quad (6)$$

$$M = \frac{N-1}{2}$$

where N specifies the size of the local analysis window, x is 1 for the distorted picture and 2 for the original picture and was inferred during the algorithm's training phase to belong to the set N∈{3, 5, 7}.

The above method of variance estimation in (6) was modified when the input pictures represented picture-difference data, i.e., the distorted and original difference pictures. In this case, the picture's mean value was expected to be 0, and the equation (6) was simplified to:

$$\operatorname{var}_x(i,j) = \sum_{k=-M}^{M}\sum_{l=-M}^{M} I_x(i-k, j-l)^2 \quad (7)$$

wherein x is 1 for the distorted difference picture and 2 for the original difference picture.

In case of a grayscale video, or to speed up calculations, only the mean error of the intensity channel was calculated and became a picture quality rating (PQR). For color videos, the above described process of calculating mean errors was performed on all three color channels (luma plus two chroma channels).

These three errors were then normalized and linearly mixed to produce the PQR for a color picture:

$$PQR(I_1, I_2) = \qquad (8)$$
$$c \cdot n_Y \cdot ME(Y_1, Y_2) + (1-c) \cdot n_C \cdot \frac{ME(U_1, U_2) + ME(V_1, V_2)}{2}$$

where $ME(Y_1,Y_2)$, $ME(U_1,U_2)$, and $ME(V_1,V_2)$ are respectively mean errors of luma and two chroma channels; c is the linear mixing coefficient, experimentally inferred to be in the [0.5, 0.9] range; and the normalization coefficients $n_Y$ and $n_C$ assure scaling (according to BT.709) of respectively luma and chromatic errors and were expressed by:

$$n_Y = (219 \cdot 2^{BD-8})^{-p}, n_C = (224 \cdot 2^{BD-8})^{-p} \qquad (9)$$

where p is previously defined power parameter and BD is bit-depth of the input color channel.

When pictures for which PQR were calculated are picture-difference data, i.e., distorted difference picture and original difference picture, instead of Y, U, V pixel data, the input was $Y_\Delta, U_\Delta, V_\Delta$ picture-difference data, the above normalization coefficients in (9) became:

$$n_Y = (2 \cdot 219 \cdot 2^{BD-8})^{-p}, n_C = (2 \cdot 224 \cdot 2^{BD-8})^{-p} \qquad (10)$$

and the resulting quality rating was denoted $PQR_\Delta(I_{\Delta 1}, I_{\Delta 2})$ where $\Delta$ highlights that processing was done on the picture-difference data.

Both spatial and temporal picture quality ratings were then fed into a spatio-temporal merging to combine them into one frame quality rating (FQR) using convex mixing with Minkowski's pooling:

$$FQR = [d \cdot PQR(I_1, I_2)^r + (1-d) \cdot PQR_\Delta(I_{\Delta 1}, I_{\Delta 2})^r]^{1/r} \qquad (11)$$

where d is the linear mixing coefficient, experimentally inferred to be in the [0.5, 0.9] range; r is a power parameter inferred during the training phase and having the value in the range [0.01, 1]; and PQRs are spatial and temporal ratings calculated respectively from pixel data and picture-difference data. These FQRs were then kept in a ring buffer of a requested size corresponding to the video sequence duration.

When a quality rating is to be outputted, the values in this buffer were first sorted in an ascending order (from smallest to largest error) and then a value at position:

$$idx = \text{round}[h \cdot (BL-1)] \qquad (12)$$

was taken from the sorted buffer and became a video quality rating (VQR). In the above equation (12) round[x] is a round-to-nearest integer operator; h is an experimentally chosen parameter from the [0.9, 1.0] range; BL denotes ring buffer length; and buffer indexing follows C-based convention, i.e., indexing starts from 0.

This final VQR value represents spatio-temporally merged and temporally pooled distortion per pixel. For some viewing scenarios, a localized distortion, e.g., distorted in an 8×8 block of pixels, will have much bigger visual impact on small resolution videos, e.g., 176×144, than on bigger resolution videos, e.g., 3840×2160. For these scenarios, a video fidelity measure should preferably assign to the same local distortion, a bigger importance on small resolution videos and decrease it with the increase in resolution. In the present VIVIQA algorithm this preferably happens automatically because of the normalization scheme introduced during VIM calculations.

However, after some point, increasing video resolution while keeping the same viewing distance should not reduce the importance of the distortion any further as once the distortion is noticeable in some picture area(s), inspecting the remaining picture areas will not lower already acquired sense of degradation and its magnitude. This behavior can be achieved by analyzing video resolution in terms of the viewing angles and using the concept of eye integration area.

Considering an optimal viewing distance where one pixel corresponds to one arc minute of visual angle [9], the angular dimensions (in degrees) of a picture (luma channel) become:

$$fX = \frac{W}{60}, fY = \frac{H}{60}, fArea = fX \cdot fY \qquad (13)$$

Assuming that the human eye can integrate visual stimuli over a limited spatial extent Smax (default is 12° corresponding to the maximum angular dimension of the integration area as proposed in [10]), then adjusted picture or frame dimensions (smoothly limited to Smax) can be expressed as:

$$iX = \left(\frac{1}{fX^2} + \frac{1}{Smax^2}\right)^{-\frac{1}{2}}, iY = \left(\frac{1}{fY^2} + \frac{1}{Smax^2}\right)^{-\frac{1}{2}}, iArea = iX \cdot iY \qquad (14)$$

Accumulating VQR values over the above integration area and normalizing it by the original picture or frame angular size, results in a corrected VQR value (cVQR):

$$cVQR = \frac{iArea}{fArea} VQR \qquad (15)$$

This formula can be also understood that for small video resolutions, i.e., smaller than the integration area, spatial integration of distortions over the entire picture is optimal, while for resolutions bigger than the integration area, the surplus of distorted pixels will have a limited impact over what was already detected and integrated.

It should be noted that Smax parameter does not necessarily need to correspond to the eye integration area, which is used for psychophysical experiments at the visibility threshold, and may be fine-tuned to a particular video database, which provides a variety of video resolutions in it. An initial value for this parameter was set to 60°.

In order for VIVIQA output to be aligned with subjective scores as judged by human observers, the VQR, or optionally cVQR by replacing VQR in equation 16 by cVQR, was mapped to the DMOS interval scale:

$$DMOS(VQR) = \frac{100}{1 + \exp(-\alpha_1(VQR - \alpha_2))} - \alpha_3, \qquad (16)$$
$$\alpha_3 = \frac{100}{1 + \exp(\alpha_1 \cdot \alpha_2)}$$

where parameters alpha are the solution of a nonlinear least squares (NLS) fitting of scores produced by the algorithm to human subjective quality judgement contained in the training databases. They have the following ranges: $\alpha_1 \in [7, 15]$ and $\alpha_2 \in [0.7, 1.4]$.

Finally, to assure additional compliance with the subjective scores expressed in the MOS interval scale, the calculated DMOS values can be remapped to the MOS range using the following equation:

$$MOS(DMOS) = \beta_1 \cdot DMOS + \beta_2 \quad (17)$$

where $$\beta_1 = -\frac{4}{100} \text{ and } \beta_2 = 5$$

invert DMOS scale and remap it to the 1 to 5 MOS range.

All algorithm's parameters were inferred from the experiments on available training video databases and were adjusted for distortion type related to H.264 video compression. For the considered H.264 distortion type, the algorithm parameters had the following values: p=0.025, q=1.05, c=0.69, r=0.08, d=0.7, h=0.998, N=5, and $\alpha_1$=9.7467, $\alpha_2$=1.2251 for the original VQR calculations, i.e., using VQR in equation 16, or $\alpha_1$=11.5328, $\alpha_2$=1.0354 if the optional correction for integration area is enabled, i.e., using cVQR in equation 16.

Sigmoidal mapping according to equations 3 and 4 in [8] was applied prior to calculation of Pearson's linear correlation coefficient (PLCC) on the linearized scores from the sigmoidal mapping. The beta parameters $\beta_1$-$\beta_5$ where found by minimizing the root mean square error (RMSE) between the sigmoidally mapped video fidelity measures and the MOS or DMOS values assigned to each picture pair by human viewers for all databases.

Figure 31:
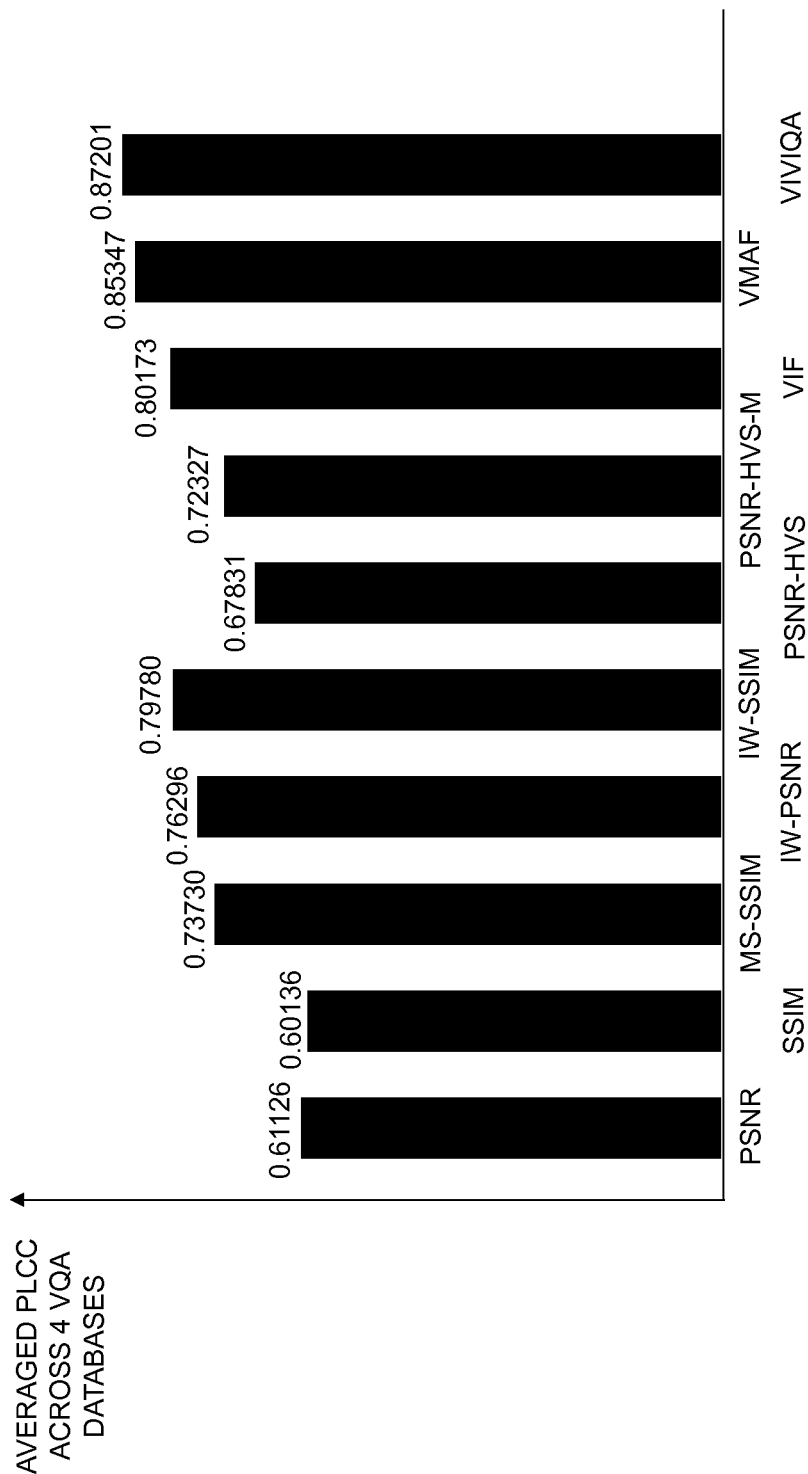
FIG. 31 is a diagram comparing averaged Pearson's linear correlation coefficient (PLCC) across four video quality assessment (VQA) databases; LIVE database [2, 3], MCL-V database [4], VMAF database [5] and video quality experts group (VQEG) database [6], for various prior art video fidelity measures; peak signal to noise ratio (PSNR), structural similarity (SSIM), multiscale SSIM (MS-SSIM), information content weighted PSNR (IW-PSNR), PSNR, human visual system (PSNR-HVS), PSNR-HVS with contrast masking (PSNR-HVS-M), visual information fidelity (VIF) and video multi-method assessment fusion (VMAF), and a video fidelity measure according to embodiments (VIVIQA)
Figure 32:
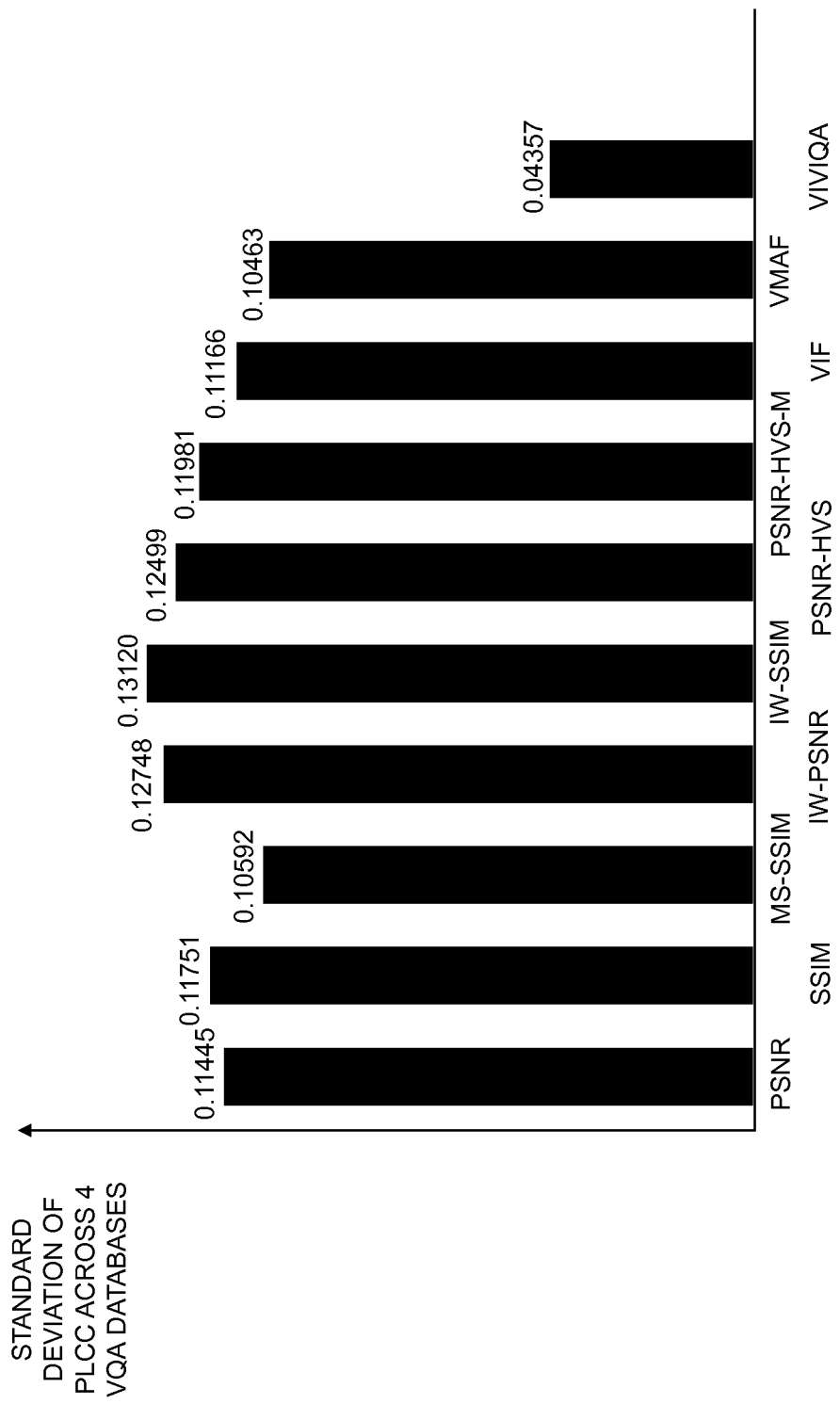
FIG. 32 is a diagram comparing standard deviation of PLCC across the four VQA databases in FIG. 31 for the various prior art video fidelity measures and the video fidelity measure according to the embodiments.

FIG. 31 is a diagram comparing averaged PLCC across the four VQA databases. FIG. 32 compares standard deviation of PLCC across the four VIQA databases in FIG. 32 for the various prior art video fidelity measures and the video fidelity measure according to the invention.

The results performed on the different VQA databases confirmed very good correlations of the video fidelity measure of the present invention with the human subjective scores as well as its robustness and consistent behavior across databases. The video fidelity measure of the present invention outperformed the prior art video fidelity measures when assessing both PLCC and standard deviation of PLCC, the latter (standard deviation of PLCC) being a measure of the consistency of the video fidelity measures.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Larson et al., Can visual fixation patterns improve video fidelity assessment?, 200815th IEEE International Conference on Picture Processing (ICIP 2008), San Diego, Calif., USA, 12-15 Oct. 2008, 2572-2575
[2] Seshadrinathan, et al., Study of Subjective and Objective Quality Assessment of Video, IEEE Transactions on Image Processing, 19(6): 1427-1441, 2010, http://live.ece.utexas.edu/research/quality/live_video.html
[3] Seshadrinathan, et al., A Subjective Study to Evaluate Video Quality Assessment Algorithms, SPIE Proceedings Human Vision and Electronic Imaging, 2010
[4] Lin et al., MCL-V: A streaming video quality assessment database, Journal of Visual Communication and Image Representation, 30: 1-9, 2015, http://mcl.usc.edu/mcl-v-database/
[5] https://github.com/Netflix/vmaf/blob/master/resource/doc/datasets.md; https://drive.google.com/folderview?id=0B3YWNICYMBIweGdJbERIUG9zc0k&usp=sharing
[6] http://www.cdvl.org/15
[7] Haralock et al, Textural Features for Picture Classification, IEEE Transactions on Systems, Man, and Cybernetics, SMC-3(6): 610-621, 1973
[8] Sheikh et al., A Statistical Evaluation of Recent Full Reference Picture quality Assessment Algorithms, IEEE Transactions on Picture Processing, 15(11): 3441-3452, 2006
[9] Recommendation ITU-R BT.2022. General viewing conditions for subjective assessment of quality of SDTV and HDTV television pictures on flat panel displays, BT Series Broadcasting Service, 2012
[10] Contrast Sensitivity of the Human Eye and Its Effects on Image Quality, P. G. J. Barten, SPIE Press, 1999

The invention claimed is:

1. A method of determining a video fidelity measure for a video sequence, the method comprising, for at least one distorted picture in the video sequence:

determining a distorted difference picture as a pixel-wise difference between at least a portion of the distorted picture and at least a corresponding portion of a preceding distorted picture preceding the distorted picture in the video sequence;

determining an original difference picture as a pixel-wise difference between at least a corresponding portion of an original picture and at least a corresponding portion of a preceding original picture preceding the original picture;

determining a first map representing, for each pixel in the at least a portion of the distorted picture, a distortion in pixel values between the pixel and a corresponding pixel in the original picture;

determining a second map representing, for each pixel in the distorted difference picture, a distortion in pixel values between the pixel and a corresponding pixel in the original difference picture;

determining a third map as an aggregation of a fourth map representing, for each pixel in the at least a portion of the distorted picture, a local variability in pixel values and a fifth map representing, for each corresponding pixel in the original picture a local variability in pixel values, wherein the aggregation of the fourth map and the fifth map comprises determining maximum or average local variability in pixel values of the each pixel in the at least a portion of the distorted picture and the each corresponding pixel in the original picture;

determining a sixth map as an aggregation of a seventh map representing, for each pixel in the distorted difference picture, a local variability in pixel values and an eighth map representing, for each corresponding pixel in the original difference picture, a local variability in pixel values, wherein the aggregation of the seventh map and the eighth map comprises determining maximum or average local variability in pixel values of the each pixel in the distorted difference picture and the each corresponding pixel in the original difference picture; and determining the video fidelity measure based on the first map, the second map, the third map and the sixth map.

2. A device for determining a video fidelity measure for a video sequence, wherein the device is configured to, for at least one distorted picture in the video sequence:

determine a distorted difference picture as a pixel-wise difference between at least a portion of the distorted picture and at least a corresponding portion of a preceding distorted picture preceding the distorted picture in the video sequence;

determine an original difference picture as a pixel-wise difference between at least a corresponding portion of an original picture and at least a corresponding portion of a preceding original picture preceding the original picture;

determine a first map representing, for each pixel in the at least a portion of the distorted picture, a distortion in pixel values between the pixel and a corresponding pixel in the original picture;

determine a second map representing, for each pixel in the distorted difference picture, a distortion in pixel values between the pixel and a corresponding pixel in the original difference picture;

determine a third map as an aggregation of a fourth map representing, for each pixel in the at least a portion of the distorted picture, a local variability in pixel values and a fifth map representing, for each corresponding pixel in the original picture, a local variability in pixel values, wherein the aggregation of the fourth map and the fifth map comprises determining maximum or average local variability in pixel values of the each pixel in the at least a portion of the distorted picture and the each corresponding pixel in the original picture;

determine a sixth map as an aggregation of a seventh map representing, for each pixel in the distorted difference picture, a local variability in pixel values and an eighth map representing, for each corresponding pixel in the original difference picture, a local variability in pixel values, wherein the aggregation of the seventh map and the eighth map comprises determining maximum or average local variability in pixel values of the each pixel in the distorted difference picture and the each corresponding pixel in the original difference picture; and determine the video fidelity measure based on the first map, the second map, the third map and the sixth map.

3. The device according to claim 2, wherein the device is configured to determine the distorted difference picture as a pixel-wise difference between the distorted picture and the preceding distorted picture in the video sequence;

determine the original difference picture a pixel-wise difference between the original picture and the preceding original picture;

determine the first map representing, for each pixel in the distorted picture, a distortion in pixel values between the pixel and the corresponding pixel in the original picture; and determine the third map as an aggregation of the fourth map representing, for each pixel in the distorted picture, the local variability in pixel values and the fifth map representing, for each corresponding pixel in the original picture, the local variability in pixel values.

4. The device according to claim 2, wherein the device is configured to determine the first map representing, for each pixel in the at least a portion of the distorted picture, an absolute difference in pixel values between the pixel and the corresponding pixel in the original picture; and determine the second map representing, for each pixel in the distorted difference picture, an absolute difference in pixel values between the pixel and the corresponding pixel in the original difference picture.

5. The device according to claim 4, wherein the device is configured to determine the first map $DM_1(i,j)$ based on $|I_1(i,j)-I_2(i,j)|^p$, wherein $I_1(i, j)$ denotes pixel value of a pixel at coordinate (i,j) in the distorted picture (10), $I_2(i, j)$ denotes pixel value of a corresponding pixel at coordinate (i,j) in the original picture and p is a positive power parameter; and determine the second map $DM_2(i,j)$ based on $|I_{A1}(i,j)-I_{A2}(i,j)|^p$, wherein $I_{A1}(i, j)$ denotes pixel value of a pixel at coordinate (i,j) in the distorted difference picture and $I_{A2}(i, j)$ denotes pixel value of a corresponding pixel at coordinate (i,j) in the original difference picture.

6. The device according to claim 2, wherein the device is configured to determine the third map $VIM_1(i,j)$ as an aggregation of pixel-wise maxima of the fourth map $VM_1(i, j)$ and the fifth map $VM_2(i, j)$, $VIM_1(i, j)=\max(VM_1(i,j), VM_2(i, j))$; and determine the sixth map $VIM_2(i, j)$ as an aggregation of pixel-wise maxima of the seventh map $VM_3(i, j)$ and the eighth map $VM_4(i, j)$, $VIM_2(i, j)=\max(VM_3(i,j), VM_4(i,j))$.

7. The device according to claim 2, wherein the device is configured to determine the third map as the aggregation of the fourth map representing, for each pixel in the at least a portion of the distorted picture, the local variability in pixel values in a pixel neighborhood of the pixel in the distorted picture and the fifth map representing, for each corresponding pixel in the original picture, the local variability in pixel values in a pixel neighborhood of the corresponding pixel in the original picture; and determine the sixth map as the aggregation of the seventh map representing, for each pixel in the distorted difference picture, the local variability in pixel values in a pixel neighborhood of the pixel in the distorted difference picture and the eighth map representing, for each corresponding pixel in the original difference picture, the local variability in pixel values in a pixel neighborhood of the corresponding pixel in the original difference picture.

8. The device according to claim 2, wherein the device is configured to determine the third map as the aggregation of the fourth map representing, for each pixel in the at least a portion of the distorted picture, a local variance in pixel values and the fifth map representing, for each corresponding pixel in the original picture, a local variance in pixel values; and determine the sixth map as the aggregation of the seventh map representing, for each pixel in the distorted difference picture, a local variance in pixel values and the eighth map representing, for each corresponding pixel in the original difference picture, a local variance in pixel values.

9. The device according to claim 8, wherein the device is configured to
  determine the third map as the aggregation of the fourth map representing, for each pixel in the at least a portion of the distorted picture, a non-linearly mapped and normalized local variance in pixel values and the fifth map representing, for each corresponding pixel in the original picture, a non-linearly mapped and normalized local variance in pixel values; and
  determine the sixth map as the aggregation of the seventh map representing, for each pixel in the distorted difference picture, a non-linearly mapped and normalized local variance in pixel values and the eighth map representing, for each corresponding pixel in the original difference picture, a non-linearly mapped and normalized local variance in pixel values.

10. The device according to claim 8, wherein the device is configured to
  determine a first variance map representing, for each pixel in the at least a portion of the distorted picture, a local variance in pixel values;
  determine a first variability map as a non-linearly mapped and normalized version of the first variance map;
  determine a second variance map representing, for each corresponding pixel in the original picture, a local variance in pixel values;
  determine a second variability map as a non-linearly mapped and normalized version of the second variance map;
  determine a third variance map representing, for each pixel in the distorted difference picture, a local variance in pixel values;
  determine a third variability map as a non-linearly mapped and normalized version of the third variance map;
  determine a fourth variance map representing, for each corresponding pixel in the original difference picture, a local variance in pixel values;
  determine a fourth variability map as a non-linearly mapped and normalized version of the fourth variance map;
  determine the third map as the aggregation of the first variability map and the second variability map; and
  determine the sixth map as the aggregation of the third variability map and the fourth variability map.

11. The device according to claim 10, wherein the device is configured to
  determine the first variability map $VM_1(i,j)$ based on $$\frac{var_1(i,j)^q}{\sum_i \sum_j var_1(i,j)^q},$$

wherein $var_1(i,j)$ represents the first variance map and q is a positive power parameter;
  determine the second variability map $VM_2(i,j)$ based on $$\frac{var_2(i,j)^q}{\sum_i \sum_j var_2(i,j)^q},$$

wherein $var_2(i,j)$ represents the second variance map;
  determine the third variability map $VM_3(i,j)$ based on $$\frac{var_3(i,j)^q}{\sum_i \sum_j var_3(i,j)^q},$$

wherein $var_3(i,j)$ represents the third variance map; and
  determine the fourth variability map $VM_4(i,j)$ based on $$\frac{var_4(i,j)^q}{\sum_i \sum_j var_4(i,j)^q},$$

wherein $var_4(i,j)$ represents the fourth variance map.

12. The device according to claim 10, wherein the device is configured to
  determine the first variance map $var_1(i,j)$ based on $N^2 \sum_{k=-M}^{M} \sum_{l=-M}^{M} I_1(i-k,j-l)^2 - (\sum_{k=-M}^{M} \sum_{l=-M}^{M} I_1(i-k,j-l))^2$, wherein $I_1(i,j)$ represents pixel value of a pixel at coordinate (i,j) in the distorted picture (10), $$M = \frac{N-1}{2}$$

and N is a positive odd integer;
  determine the second variance map $var_2(i,j)$ based on $N^2 \sum_{k=-M}^{M} \sum_{l=-M}^{M} I_1(i-k,j-l)^2 - (\sum_{k=-M}^{M} \sum_{l=-M}^{M} I_2(i-k,j-l))^2$, wherein $I_2(i,j)$ represents pixel value of a corresponding pixel (24) at coordinate (i,j) in the original picture;
  determine the third variance map $var_3(i,j)$ based on $\sum_{k=-M}^{M} \sum_{l=-M}^{M} I_{\Delta 1}(i-k,j-l)^2$, wherein $I_{\Delta 1}(i,j)$ represents pixel value of a pixel (34) at coordinate (i,j) in the distorted difference picture; and
  determine the fourth variance map $var_4(i,j)$ based on $\sum_{k=-M}^{M} \sum_{l=-M}^{M} I_{\Delta 2}(i-k,j-l)^2$, wherein $I_{\Delta 2}(i,j)$ represents pixel value of a corresponding pixel at coordinate (i,j) in the original difference picture.

13. The device according to claim 2, wherein the device is configured to
  determine a ninth map by weighting pixel-wise the first map by the third map;
  determine a tenth map by weighting pixel-wise the second map by the sixth map; and
  determine the video fidelity measure based on the ninth map and the tenth map.

14. The device according to claim 13, wherein the device is configured to
  determine the ninth map $VDM_1(i,j)=VIM_1(i,j) \times DM_1(i,j)$, wherein $DM_1(i,j)$ represents the first map and $VIM_1(i,j)$ represents the third map; and
  determine the tenth map $VDM_2(i,j)=VIM_2(i,j) \times DM_2(i,j)$, wherein $DM_2(i,j)$ represents the second map and $VIM_2(i,j)$ represents the sixth map.

15. The device according to claim 13, wherein the device is configured to
  determine a first mean error $ME_1(I_1, I_2)$ based on a sum of the ninth map $\sum_i \sum_j VDM_1(i,j)$, wherein $I_1$, $I_2$ represent pixel values and (i,j) represents a coordinate of a pixel in the distorted picture and of a corresponding pixel in the original picture;
  determine a second mean error $ME_2(I_{\Delta 1}, I_{\Delta 2})$ based on a sum of the tenth map $\sum_i \sum_j VDM_2(i,j)$, wherein $I_{\Delta 1}$, $I_{\Delta 2}$ represent pixel values and (i,j) represents a coordinate of a pixel in the distorted difference picture and of a corresponding pixel in the original difference picture; and determine the video fidelity measure based on the first mean error and the second mean error.

16. The device according to claim 15, wherein the device is configured to determine a first mean error $ME_1$ $(Y_1, Y_2)$ for an intensity channel and first mean errors $ME_1$ $(U_{\Delta 1}, U_{\Delta 2})$, $ME_2$ $(V_{\Delta 1}, V_{\Delta 2})$ for chromatic channels;

determine a second mean error $ME_2$ $(Y_{\Delta 1}, Y_{\Delta 2})$ for an intensity channel and second mean errors $ME_2(U_{\Delta 1}, U_{\Delta 2})$, $ME_2$ $(V_{\Delta 1}, V_{\Delta 2})$ for chromatic channels;

determine a first picture quality rating $PQR_1(I_1,I_2)$ based on a normalized linear combination of the first mean error for the intensity channel and the first mean errors for the chromatic channels; and determine a second picture quality rating $PQR_2(I_{\Delta 1},I_{\Delta 2})$ based on a normalized linear combination of the second mean error for the intensity channel and the second mean errors for the chromatic channels; and determine the video fidelity measure based on a combination of the first picture quality rating and the second picture quality rating.

17. The device according to claim 16, wherein the device is configured to determine the first picture quality rating based on $$c \times n_Y \times ME_1(Y_1, Y_2) + (1-c) \times n_C \times \frac{ME_1(U_1, U_2) + ME_1(V_1, V_2)}{2},$$

wherein c is a positive number larger than 0 but smaller than 1 and $n_Y$, $n_C$ are normalization coefficients defined based on the bit depth of the distorted picture and the original picture; and determine the second picture quality rating based on $$c \times n_{\Delta Y} \times ME_2(\Delta Y_{\Delta 1}, \Delta Y_{\Delta 2}) +$$
$$(1-c) \times n_{\Delta C} \times \frac{ME_2(U_{\Delta 1}, U_{\Delta 2}) + ME_2(V_{\Delta 1}, \Delta V_{\Delta 2})}{2},$$

wherein $n_{\Delta Y}$, $n_{\Delta C}$ are normalization coefficients defined based on the bit depth of the distorted difference picture and the original difference picture.

18. The device according to claim 16, wherein the device is configured to determine the video fidelity measure based on $(d \times PQR_1(I_1,I_2)^r + (1-d) \times PQR_2(I_{\Delta 1},I_{\Delta 2})^r)^{1/r}$, wherein d is a positive number larger than 0 but smaller than 1 and r is a positive power parameter.

19. The device according to claim 2, wherein the device is configured to determine, for each distorted picture among multiple distorted pictures in the video sequence, a distorted difference picture as a pixel-wise difference between at least a portion of the distorted picture and at least a corresponding portion of a preceding distorted picture preceding the distorted picture in the video sequence;

determine, for each distorted picture among the multiple distorted pictures an original difference picture as a pixel-wise difference between at least a corresponding portion of an original picture and at least a corresponding portion of a preceding original picture preceding the original picture;

determine, for each distorted picture among the multiple distorted pictures, a first map representing, for each pixel in the at least a portion of the distorted picture, a distortion in pixel values between the pixel and a corresponding pixel in the original picture;

determine, for each distorted picture among the multiple distorted pictures, a second map representing, for each pixel in the distorted difference picture, a distortion in pixel values between the pixel and a corresponding pixel in the original difference picture;

determine, for each distorted picture among the multiple distorted pictures, a third map as an aggregation of a fourth map representing, for each pixel in the at least a portion of the distorted picture, a local variability in pixel values and a fifth map representing, for each corresponding pixel in the original picture, a local variability in pixel values, wherein the aggregation of the fourth map and the fifth map comprises determining maximum or average local variability in pixel values of the each pixel in the at least a portion of the distorted picture and the each corresponding pixel in the original picture;

determine, for each distorted picture among the multiple distorted pictures, a sixth map as an aggregation of a seventh map representing, for each pixel in the distorted difference picture, a local variability in pixel values and an eighth map representing, for each corresponding pixel in the original difference picture, a local variability in pixel values, wherein the aggregation of the seventh map and the eighth map comprises determining maximum or average local variability in pixel values of the each pixel in the distorted difference picture and the each corresponding pixel in the original difference picture; and determine, for each distorted picture among the multiple distorted pictures, a video fidelity measure for the distorted picture based on the first map, the second map, the third map and the sixth map.

20. The device according to claim 19, wherein the device is configured to select a video fidelity measure among the multiple respective video fidelity measures determined for the multiple distorted pictures as video fidelity measure for the video sequence.

21. The device according to claim 20, wherein the device is configured to select a video fidelity measure representing a worst video fidelity among the multiple video fidelity measures.

22. The device according to claim 20, wherein the device is configured to select a range of video fidelity measures determined for multiple successive distorted pictures in the video sequence.

23. The device according to claim 2, wherein the device is configured to convert the video fidelity measure to a differential mean opinion score (DMOS) range or a mean opinion score (MOS) range.

24. The device according to claim 2, further comprising:
a processor; and
a memory comprising instructions executable by the processor, wherein the processor is operative to
determine the distorted difference picture as a pixel-wise difference between the at least a portion of the distorted picture and the at least a corresponding portion of the preceding distorted picture in the video sequence;
determine the original difference picture as a pixel-wise difference between the at least a corresponding portion of the original picture and at least a corresponding portion of the preceding original picture;

determine the first map representing, for each pixel in the at least a portion of the distorted picture, the distortion in pixel values between the pixel and the corresponding pixel in the original picture;

determine the second map representing, for each pixel in the distorted difference picture, the distortion in pixel values between the pixel and the corresponding pixel in the original difference picture;

determine the third map as the aggregation of the fourth map representing, for each pixel in the at least a portion of the distorted picture, the local variability in pixel values and the fifth map representing, for each corresponding pixel in the original picture, the local variability in pixel values, wherein the aggregation of the fourth map and the fifth map comprises determining maximum or average local variability in pixel values of the each pixel in the at least a portion of the distorted picture and the each corresponding pixel in the original picture;

determine the sixth map as the aggregation of the seventh map representing, for each pixel in the distorted difference picture, the local variability in pixel values and the eighth map representing, for each corresponding pixel in the original difference picture, the local variability in pixel values, wherein the aggregation of the seventh map and the eighth map comprises determining maximum or average local variability in pixel values of the each pixel in the distorted difference picture and the each corresponding pixel in the original difference picture; and determine the video fidelity measure based on the first map, the second map, the third map and the sixth map.

25. An encoder comprising a device for determining a video fidelity measure for video sequence according to claim 2, wherein the encoder is configured to encode at least a portion of an original picture in the video sequence according to multiple coding modes to obtain multiple encoded candidate picture portions;

decode the multiple encoded candidate pictures to obtain multiple decoded candidate picture portions; and select, among the multiple encoded candidate picture portions, an encoded candidate picture portion as encoded representation of the at least a portion of the original picture at least partly based on respective video fidelity measures determined by the device for each of the multiple decoded candidate picture portions.

26. The encoder according to claim 25, wherein the encoder is configured to determine, for each of the multiple decoded candidate picture portions, a respective rate-distortion measure based on the respective video fidelity measure and a rate representing a bit cost of representing the at least a portion of the original picture with the encoded candidate picture portion; and select, among the multiple encoded candidate picture portions, an encoded candidate picture portion as encoded representation of the at least a portion of the original picture based on the respective rate-distortion measure.

27. A device for selecting an encoder profile for an encoder, the device comprises a device for determining a video fidelity measure for a video sequence according to claim 2, wherein the device for selecting an encoder profile is configured to encode at least one original picture in the video sequence using multiple encoder profiles to obtain multiple encoded pictures;

decode the multiple encoded pictures to obtain multiple decoded pictures; and select, among the multiple encoder profiles, an encoder profile for the encoder based at least partly on respective video fidelity measures determined by the device for determining a video fidelity measure.

28. A computer readable non-transitory storage medium storing a computer program, which when executed by at least one processor, cause the at least one processor to determine, for at least one distorted picture in a video sequence, a distorted difference picture as a pixel-wise difference between at least a portion of the distorted picture and at least a corresponding portion of a preceding distorted picture in the video sequence;

determine, for the at least one distorted picture in the video sequence, an original difference picture as a pixel-wise difference between at least a corresponding portion of an original picture and at least a corresponding portion of a preceding original picture;

determine, for the at least one distorted picture in the video sequence, a first map representing, for each pixel in the at least a portion of the distorted picture, a distortion in pixel values between the pixel and a corresponding pixel in the original picture;

determine, for the at least one distorted picture in the video sequence, a second map representing, for each pixel in the distorted difference picture, a distortion in pixel values between the pixel and a corresponding pixel in the original difference picture;

determine, for the at least one distorted picture in the video sequence, a third map as an aggregation of a fourth map representing, for each pixel in the at least a portion of the distorted picture, a local variability in pixel values and a fifth map representing, for each corresponding pixel in the original picture, a local variability in pixel values, wherein the aggregation of the fourth map and the fifth map comprises determining maximum or average local variability in pixel values of the each pixel in the at least a portion of the distorted picture and the each corresponding pixel in the original picture;

determine, for the at least one distorted picture in the video sequence, a sixth map as an aggregation of a seventh map representing, for each pixel in the distorted difference picture, a local variability in pixel values and an eighth map representing, for each corresponding pixel in the original difference picture, a local variability in pixel values, wherein the aggregation of the seventh map and the eighth map comprises determining maximum or average local variability in pixel values of the each pixel in the distorted difference picture and the each corresponding pixel in the original difference picture; and determine, for the at least one distorted picture in the video sequence, the video fidelity measure based on the first map, the second map, the third map and the sixth map.

* * * * *